(12) United States Patent
Hardwick et al.

(10) Patent No.: US 11,311,959 B2
(45) Date of Patent: Apr. 26, 2022

(54) SOLID-STATE ADDITIVE MANUFACTURING SYSTEM AND MATERIAL COMPOSITIONS AND STRUCTURES

(71) Applicant: MELD Manufacturing Corporation, Christiansburg, VA (US)

(72) Inventors: Nanci Hardwick, Blacksburg, VA (US); Wayne Hubbard, Blacksburg, VA (US); Chase Cox, Radford, VA (US); Anita T. Broach, Christiansburg, VA (US)

(73) Assignee: MELD Manufacturing Corporation, Christiansburg, VA (US)

( * ) Notice: Subject to any disclaimer, the term of this patent is extended or adjusted under 35 U.S.C. 154(b) by 0 days.

(21) Appl. No.: 16/760,829

(22) PCT Filed: Oct. 31, 2018

(86) PCT No.: PCT/US2018/058470
§ 371 (c)(1),
(2) Date: Apr. 30, 2020

(87) PCT Pub. No.: WO2019/089764
PCT Pub. Date: May 9, 2019

(65) Prior Publication Data
US 2020/0306869 A1 Oct. 1, 2020

Related U.S. Application Data

(60) Provisional application No. 62/579,483, filed on Oct. 31, 2017, provisional application No. 62/713,275, filed on Aug. 1, 2018.

(51) Int. Cl.
*B23K 20/12* (2006.01)
*B23K 20/10* (2006.01)
(Continued)

(52) U.S. Cl.
CPC .............. *B23K 20/10* (2013.01); *B22F 10/20* (2021.01); *B23K 20/128* (2013.01);
(Continued)

(58) Field of Classification Search
CPC .. B23K 20/10; B23K 20/1215; B23K 20/128; B23K 20/129; B23K 20/122–128;
(Continued)

(56) References Cited

U.S. PATENT DOCUMENTS 1,610,945 A   12/1926   Goldsmith et al.
3,217,957 A   11/1965   Jarvie et al.
(Continued)

FOREIGN PATENT DOCUMENTS

CA   2550543 A1 * 12/2006   .......... B23K 20/123
CN   1490112 A   4/2004
(Continued)

OTHER PUBLICATIONS

Machine translation of CN-101537529A (no date available).*
(Continued)

*Primary Examiner* — Kiley S Stoner
(74) *Attorney, Agent, or Firm* — New River Valley IP Law, P.C.; Michele L. Mayberry

(57) ABSTRACT

A solid-state additive manufacturing additive manufacturing system applicable to building up 3D structures, coating and functionalizing surfaces, joining structures, adding customized features to objects, compounding proprietary compositions and repairing various structures is disclosed. The solid-state additive manufacturing system enables deposition of different fillers, viz. metals, metal alloys, MMCs, polymers, plastics, composites, hybrids and gradient compositions, as well as controls the resulting deposit structures, e.g. specific nano-/micro-, gradient- and porous-material structures. The system accommodates various feeding-,
(Continued)

spindle- and tool-designs for depositing different forms of filler materials, viz. rods, wires, granules, powders, powder-filled-tubes, scrap pieces or their combination, and a working platform with multiple access points. One or multiple motors, driving and monitoring units control the movement of the workpiece, spindle and tool and move the filler through the feeding system, which passageway is in communication with the passageways of the spindle and the tool.

23 Claims, 55 Drawing Sheets

(51) Int. Cl.
    *C22C 1/04* (2006.01)
    *C22C 1/05* (2006.01)
    *C22C 32/00* (2006.01)
    *G05B 19/4099* (2006.01)
    *B22F 10/20* (2021.01)
    *B33Y 50/02* (2015.01)
    *B33Y 80/00* (2015.01)
    *C22C 26/00* (2006.01)
    *B22F 10/30* (2021.01)

(52) U.S. Cl.
    CPC ........ *B23K 20/129* (2013.01); *B23K 20/1215* (2013.01); *C22C 1/0416* (2013.01); *C22C 1/05* (2013.01); *C22C 32/0047* (2013.01); *G05B 19/4099* (2013.01); *B22F 10/30* (2021.01); *B33Y 50/02* (2014.12); *B33Y 80/00* (2014.12); *C22C 2026/002* (2013.01)

(58) Field of Classification Search
    CPC ..... C22C 1/05; C22C 32/0047; C22C 1/0416; C22C 2026/002; B22F 3/1055; B22F 2003/1057; G05B 19/4099; B33Y 80/00; B33Y 50/02
    USPC .............................. 228/112.1–114.5, 2.1–2.3
    See application file for complete search history.

(56) References Cited

U.S. PATENT DOCUMENTS

| | | |
|---|---|---|
| 3,279,971 A | 10/1966 | Gardener |
| 3,292,838 A | 12/1966 | Farley |
| 3,418,196 A | 12/1968 | Luc |
| 3,444,611 A | 5/1969 | Bogart |
| 3,455,015 A | 7/1969 | Daniels et al. |
| 3,466,737 A | 9/1969 | Hanink |
| 3,495,321 A | 2/1970 | Shaff |
| 3,537,172 A | 11/1970 | Voznesensky et al. |
| 3,831,262 A | 8/1974 | Luc |
| 3,899,377 A | 8/1975 | Luc |
| 3,949,896 A | 4/1976 | Luc |
| 4,023,613 A | 5/1977 | Uebayasi et al. |
| 4,106,167 A | 8/1978 | Luc |
| 4,144,110 A | 3/1979 | Luc |
| 4,491,001 A | 1/1985 | Yoshida et al. |
| 4,625,095 A | 11/1986 | Das |
| 4,824,295 A | 4/1989 | Sharpless |
| 4,930,675 A | 6/1990 | Bedford et al. |
| 4,959,241 A | 9/1990 | Thomas et al. |
| 5,056,971 A | 10/1991 | Sartori |
| 5,079,825 A | 1/1992 | Matsui et al. |
| 5,106,702 A | 4/1992 | Walker et al. |
| 5,249,778 A | 10/1993 | Steichert et al. |
| 5,262,123 A | 11/1993 | Thomas et al. |
| 5,308,408 A | 5/1994 | Katila |
| 5,330,160 A | 7/1994 | Eisermann et al. |
| 5,460,317 A | 10/1995 | Thomas et al. |
| 5,469,617 A | 11/1995 | Thomas et al. |
| 5,611,479 A | 3/1997 | Rosen |
| 5,637,836 A | 6/1997 | Nakagawa et al. |
| 5,655,412 A * | 8/1997 | Luik ............. B23K 20/123 74/490.01 |
| 5,697,511 A | 12/1997 | Bampton |
| 5,697,544 A | 12/1997 | Wykes |
| 5,713,507 A | 2/1998 | Holt et al. |
| 5,718,366 A | 2/1998 | Colligan |
| 5,769,306 A | 6/1998 | Colligan |
| 5,794,835 A | 8/1998 | Colligan et al. |
| 5,813,592 A | 9/1998 | Midling et al. |
| 5,826,664 A | 10/1998 | Richardson |
| 5,893,507 A | 4/1999 | Ding et al. |
| 5,971,247 A | 10/1999 | Gentry |
| 5,971,252 A | 10/1999 | Rosen et al. |
| 5,975,406 A | 11/1999 | Mahoney et al. |
| 6,021,821 A | 2/2000 | Wegman |
| 6,024,141 A | 2/2000 | Wegman |
| 6,029,879 A | 2/2000 | Cocks |
| 6,045,027 A | 4/2000 | Rosen et al. |
| 6,045,028 A | 4/2000 | Martin et al. |
| 6,050,474 A | 4/2000 | Aota et al. |
| 6,050,475 A | 4/2000 | Kinton et al. |
| 6,051,325 A | 4/2000 | Talwar et al. |
| 6,053,391 A | 4/2000 | Heideman et al. |
| 6,070,784 A | 6/2000 | Holt et al. |
| 6,119,624 A | 9/2000 | Morikawa et al. |
| 6,138,895 A | 10/2000 | Oelgoetz et al. |
| 6,168,066 B1 | 1/2001 | Arbegast |
| 6,168,067 B1 | 1/2001 | Waldron et al. |
| 6,173,880 B1 | 1/2001 | Ding et al. |
| 6,193,137 B1 | 2/2001 | Ezumi et al. |
| 6,199,745 B1 | 3/2001 | Campbell et al. |
| 6,206,268 B1 | 3/2001 | Mahoney |
| 6,213,379 B1 | 4/2001 | Takeshita et al. |
| 6,227,430 B1 | 5/2001 | Rosen et al. |
| 6,230,957 B1 | 5/2001 | Arbegast et al. |
| 6,237,829 B1 | 5/2001 | Aota et al. |
| 6,237,835 B1 | 5/2001 | Litwinski et al. |
| 6,247,633 B1 | 6/2001 | White et al. |
| 6,247,634 B1 | 6/2001 | Whitehouse |
| 6,250,037 B1 | 6/2001 | Ezumi et al. |
| 6,257,479 B1 | 7/2001 | Litwinski et al. |
| 6,259,052 B1 | 7/2001 | Ding et al. |
| 6,264,088 B1 | 7/2001 | Larsson |
| 6,273,323 B1 | 8/2001 | Ezumi et al. |
| 6,276,591 B1 | 8/2001 | Kawasaki et al. |
| 6,290,117 B1 | 9/2001 | Kawasaki et al. |
| 6,299,048 B1 | 10/2001 | Larsson |
| 6,299,050 B1 * | 10/2001 | Okamura ............. B23K 20/123 156/73.5 |
| 6,302,315 B1 | 10/2001 | Thompson |
| 6,305,866 B1 | 10/2001 | Aota et al. |
| 6,311,889 B1 | 11/2001 | Ezumi et al. |
| 6,315,187 B1 | 11/2001 | Satou et al. |
| 6,321,975 B1 | 11/2001 | Kawasaki et al. |
| 6,325,273 B1 | 12/2001 | Boon et al. |
| 6,325,274 B2 | 12/2001 | Ezumi et al. |
| 6,328,261 B1 | 12/2001 | Wollaston et al. |
| 6,352,193 B1 | 3/2002 | Bellino et al. |
| 6,354,483 B1 | 3/2002 | Ezumi et al. |
| 6,358,397 B1 | 3/2002 | Lyublinski |
| 6,360,937 B1 | 3/2002 | De Koning |
| 6,364,197 B1 | 4/2002 | Oelgoetz et al. |
| 6,367,681 B1 | 4/2002 | Waldron et al. |
| 6,378,264 B1 | 4/2002 | Kawasaki et al. |
| 6,378,754 B2 | 4/2002 | Aota et al. |
| 6,382,498 B2 | 5/2002 | Aota et al. |
| 6,386,425 B2 | 5/2002 | Kawasaki et al. |
| 6,398,883 B1 | 6/2002 | Forrest et al. |
| 6,413,610 B1 | 7/2002 | Nakamura et al. |
| 6,419,142 B1 | 7/2002 | Larsson |
| 6,419,144 B2 | 7/2002 | Aota |
| 6,421,578 B1 | 7/2002 | Adams et al. |
| 6,422,449 B1 | 7/2002 | Ezumi et al. |
| 6,450,394 B1 | 9/2002 | Wollaston et al. |
| 6,450,395 B1 | 9/2002 | Weeks et al. |
| 6,457,629 B1 | 10/2002 | White |
| 6,460,752 B1 | 10/2002 | Waldron et al. |
| 6,461,072 B2 | 10/2002 | Kawasaki et al. |

(56) References Cited

U.S. PATENT DOCUMENTS

| | | |
|---|---|---|
| 6,464,127 B2 | 10/2002 | Litwinski et al. |
| 6,468,067 B1 | 10/2002 | Ikegami |
| 6,471,112 B2 | 10/2002 | Satou et al. |
| 6,474,533 B1 | 11/2002 | Ezumi et al. |
| 6,484,924 B1 | 11/2002 | Forrest |
| 6,494,011 B2 | 12/2002 | Ezumi et al. |
| 6,497,355 B1 | 12/2002 | Ding et al. |
| 6,499,649 B2 | 12/2002 | Sayama et al. |
| 6,502,739 B2 | 1/2003 | Ezumi et al. |
| 6,513,698 B2 | 2/2003 | Ezumi et al. |
| 6,516,992 B1 | 2/2003 | Colligan |
| 6,527,470 B2 | 3/2003 | Ezumi et al. |
| 6,536,651 B2 | 3/2003 | Ezumi et al. |
| 6,543,670 B2 | 4/2003 | Mahoney |
| 6,543,671 B2 | 4/2003 | Hatten et al. |
| 6,572,007 B1 | 6/2003 | Stevenson et al. |
| 6,582,832 B2 | 6/2003 | Kawasaki et al. |
| 6,599,641 B1 | 7/2003 | Nakamura et al. |
| 6,648,206 B2 | 11/2003 | Nelson et al. |
| 6,669,075 B2 | 12/2003 | Colligan |
| 6,676,004 B1 | 1/2004 | Trapp et al. |
| 6,676,008 B1 | 1/2004 | Trapp et al. |
| 6,722,556 B2 | 4/2004 | Schilling et al. |
| 6,732,901 B2 | 5/2004 | Nelson et al. |
| 6,745,929 B1 | 6/2004 | Ezumi et al. |
| 6,758,382 B1 | 7/2004 | Carter |
| 6,769,743 B1 | 8/2004 | Aasen et al. |
| 6,779,704 B2 | 8/2004 | Nelson et al. |
| 6,811,632 B2 | 11/2004 | Nelson et al. |
| 6,866,181 B2 | 3/2005 | Aota et al. |
| 6,908,690 B2 | 6/2005 | Waldron et al. |
| 6,953,140 B2 | 10/2005 | Park et al. |
| 7,036,708 B2 | 5/2006 | Park et al. |
| 7,066,375 B2 | 6/2006 | Bolser |
| 7,115,324 B1 | 10/2006 | Stol et al. |
| 7,124,929 B2 | 10/2006 | Nelson et al. |
| 7,152,776 B2 | 12/2006 | Nelson et al. |
| 7,156,276 B2 | 1/2007 | Slattery |
| 7,163,136 B2 | 1/2007 | Hempstead |
| 7,240,821 B2 | 7/2007 | Talwar |
| 7,416,102 B1* | 8/2008 | Trapp ................. B23K 20/1225 228/112.1 |
| 7,445,212 B2 | 11/2008 | Gail et al. |
| 7,455,212 B2 | 11/2008 | Mika |
| 7,597,236 B2 | 10/2009 | Tolle et al. |
| 7,608,296 B2 | 10/2009 | Packer et al. |
| 7,624,910 B2 | 12/2009 | Barnes et al. |
| 7,661,572 B2 | 2/2010 | Nelson et al. |
| 7,732,033 B2 | 6/2010 | Aken et al. |
| 7,918,379 B2 | 4/2011 | Fujii et al. |
| 7,971,770 B2 | 7/2011 | Nakagawa et al. |
| 7,992,759 B2 | 8/2011 | Steel et al. |
| 8,052,034 B2 | 11/2011 | Fleming et al. |
| 8,061,579 B2 | 11/2011 | Feng et al. |
| 8,100,316 B2 | 1/2012 | Goehlich et al. |
| 8,220,693 B2 | 7/2012 | Krajewski et al. |
| 8,317,080 B2 | 11/2012 | Kingston et al. |
| 8,397,974 B2 | 3/2013 | Schultz et al. |
| 8,464,926 B2 | 6/2013 | Kou et al. |
| 8,479,970 B2 | 7/2013 | Ishibashi et al. |
| 8,490,855 B2 | 7/2013 | Kingston et al. |
| 8,632,850 B2 | 1/2014 | Schultz et al. |
| 8,636,194 B2 | 1/2014 | Schultz et al. |
| 8,678,268 B1 | 3/2014 | Obadtich et al. |
| 8,714,431 B2 | 5/2014 | Roos et al. |
| 8,857,696 B1 | 10/2014 | Merah et al. |
| 8,875,976 B2 | 11/2014 | Schultz et al. |
| 8,893,954 B2 | 11/2014 | Schultz et al. |
| 9,010,613 B1 | 4/2015 | Matlack et al. |
| 9,205,578 B2 | 12/2015 | Schultz et al. |
| 9,266,191 B2 | 2/2016 | Kandasamy et al. |
| 9,511,445 B2 | 12/2016 | Kandasamy |
| 9,511,446 B2 | 12/2016 | Kandasamy et al. |
| 9,643,279 B2 | 5/2017 | Schulz |
| 9,862,054 B2 | 1/2018 | Kandasamy et al. |
| 9,943,929 B2 | 4/2018 | Schultz et al. |
| 10,016,839 B1* | 7/2018 | Iqbal ......................... B22F 9/14 |
| 10,105,790 B2 | 10/2018 | Kandasamy |
| 10,500,674 B2 | 12/2019 | Kandasamy et al. |
| 10,583,631 B2 | 3/2020 | Kandasamy et al. |
| 2001/0011674 A1 | 8/2001 | Ezumi et al. |
| 2001/0019073 A1* | 9/2001 | Ezumi ................. B23K 20/122 228/112.1 |
| 2002/0011509 A1 | 1/2002 | Nelson et al. |
| 2002/0014516 A1 | 2/2002 | Nelson et al. |
| 2002/0050508 A1* | 5/2002 | Yoshinaga ............. B23Q 1/012 228/112.1 |
| 2002/0168466 A1 | 11/2002 | Tapphorn et al. |
| 2002/0179682 A1 | 12/2002 | Schilling et al. |
| 2003/0010805 A1 | 1/2003 | Nelson et al. |
| 2003/0042292 A1* | 3/2003 | Hatten ................. B23K 20/128 228/112.1 |
| 2003/0075584 A1 | 4/2003 | Sarik et al. |
| 2003/0098336 A1 | 5/2003 | Yamashita |
| 2003/0111147 A1 | 6/2003 | Keener et al. |
| 2003/0111514 A1 | 6/2003 | Miyanagi et al. |
| 2003/0192941 A1* | 10/2003 | Ishida ................. B23K 20/123 228/112.1 |
| 2003/0218052 A2 | 11/2003 | Litwinski |
| 2003/0226935 A1 | 12/2003 | Garratt et al. |
| 2004/0003911 A1 | 1/2004 | Vining et al. |
| 2004/0055349 A1 | 3/2004 | El-Soudani |
| 2004/0057782 A1 | 3/2004 | Okamoto et al. |
| 2004/0074944 A1* | 4/2004 | Okamoto ............. B23K 20/122 228/2.1 |
| 2004/0074948 A1* | 4/2004 | Kusunoki ........... B23K 20/1215 228/112.1 |
| 2004/0074949 A1 | 4/2004 | Narita et al. |
| 2004/0079634 A1 | 4/2004 | Wickersham et al. |
| 2004/0107019 A1 | 6/2004 | Keshavmurthy et al. |
| 2004/0118899 A1 | 6/2004 | Aota et al. |
| 2004/0134971 A1 | 7/2004 | Narita et al. |
| 2004/0134972 A1 | 7/2004 | Nelson et al. |
| 2004/0149807 A1 | 8/2004 | Schilling et al. |
| 2004/0155093 A1 | 8/2004 | Nelson et al. |
| 2004/0159696 A1 | 8/2004 | Mahoney et al. |
| 2004/0195291 A1 | 10/2004 | Andersson et al. |
| 2004/0265503 A1 | 12/2004 | Clayton et al. |
| 2005/0001010 A1* | 1/2005 | Koga ................. B23K 37/0443 228/2.1 |
| 2005/0006439 A1 | 1/2005 | Packer et al. |
| 2005/0045694 A1 | 3/2005 | Subramanian et al. |
| 2005/0045695 A1 | 3/2005 | Subramanian et al. |
| 2005/0051599 A1 | 3/2005 | Park et al. |
| 2005/0060888 A1 | 3/2005 | Park et al. |
| 2005/0104241 A1 | 5/2005 | Kritchman et al. |
| 2005/0121497 A1 | 6/2005 | Fuller et al. |
| 2005/0127139 A1 | 6/2005 | Slattery et al. |
| 2005/0210820 A1 | 9/2005 | Tanaka et al. |
| 2005/0242158 A1 | 11/2005 | Bolser |
| 2005/0247756 A1 | 11/2005 | Frazer et al. |
| 2005/0254955 A1 | 11/2005 | Helder et al. |
| 2006/0016854 A1 | 1/2006 | Slattery |
| 2006/0032891 A1 | 2/2006 | Flak et al. |
| 2006/0043151 A1 | 3/2006 | Stol et al. |
| 2006/0060635 A1 | 3/2006 | Slattery et al. |
| 2006/0086775 A1 | 4/2006 | Trapp et al. |
| 2006/0096740 A1 | 5/2006 | Zheng |
| 2006/0165486 A1 | 7/2006 | Ungurean |
| 2006/0208034 A1 | 9/2006 | Packer et al. |
| 2006/0289603 A1 | 12/2006 | Zettler et al. |
| 2007/0034671 A1* | 2/2007 | Burton ................. B23K 31/12 228/2.1 |
| 2007/0040006 A1* | 2/2007 | Charles R. ......... B23K 20/1275 228/112.1 |
| 2007/0044406 A1 | 3/2007 | Aken et al. |
| 2007/0075121 A1 | 4/2007 | Slattery |
| 2007/0102492 A1 | 5/2007 | Nelson et al. |
| 2007/0128463 A1 | 6/2007 | Dixon et al. |
| 2007/0138236 A1 | 6/2007 | Agarwal et al. |
| 2007/0187465 A1 | 8/2007 | Eyre et al. |
| 2007/0215675 A1 | 9/2007 | Barnes |
| 2007/0241164 A1 | 10/2007 | Barnes et al. |

(56) References Cited

U.S. PATENT DOCUMENTS

| | | |
|---|---|---|
| 2007/0295781 A1 | 12/2007 | Hunt et al. |
| 2007/0297935 A1 | 12/2007 | Langan et al. |
| 2008/0006678 A1 | 1/2008 | Packer et al. |
| 2008/0023524 A1 | 1/2008 | Ohashi et al. |
| 2008/0032153 A1* | 2/2008 | Vaughn ............... B23K 26/009 428/615 |
| 2008/0041921 A1 | 2/2008 | Creehan et al. |
| 2008/0047222 A1 | 2/2008 | Barnes |
| 2008/0099533 A1* | 5/2008 | Hanlon ............. B29C 66/73921 228/112.1 |
| 2008/0135405 A1 | 6/2008 | Hori et al. |
| 2008/0230584 A1* | 9/2008 | Lederich ............ B23K 20/1225 228/112.1 |
| 2008/0245517 A1 | 10/2008 | Ishikawa et al. |
| 2009/0014497 A1* | 1/2009 | Ryu ..................... H01M 8/0297 228/2.3 |
| 2009/0068492 A1* | 3/2009 | Fujii .................. B23K 20/1255 428/615 |
| 2009/0090700 A1 | 4/2009 | Sato et al. |
| 2009/0123778 A1* | 5/2009 | Russell .............. B23K 20/1275 428/661 |
| 2009/0152328 A1 | 6/2009 | Okamoto et al. |
| 2009/0188101 A1 | 7/2009 | Durandet et al. |
| 2009/0200275 A1 | 8/2009 | Twelves et al. |
| 2009/0236028 A1 | 9/2009 | Fukuda |
| 2009/0236403 A1 | 9/2009 | Feng et al. |
| 2009/0258232 A1 | 10/2009 | Brice |
| 2009/0266870 A1 | 10/2009 | Yousefiani et al. |
| 2009/0291322 A1 | 11/2009 | Watanabe et al. |
| 2010/0037998 A1 | 2/2010 | Bray et al. |
| 2010/0065611 A1 | 3/2010 | Fukuda |
| 2010/0068550 A1 | 3/2010 | Watson et al. |
| 2010/0089976 A1 | 4/2010 | Szymanski et al. |
| 2010/0089977 A1 | 4/2010 | Chen et al. |
| 2010/0101768 A1 | 4/2010 | Seo et al. |
| 2010/0136369 A1* | 6/2010 | Ayer .................... C22C 38/001 428/683 |
| 2010/0146866 A1 | 6/2010 | Nelson et al. |
| 2010/0173123 A1* | 7/2010 | Zardus ................. F16B 11/006 428/137 |
| 2010/0176182 A1* | 7/2010 | Hanlon .............. B23K 20/1245 228/2.1 |
| 2010/0213244 A1* | 8/2010 | Miryekta ........... B23K 37/0229 228/112.1 |
| 2010/0252170 A1 | 10/2010 | Feng et al. |
| 2010/0252614 A1 | 10/2010 | Fujii et al. |
| 2010/0258612 A1 | 10/2010 | Kolbeck et al. |
| 2010/0282717 A1 | 11/2010 | Ananthanarayanan |
| 2010/0284850 A1 | 11/2010 | Hawk |
| 2010/0285207 A1 | 11/2010 | Creehan et al. |
| 2010/0297469 A1 | 11/2010 | Aota et al. |
| 2011/0062219 A1 | 3/2011 | Bezaire et al. |
| 2011/0073634 A1* | 3/2011 | Packer ................ B23K 20/127 228/2.3 |
| 2011/0132968 A1 | 6/2011 | Nakagawa et al. |
| 2011/0132970 A1 | 6/2011 | Nakagawa et al. |
| 2011/0227590 A1 | 9/2011 | Killian et al. |
| 2011/0266330 A1* | 11/2011 | Bruck ................. B23K 20/128 228/112.1 |
| 2011/0293840 A1* | 12/2011 | Newkirk ................ C23C 4/123 427/367 |
| 2011/0309131 A1* | 12/2011 | Hovanski ........... B23K 20/1255 228/124.1 |
| 2012/0009339 A1* | 1/2012 | Creehan ............. B23K 20/1275 427/180 |
| 2012/0040581 A1 | 2/2012 | Kim |
| 2012/0058359 A1 | 3/2012 | Kingston et al. |
| 2012/0114897 A1 | 5/2012 | Thiagarajan et al. |
| 2012/0132342 A1 | 5/2012 | Kato et al. |
| 2012/0202089 A1 | 8/2012 | Hangai et al. |
| 2012/0237788 A1 | 9/2012 | Fujii et al. |
| 2012/0273113 A1 | 11/2012 | Hovanski et al. |
| 2012/0279043 A1 | 11/2012 | Carter |
| 2012/0279271 A1 | 11/2012 | Carter |
| 2012/0279441 A1* | 11/2012 | Creehan ................. C23C 24/06 118/76 |
| 2012/0279442 A1* | 11/2012 | Creehan ................. C23C 24/06 118/76 |
| 2012/0321904 A1* | 12/2012 | Ishibashi ............ B23K 20/1265 428/600 |
| 2012/0325894 A1 | 12/2012 | Chun et al. |
| 2013/0098973 A1 | 4/2013 | Kingston et al. |
| 2013/0112736 A1* | 5/2013 | Kato ................... B23K 20/1265 228/112.1 |
| 2013/0299561 A1* | 11/2013 | Higgins ............... B23K 20/128 228/114 |
| 2014/0061185 A1 | 3/2014 | Schindele |
| 2014/0130736 A1 | 5/2014 | Schultz et al. |
| 2014/0134325 A1 | 5/2014 | Schultz et al. |
| 2014/0150955 A1 | 6/2014 | Slattery |
| 2014/0166731 A1 | 6/2014 | Seo et al. |
| 2014/0174344 A1 | 6/2014 | Schultz et al. |
| 2015/0045928 A1 | 2/2015 | Perez et al. |
| 2015/0129808 A1 | 5/2015 | Mrozek et al. |
| 2015/0165546 A1* | 6/2015 | Kandasamy ....... B23K 20/1245 228/114 |
| 2015/0336292 A1 | 11/2015 | Mikulak et al. |
| 2015/0352770 A1 | 12/2015 | Busenbecker |
| 2016/0007474 A1 | 1/2016 | Dardona et al. |
| 2016/0074958 A1 | 3/2016 | Kandasamy et al. |
| 2016/0107262 A1 | 4/2016 | Schultz et al. |
| 2016/0137900 A1 | 5/2016 | Lin |
| 2016/0175981 A1* | 6/2016 | Kandasamy ....... B23K 20/1245 228/114.5 |
| 2016/0175982 A1* | 6/2016 | Kandasamy ......... B23K 20/127 403/272 |
| 2016/0184922 A1* | 6/2016 | Ki ...................... B23K 20/1265 228/114.5 |
| 2016/0185009 A1 | 6/2016 | Keshavan et al. |
| 2016/0193689 A1* | 7/2016 | Sugimoto ............. B23K 20/12 228/114.5 |
| 2016/0228981 A1* | 8/2016 | Matsushita ........ B23K 20/1235 |
| 2016/0325374 A1 | 11/2016 | Hori et al. |
| 2016/0325818 A1 | 11/2016 | Williams et al. |
| 2016/0351300 A1 | 12/2016 | Daniel et al. |
| 2016/0354861 A1* | 12/2016 | Xu ....................... B23K 20/227 |
| 2016/0355902 A1* | 12/2016 | Yang ...................... B23K 9/23 |
| 2017/0008236 A1 | 1/2017 | Easter et al. |
| 2017/0043429 A1 | 2/2017 | Kandasamy |
| 2017/0054118 A1 | 2/2017 | Aston et al. |
| 2017/0057204 A1 | 3/2017 | Kandasamy et al. |
| 2017/0129170 A1 | 5/2017 | Kim et al. |
| 2017/0197274 A1 | 7/2017 | Steel et al. |
| 2017/0216962 A1 | 8/2017 | Schultz et al. |
| 2017/0304933 A1* | 10/2017 | Miles ..................... B23K 9/042 |
| 2017/0312850 A1* | 11/2017 | Werz ................... B23K 20/1255 |
| 2017/0321083 A1 | 11/2017 | Fenn et al. |
| 2018/0021881 A1* | 1/2018 | Weigl ................. B23K 20/1285 228/103 |
| 2018/0021882 A1* | 1/2018 | Yamamoto ......... B23K 20/1235 228/2.1 |
| 2018/0043466 A1* | 2/2018 | Matsushita ........ B23K 20/1235 |
| 2018/0050419 A1 | 2/2018 | Das et al. |
| 2018/0080103 A1* | 3/2018 | Plotkowski ............. C21D 1/10 |
| 2018/0085849 A1 | 3/2018 | Kandasamy et al. |
| 2018/0221987 A1* | 8/2018 | Weigl ................. B23K 20/1255 |
| 2018/0281236 A1 | 10/2018 | Elgar et al. |
| 2018/0361501 A1* | 12/2018 | Hardwick ........... B23K 20/227 |
| 2019/0001437 A1 | 1/2019 | Mathisen et al. |
| 2019/0111514 A1* | 4/2019 | Matsushita ........ B23K 20/1225 |
| 2020/0306869 A1* | 10/2020 | Hardwick ............. B22F 10/20 |
| 2020/0306871 A1* | 10/2020 | Matsushita ........... B23K 20/24 |

FOREIGN PATENT DOCUMENTS

| | | |
|---|---|---|
| CN | 101437642 A | 5/2009 |
| CN | 101537529 A * | 9/2009 |
| CN | 101537529 A | 9/2009 |
| CN | 102120287 | 7/2013 |
| CN | 102120287 B | 7/2013 |
| CN | 203738226 | 7/2014 |
| CN | 106112254 A | 11/2016 |

(56) References Cited

FOREIGN PATENT DOCUMENTS

| | | | | |
|---|---|---|---|---|
| CN | 106112254 A | 11/2016 | | |
| CN | 106125169 A | 11/2016 | | |
| CN | 106181020 A | * 12/2016 | | |
| CN | 108176913 A | 6/2018 | | |
| CN | 108176913 A | 6/2018 | | |
| CN | 106112254 B | 8/2018 | | |
| CN | 111655403 A | 9/2020 | | |
| EP | 0453182 A | 10/1991 | | |
| EP | 0458774 A | 11/1991 | | |
| EP | 0458774 A1 | 11/1991 | | |
| EP | 0410104 B1 | 7/1993 | | |
| EP | 0597335 A | 5/1994 | | |
| EP | 0597335 A1 | 5/1994 | | |
| EP | 1206995 A2 | 5/2002 | | |
| EP | 1543913 A2 | 6/2005 | | |
| EP | 1790425 A1 | 5/2007 | | |
| EP | 1543913 B1 | 8/2007 | | |
| EP | 2000245 A2 | * 12/2008 | ............ | B23K 28/02 |
| EP | 1790425 B1 | 10/2011 | | |
| EP | 2774745 A1 | 9/2014 | | |
| EP | 2783976 A1 | 10/2014 | | |
| EP | 3703888 A1 | 9/2020 | | |
| GB | 572789 A | 10/1945 | | |
| GB | 1224891 A | 3/1971 | | |
| GB | 2270864 A | 3/1994 | | |
| GB | 2306366 A | 5/1997 | | |
| JP | 10286682 | 10/1998 | | |
| JP | 11156561 | 6/1999 | | |
| JP | 11156561 A | * 6/1999 | ........... | B23K 20/124 |
| JP | 11267857 | 10/1999 | | |
| JP | 11320128 | 11/1999 | | |
| JP | 2001219281 A | * 8/2001 | ......... | B23K 20/1265 |
| JP | 2001219281 A | 8/2001 | | |
| JP | 2002153976 | 5/2002 | | |
| JP | 2002192358 | 7/2002 | | |
| JP | 2002256453 A | 9/2002 | | |
| JP | 2002283069 | 10/2002 | | |
| JP | 2004025296 | 1/2004 | | |
| JP | 2004025296 A | * 1/2004 | ............ | B23K 20/124 |
| JP | 2004261859 | 9/2004 | | |
| JP | 2004298955 | 10/2004 | | |
| JP | 2004344906 A | 12/2004 | | |
| JP | 2007222925 | 9/2007 | | |
| JP | 2007283317 | 11/2007 | | |
| JP | 2008254047 | 10/2008 | | |
| JP | 2009148821 | 7/2009 | | |
| JP | 2010149134 | 7/2010 | | |
| JP | 2010279958 A | 12/2010 | | |
| JP | 2011056582 | 3/2011 | | |
| JP | 2011079031 A | 4/2011 | | |
| JP | 2013049091 | 3/2013 | | |
| JP | 2015085382 A | 5/2015 | | |
| KR | 101099863 B1 | 12/2011 | | |
| KR | 101256970 | 4/2013 | | |
| KR | 101278097 B1 | 6/2013 | | |
| KR | 102273514 B1 | 7/2021 | | |
| RU | 2620435 C1 | 5/2017 | | |
| SU | 266539 A | 11/1976 | | |
| SU | 1393566 | 5/1988 | | |
| WO | 1993010935 A1 | 6/1993 | | |
| WO | 0174525 | 10/2001 | | |
| WO | 2011137300 A2 | 11/2011 | | |
| WO | WO-2012133411 A1 | * 10/2012 | ............ | B23K 11/318 |
| WO | 2013002869 A2 | 1/2013 | | |
| WO | 2013095031 A1 | 6/2013 | | |
| WO | 2017005578 A1 | 1/2017 | | |
| WO | 2019089764 A1 | 5/2019 | | |
| WO | 2019178138 A3 | 10/2019 | | |
| WO | 2019246251 A9 | 1/2020 | | |
| WO | 2020055989 A1 | 3/2020 | | |
| WO | 2020106952 A1 | 5/2020 | | |

OTHER PUBLICATIONS (Hardwick, Nanci et al.) Co-pending International Application No. PCT/US18/58470 filed Oct. 31, 2018, Specification, Claims, Figures.

Co-pending International Application No. PCT/US18/58470 International Search Report and Written Opinion, dated Feb. 25, 2019, 15 pages.

Co-pending International Application No. PCT/US18/58470 Invitation to Pay Additional Fees, dated Jan. 7, 2019, 3 pages.

Co-pending International Application No. PCT/US18/58470 Response to Invitation to Pay Additional Fees filed Feb. 6, 2019, 2 pages.

"Why is Carbon black conductive and Activated carbon is not that conductive?", ResearchGate, Apr. 4, 2016 [retrieved Jan. 4, 2020], retrieved from the internet: , 8 pp.

(Broach, Anita T. et al.) Co-pending Application No. PCT/US19/37968 filed Jun. 19, 2019.

(Broach, Anita T. et al.) Co-pending Application No. PCT/US19/50595, filed Sep. 11, 2019, Specification, Claims, Figures.

(Cox, Chase et al.) Co-pending Application No. PCT/US19/62604, filed Nov. 21, 2019, Specification, Claims, Figures.

(Creehan, Kevin et al.) Co-pending U.S. Appl. No. 11/527,149, filed Sep. 26, 2006 (published as 2008/0041921 on Feb. 21, 2008), now abandoned.

(Creehan, Kevin et al.) Co-pending Application No. PCT/US12/32793 filed Apr. 9, 2012 (published as WO2013/002869 on Jan. 3, 2013).

(Hardwick, Nanci et al.) Co-pending Application No. AU 2018359514, filed May 29, 2020, Specification, Claims, Figures.

(Hardwick, Nanci et al.) Co-pending Application No. CA 3,081,330, filed Apr. 30, 2020, Specification, Claims, Figures (See PCT/US18/58470).

(Hardwick, Nanci et al.) Co-pending Application No. CN 201880084770.5, filed Jun. 29, 2020, Specification, Claims, Figures (See PCT/US18/58470 for English Version).

(Hardwick, Nanci et al.) Co-pending Application No. EP 18873980.9, filed Jun. 2, 2020, Claims and PPH request (attached, 12 pages), Specification and Figures (see PCT/US2018/058470).

(Hardwick, Nanci et al.) Co-pending Application No. JP 2020-536809, filed Apr. 30, 2020, Specification, Claims, Figures (see PCT/US18/58470).

(Hardwick, Nanci et al.) Co-pending Application No. KR 10-2020-7015489, filed May 29, 2020, Specification, Claims, and Figures (Korean Translation dated Jun. 25, 2020, 184 pages), with English Version of Claims, 7 pages.

(Hardwick, Nanci et al.) Co-pending Application No. PCT/US18/58470 filed Oct. 31, 2018 (published as WO2019/089764 on May 9, 2019).

(Kandasamy, Kumar et al.) Co-Pending U.S. Appl. No. 14/573,430, filed Dec. 17, 2014, Published as US2015/0165546 on Jun. 18, 2015, and Issued as U.S. Pat. No. 9,266,191 on Feb. 23, 2016.

(Kandasamy, Kumar et al.) Co-Pending U.S. Appl. No. 14/643,396, filed Mar. 10, 2015.

(Kandasamy, Kumar et al.) Co-Pending U.S. Appl. No. 14/954,104, filed Nov. 30, 2015, published as US20160074958 on Mar. 17, 2016.

(Kandasamy, Kumar et al.) Co-No. U.S. Appl. No. 15/347,818, filed Nov. 10, 2016, published as US 2017-0057204 on Mar. 2, 2017.

(Kandasamy, Kumar et al.) Co-Pending U.S. Appl. No. 15/829,038, filed Dec. 1, 2017, Published as US2018/0085849 on Mar. 29, 2018.

(Kandasamy, Kumar) Co-Pending U.S. Appl. No. 14/640,077, filed Mar. 6, 2015, published as US2016/0175981 on Jun. 23, 2016 and Issued as U.S. Pat. No. 9,511,445 on Dec. 6, 2016.

(Kandasamy, Kumar) Co-Pending U.S. Appl. No. 15/334,392, filed Oct. 26, 2016, published as US20170043429 on Feb. 16, 2017.

(Lalande, Frederic et al.) Co-pending Application No. PCT/US19/21910 filed Mar. 12, 2019.

(Schultz, Jeffrey Patrick et al.) Co-pending U.S. Appl. No. 12/792,655, filed Jun. 2, 2010 (published as 2010/0285207 on Nov. 11, 2010, now U.S. Pat. No. 8,636,194 issued on Jan. 28, 2014).

(56) References Cited

OTHER PUBLICATIONS (Schultz, Jeffrey Patrick et al.) Co-pending U.S. Appl. No. 14/163,253, filed Jan. 24, 2014, Published as US2014/0134325 on May 15, 2014, and Issued as U.S. Pat. No. 8,893,954 on Nov. 25, 2014.
(Schultz, Jeffrey Patrick et al.) Co-pending U.S. Appl. No. 15/489,389, filed Apr. 17, 2017.
(Schultz, Jeffrey Patrick et al.) Co-pending U.S. Appl. No. 12/987,588, filed Jan. 10, 2011 (published as 2012/0009339 on Jan. 12, 2012), now U.S. Pat. No. 8,632,850 issued on Jan. 21, 2014.
(Schultz, Jeffrey Patrick et al.) Co-Pending U.S. Appl. No. 13/442,201, filed Apr. 9, 2012, Published as US2012/0279441 on Nov. 8, 2012, and Issued as U.S. Pat. No. 8,875,976 on Nov. 4, 2014.
(Schultz, Jeffrey Patrick et al.) Co-pending U.S. Appl. No. 13/442,285, filed Apr. 9, 2012 (published as 2012/0279442 on Nov. 8, 2012), now U.S. Pat. No. 8,397,974 issued on Mar. 19, 2013.
(Schultz, Jeffrey Patrick et al.) Co-pending U.S. Appl. No. 14/159,105, filed Jan. 20, 2014, Published as US2014/0130736 on May 15, 2014, and Issued as U.S. Pat. No. 9,205,578 on Dec. 8, 2015.
(Schultz, Jeffrey Patrick et al.) Co-Pending U.S. Appl. No. 14/193,579, filed Feb. 28, 2014 (Published as US 2014/0174344 on Jun. 26, 2014).
(Schultz, Jeffrey Patrick et al.) Co-Pending U.S. Appl. No. 14/926,447, filed Oct. 29, 2015, published as US2016/0107262 on Apr. 21, 2016, issued as U.S. Pat. No. 9,643,279 on May 9, 2017.
Berbon et al., Friction stir processing: a tool to homogenize nanocomposite aluminum alloys, Scripta Materialia, vol. 44, No. 1, pp. 61-66, Jan. 5, 2001.
Co-Pending Application No. AU 2018359514, Acceptance of Post Issue Amendment, dated Feb. 19, 2021, 2 pages.
Co-Pending Application No. AU 2018359514, Examination Report No. 1 dated Jun. 12, 2020, 4 pages.
Co-Pending Application No. AU 2018359514, Notice of Acceptance dated Sep. 29, 2020, 3 pages.
Co-Pending Application No. AU 2018359514, Notice of Grant, dated Jan. 21, 2021, 1 page.
Co-Pending Application No. AU 2018359514, Patent Certificate, dated Jan. 21, 2021, 1 page.
Co-Pending Application No. AU 2018359514, Post Grant Amendment, dated Jan. 22, 2021, 14 pages.
Co-Pending Application No. AU 2018359514, Response to First Examination Report filed Aug. 28, 2020, 101 pages.
Co-Pending Application No. CN 201880084770.5, First Office Action and Search Report dated Dec. 2, 2020, 11 pages (with English version, 11 pages).
Co-Pending Application No. CN 201880084770.5, Initiative Amendment filed Sep. 22, 2020, 12 pages (with English version of amended claims, 7 pages).
Co-Pending Application No. JP 2020-536809, Office Action dated Nov. 10, 2020, 4 pages (English Translation, 4 pages).
Co-Pending Application No. JP 2020-536809, Response to Nov. 10, 2020 Office Action filed Feb. 8, 2021, 7 pages (with English version, 9 pages).
Co-Pending Application No. JP 2020-536809, Voluntary Amendment and Japanese Translation of Specification, Claims, and Figures filed Jun. 29, 2020 (113 pages) with English Version of the Claims (6 pages).
Co-Pending Application No. KR 10-2020-7015489, Amendment, dated Feb. 15, 2021, 17 pages (with English Version of claims, 8 pages).
Co-Pending Application No. KR 10-2020-7015489, Notice of Preliminary Rejection dated Nov. 12, 2020, 4 pages (with English Version, 2 pages).
Co-Pending Application No. KR 10-2020-7015489, Response to Nov. 12, 2020 Notice of Preliminary Rejection, dated Feb. 15, 2021, 8 pages.
Co-Pending Application No. PCT/US18/58470, International Search Report and Written Opinion dated Feb. 25, 2019, 15 pages.
Co-Pending Application No. PCT/US19/21910, International Search Report and Written Opinion dated Sep. 11, 2019, 18 pages.
Co-Pending Application No. PCT/US19/37968, International Search Report and Written Opinion dated Dec. 6, 2019, 15 pages.
(Hardwick, Nanci et al.) Co-Pending U.S. Appl. No. 17/220,214, filed Apr. 1, 2021, Specification, claims, and figures.
(Hardwick, Nanci) Co-Pending U.S. Appl. No. 16/115,044, filed Aug. 28, 2018, published as US20180361501 on Dec. 26, 2018.
Co-Pending Application No. CN 201880084770.5, Response to Dec. 2, 2020 Office Action, dated Apr. 19, 2021, 20 pages (with English version of the claims, 9 pages).
Co-Pending Application No. JP 2020-536809, Office Action dated Apr. 9, 2021, 5 pages (English Translation, 6 pages).
Co-Pending Application No. PCT/US19/50595, International Search Report and Written Opinion dated Jan. 27, 2020, 16 pages.
Co-Pending Application No. PCT/US19/62604, International Search Report and Written Opinion dated Apr. 24, 2020, 20 pages.
Co-Pending U.S. Appl. No. 11/527,149, Examiner Interview Summary dated Jul. 6, 2009, 21 pages.
Co-Pending International Application No. PCT/US18/58470 International Preliminary Report on Patentability dated May 5, 2020, 10 pages.
Davis, JR, editor, Handbook of Thermal Spray Technology, ASM International (2004), pp. 138-139.
English translation of Chinese Patent No. CN106112254A.
English translation of Koren Patent No. KR10-1099863B1.
Friction Stir Tooling: Tool Materials and Designs, Chapter 2 in Friction Stir Welding and Processing, pp. 7-35, ASM International, Editors Rajiv S. Mishra & Murray W. Mahoney, 2007.
Geiger et al., "Friction stir knead welding of steel aluminum butt joints." International Journal of Machine Tools & Manufacture, vol. 48, pp. 515-521, 2008.
International Preliminary Report on Patentability of International Application No. PCT/US2012/032793, dated Oct. 8, 2013, 7 pages.
International Search Report and Written Opinion of International Application No. PCT/US2012/032793, dated Dec. 18, 2012.
Kallee et al., "Friction stir welding—invention, innovations and applications." INALCO 2001, 8th International Conference on Joints in Aluminium, Munich, Germany, 19 pages.
Metal-Matrix Composites (ASM Metals Handbook Online, ASM International, 2002), Introduction, Aluminum-Matrix Composites.
Rivera, O.G. et al. "Microstructures and mechanical behavior of Inconel 625 fabricated by solid-state additive manufacturing." Materials Science & Engineering A, 694 (2017) 1-9.
The American Welding Society. The Everyday Pocket Handbook on Welded Joint Details for Structural Applications. 2004.
Co-Pending Application No. AU 2018359514, file history through May 14, 2021.
Co-Pending Application No. CN 201880084770.5, Second Office Action dated Jul. 5, 2021 (9 pages) and English Translation (14 pages).
Co-Pending Application No. EP 18873980.9, Extended European Search Report, dated Jul. 15, 2021, 9 pages.
Co-Pending Application No. JP 2020-536809, Decision of Rejection dated Dec. 10, 2021 (5 pages) and English Translation (6 pages).
Co-Pending Application No. JP 2020-536809, Response to Apr. 9, 2021 Office Action filed Oct. 11, 2021, 8 pages (with English version, 12 pages).
Co-Pending Application No. CN 201880084770.5, Response to Jul. 5, 2021 Office Action, dated Jan. 20, 2022 (18 pages) and English Translation (15 pages).
Co-Pending Application No. EP 18873980.9, Response to Extended European Search Report, dated Feb. 11, 2022, 107 pages.

\* cited by examiner

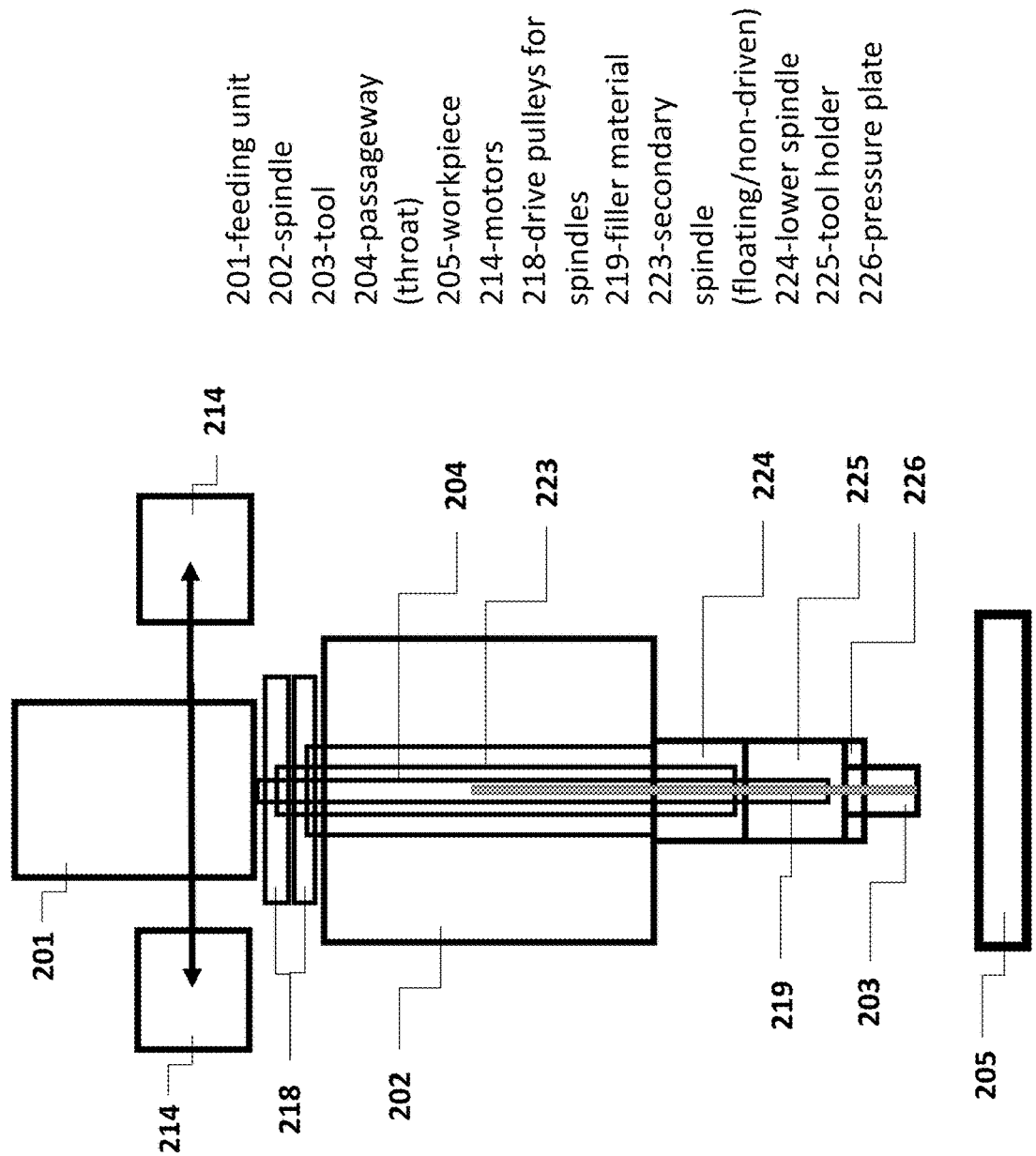

202-spindle
203-tool
204-passageway (throat)
205-workpiece
214-motors
218-drive pulleys for spindles
219-filler material
220-actuator-downward force driver
221-push rod
222-solid feed push-rod and actuator stand with bearings
223-secondary spindle
224-lower spindle (floating/non-driven)
225-tool holder
226-pressure plate

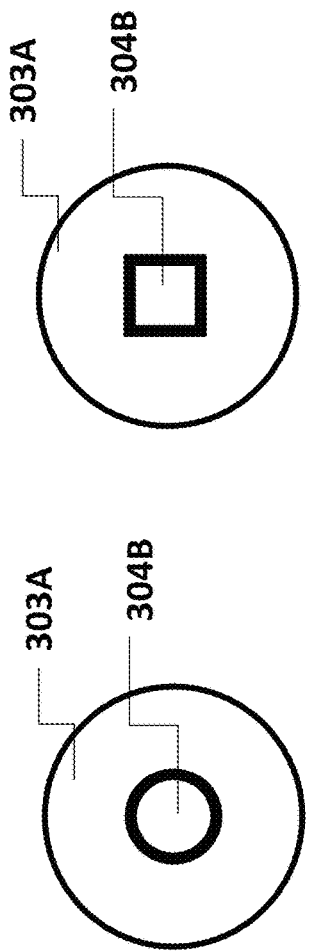
FIG. 3L
FIG. 3M
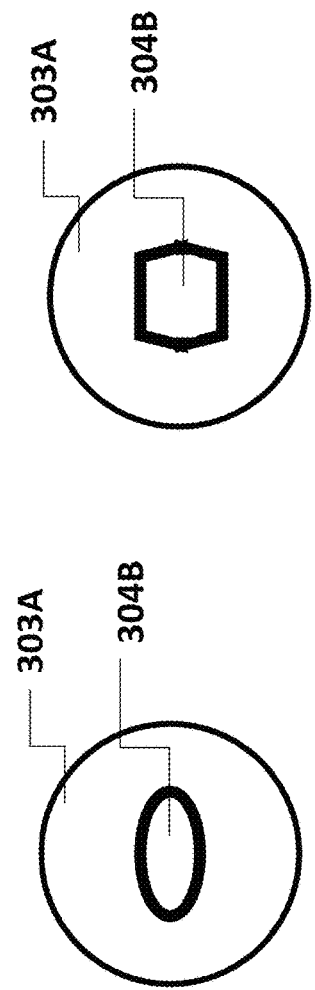
FIG. 3N
FIG. 3O

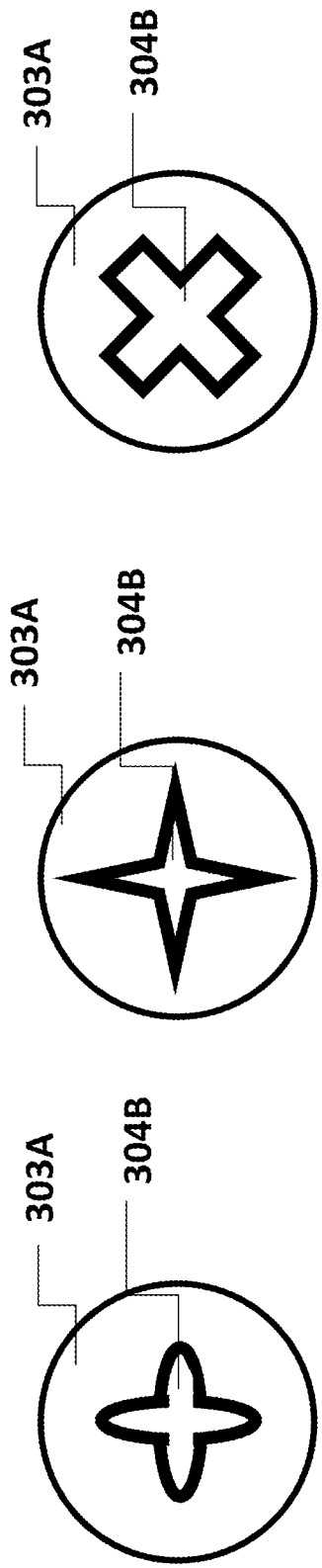

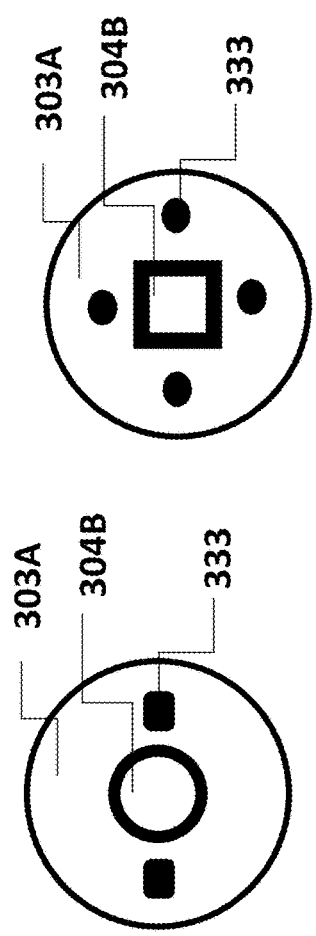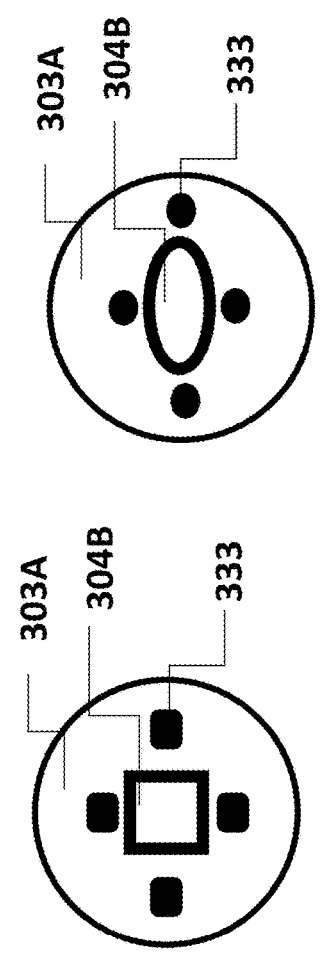

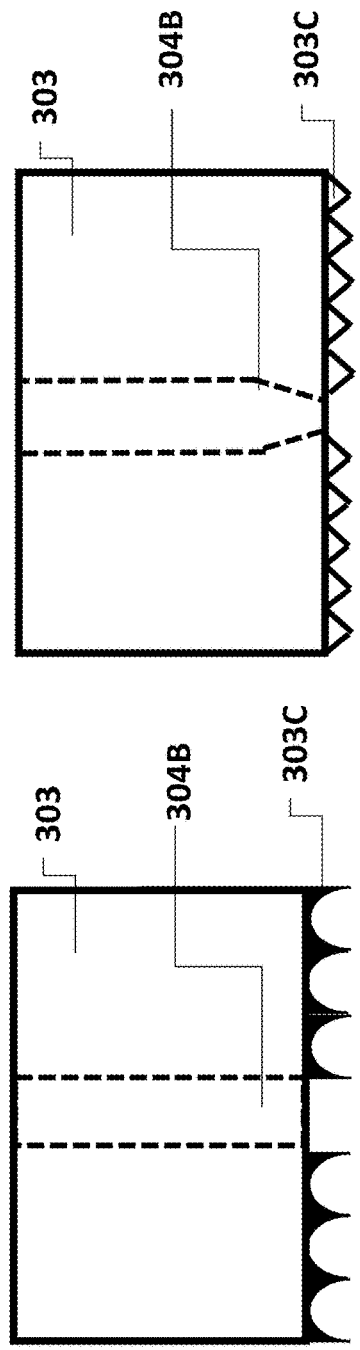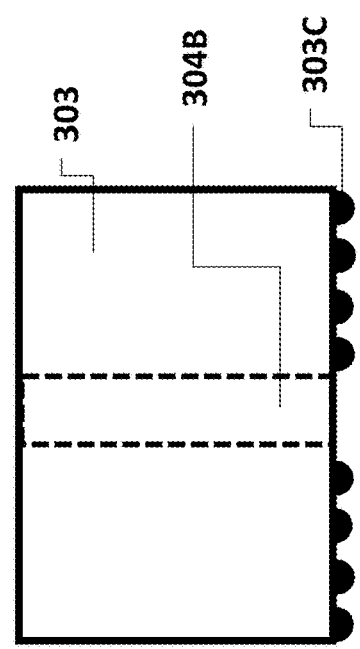
FIG. 3AA
FIG. 3AB
FIG. 3Z

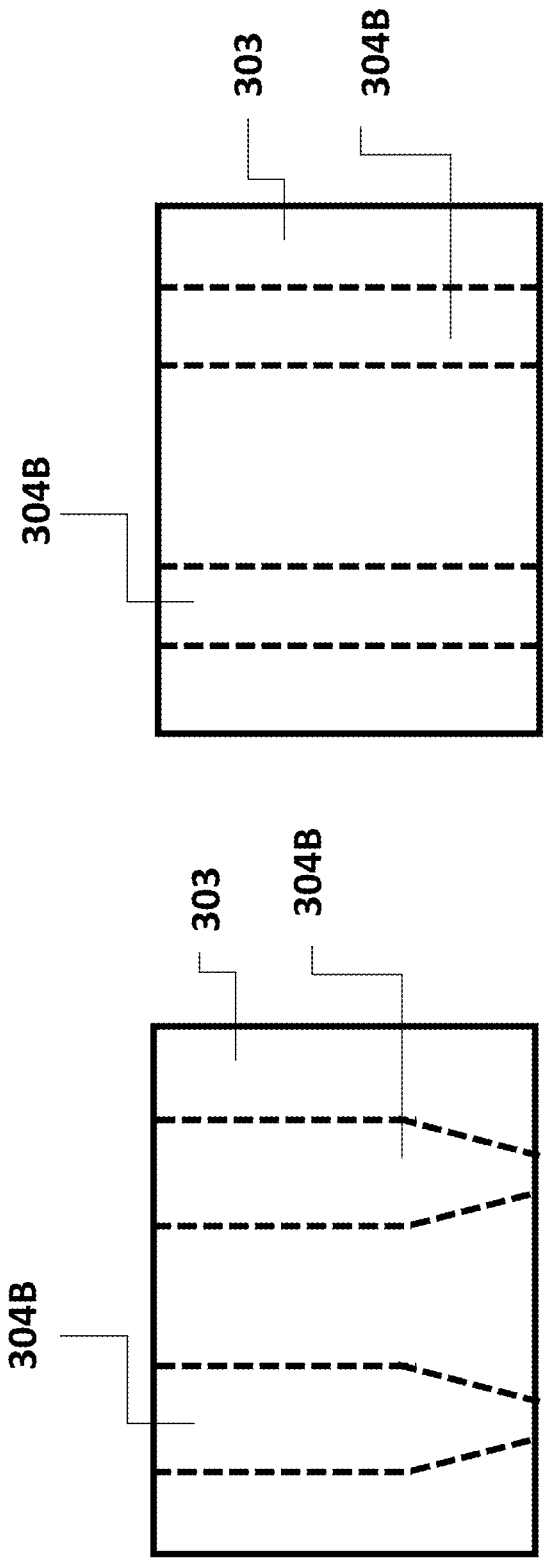

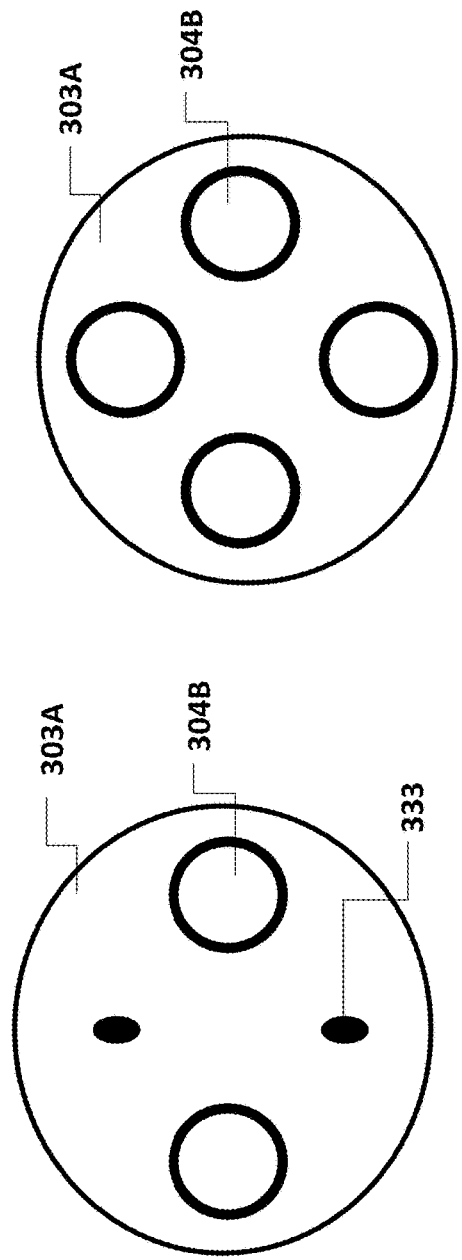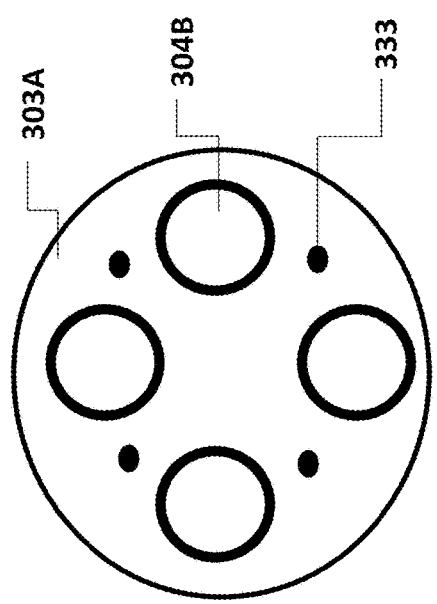

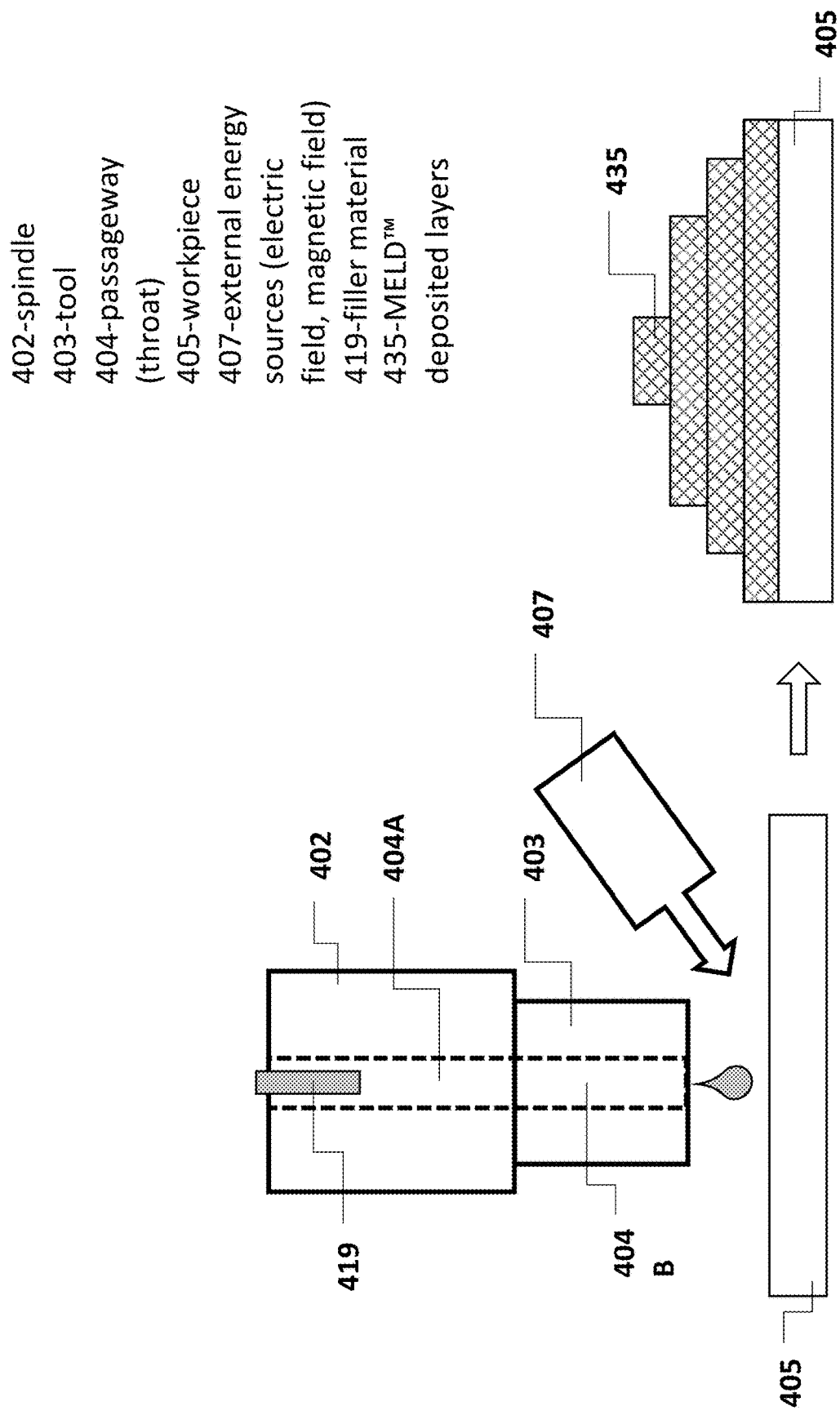

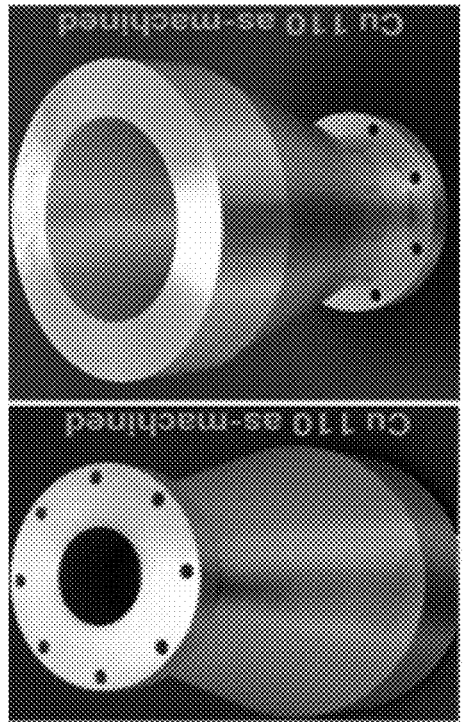
FIG. 4B
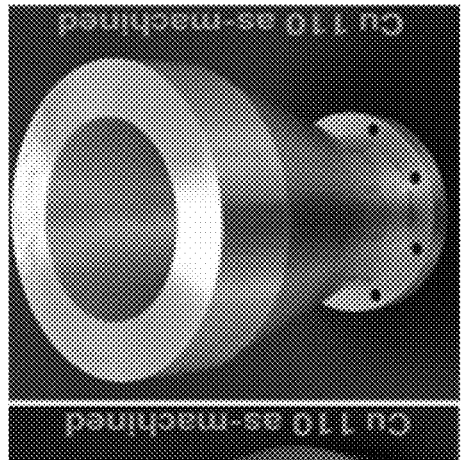
FIG. 4C  FIG. 4D
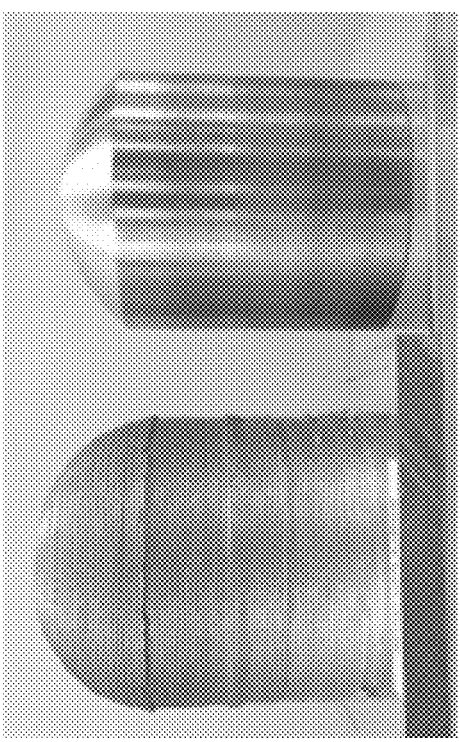
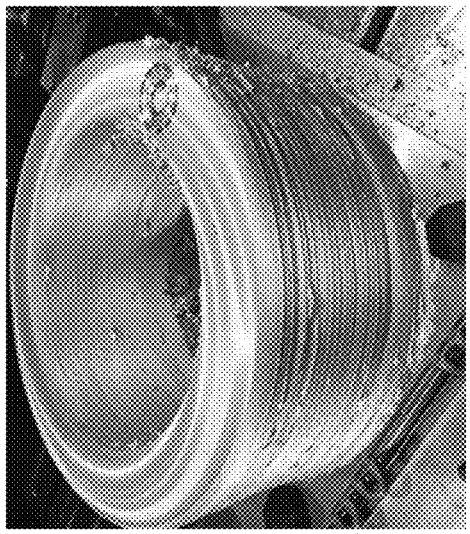
FIG. 4G
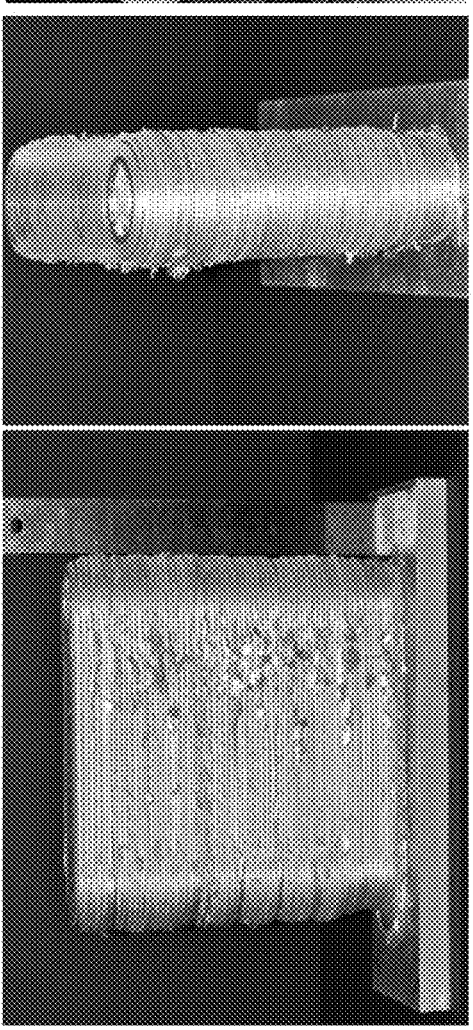
FIG. 4F
FIG. 4E Equiaxed (large grains)

Equiaxed (refined grains)

Radial grains

Elongated and oriented grains

SOLID-STATE ADDITIVE MANUFACTURING SYSTEM AND MATERIAL COMPOSITIONS AND STRUCTURES

CROSS-REFERENCE TO RELATED APPLICATIONS

The present application is a National Stage application under 35 U.S.C. § 371 of International Application No. PCT/US18/58470, filed Oct. 31, 2018, which application relies on the disclosure of and claims priority to and the benefit of the filing date of U.S. Provisional Application No. 62/579,483 filed Oct. 31, 2017, and U.S. Provisional Application No. 62/713,275 filed Aug. 1, 2018, the disclosures of which are hereby incorporated by reference in their entireties.

BACKGROUND OF THE INVENTION

Field of the Invention

The present invention relates to a solid-state additive manufacturing system used for 3D printing, coating, cladding, surface functionalization, joining, materials compounding and/or repairing surfaces or whole parts using frictional forces and other forces, as well as the generated heating due to plastic deformation and compressive loading of a consumable filler material against a workpiece (substrate, part). Embodiments of the invention include a working platform, a process control system, motors and variable frequency drives; feeding units that can dispense consumable filler material through a spindle system and a non-consumable tool onto substrate; a spindle system that can drive the tool for rotating through a tool holder; a tool holder that holds the tool; a tool changer to change the tool during deposition process; friction-based fabrication tool comprising a non-consumable member having a throat and a shoulder with or without pin and nubs; unit for supplying air, inert gasses or gas mixtures and compartment to maintain a controlled gas atmosphere during the deposition process; injection ports to the feeding unit, spindle and/or the tool for supplying additives, mainly in a liquid state; and one or multiple sensors and monitoring units. Additionally, embodiments of the solid-state additive manufacturing system are capable of fabrication of alloys, hybrids and composites, such as MMCs and reinforced polymer composites, with preferred loading levels and controlled micro- and nano-structures and porosity, not easy to be manufactured by other conventional methods. Furthermore, methods for tailoring the material microstructure in parts produced by solid-state additive processes by controlling the process parameters are disclosed. In particular, such process parameters, including spindle angular velocity, spindle and tool torque, down push force, filler feeding rate, transverse velocity, and others are correlated to the grain sizes, grain shapes and grain orientation (if any) in the manufactured parts. In some instances, a combination of several parameters is correlated to the grain sizes; e.g. the heat input in the process as a result of combination of several parameters (spindle angular rate, transverse speed, down force) is related to the grain size. Moreover, external input of heating or cooling is being related to the microstructure evolution during the solid-state additive manufacturing process. Also, addition of lubricants or other additives or reinforcers is claimed to affect the final grain sizes and shapes. Examples on grain sizes and shapes before and after the solid-state additive manufacturing process are provided for several particular materials, viz. Inconel 625 superalloy, Al-alloys, stainless steel and others.

Description of Related Art

The additive manufacturing (AM), defined as the process of joining materials to make 3D objects usually by layer-by-layer deposition, can produce multi-functional and multi-material parts, but has some limitations. Very often substantial differences exist between interfacial and non-interfacial material micro-structures leading to inhomogeneous properties along specific sites and directions. In such cases, the fabricated parts exhibit inferior properties in comparison to the properties of the bulk material.

Similarly, conventional metal-based additive manufacturing technologies, such as direct laser deposition, electron beam deposition, and shaped metal deposition, create metal parts usually through successively depositing metallic layer-by-layer. Fusion-based AM processes often result in problems associated with melting and solidification such as brittle cast structure, hot cracking and porosity, leading to a reduction in the mechanical performance. The coating techniques, such as flame spray, high-velocity oxygen fuel (HVOF), detonation-gun (D-Gun), wire arc and plasma deposition, produce coatings that have considerable porosity, significant oxide content and discrete interfaces between the coating and substrate. Typically, these coating processes operate at relatively high temperatures and melt/oxidize the material as it is deposited onto the substrate. Such conventional techniques are not suitable for processing many types of substrates and coating materials, such as nanocrystalline materials due to the grain growth and loss of strength resulting from the relatively high processing temperatures. An alternative deposition process available is referred to as cold spray type depositing. It typically involves a relatively low-temperature thermal spray process in which particles are accelerated through a supersonic nozzle. These techniques, however, may be relatively expensive and/or generally incapable of processing high aspect ratio particles, such as nanocrystalline aluminum powder produced by cryo-milling. As a result, products prepared using cold spray techniques typically contain oxide impurities.

Considering these drawbacks, improvements in additive manufacturing and coating deposition techniques are highly desired. Indeed, there is a specific need for friction-based fabrication system capable of depositing variety of materials and variety of material forms (e.g. powder, granules, pellets, disregarded scrap pieces) on similar or dissimilar substrates efficiently and in a simple manner resulting in high quality adhesion between the substrate and the deposited layer, as well as among the deposited individual layers, and products having improved mechanical and other properties. The present inventors have found that no-melt/solid-state additive manufacturing methods based on friction stirring appear to overcome the drawbacks of traditional AM and coating processes.

SUMMARY OF THE INVENTION

Embodiments of the invention provide new systems and methods for solid-state additive manufacturing. Solid-state additive manufacturing technology is a solid-state thermo-mechanical deposition process capable to deposit a material on a substrate (workpiece), refine the material's original grain sizes, mix and homogenize the materials in the processed zone and generate chemical or physical bonding between the deposited material and the workpiece without their melting.

Briefly, the basics behind the solid-state additive manufacturing process are: the heat is generated by the friction between the tool and the workpiece material (and in certain cases, if the pin extends from the tool shoulder, the friction is caused by the pin passing through the workpiece surface zone); the generated heat enables significant amount of plastic deformation in the vicinity of the rotating tool (and/or rotating pin, if used); a substantial strain is imparted to the workpiece material resulting in refinement of its microstructure; the material adjacent to the tool softens and the softened material is mechanically-stirred, and at the same time, mixed and joined with the filler material added via the passageway of the tool using mechanical pressure supplied by the tool shoulder.

Soli-state additive manufacturing technology is considered as an environmentally-friendly technology due to its relatively low energy costs, no harsh chemicals are used and no generation of exhausting gases and fumes. Some of the benefits of solid-state additive manufacturing processes are as follows: it is a solid-state, and often a single-step process, offers possibility to work with thermally-sensitive and air-sensitive materials, no prior surface preparation is required, provides good dimensional stability (minimal distortion of the parts because it is performed in a solid state), enables good control over the processed workpiece's surface depth, consumes little energy since the heat is generated by friction, and thus, no external energy is needed to cause the plastic deformation of the material, facilitates excellent bonding properties with the substrate (workpiece), has a good reproducibility, as well as offers potential for a process automation.

By controlling the solid-state additive manufacturing processing parameters, such as tool rotational speed, tool shoulder pressure, pin (if used) penetration depth, downward force, translational speed, tool lead angle and tool design, pin geometry, filler material form, filler material temperature, filler material load rate, and so on, one can tightly control the composition and micro- and nano-structure of the deposited material layers. Moreover, by controlling the tool speed and overlaps in multi-pass solid-state additive manufacturing processes, one can further control the surface micro-/nano-structure and can process larger workpiece areas.

In recent years, there is a trend towards light-weight structural parts, especially in the aerospace and automotive industry, targeting mainly reduction in energy consumption and preservation of natural resources. For instance, the newest generations of aircrafts and cars are using more than 50% composite materials because the light-weight constructions and parts directly affect their fuel consumption. However, this concept of light-weight construction does not only involve the use of light-weight materials, but it also involves the combination of different materials, e.g. plastics and metals yielding useful combination of the properties and/or functionalities of constituent materials. For instance, two potential approaches for light-weight structural parts are the use of hybrid metal-polymer materials and combination of steel and aluminum alloys. In case of the metal-polymer hybrid materials, the metal is usually used to withstand mechanical stress, while the polymer components offering excellent formability and high freedom of design, could take over the functional integration. In the case of steel-aluminum alloys, the steel portion could be applied to the highly stressed areas of a product, while lesser strained areas would be manufactured from the much lighter aluminum. However, the real challenge with these light-weight compositions is their manufacturing. For instance, polymer-metal composites have been manufactured by in-mold technique and sometimes by post-mold assembly methods. This is usually done by placing the metallic component in the injection mold, where it is joined with the injected polymer, which undergoes molding at the same time. The main challenges with these processes are the adhesion between the metal and the polymer, as well as the limited freedom of design in addition to the expensive molds used. In this context, several joining techniques have been proposed and commonly used for hybrid joints between the metal and polymer workpieces, or as post-mold assembly methods, such as adhesive bonding, mechanical fastening and welding, but all of them suffer with major drawbacks. Solid-state additive manufacturing seems to be a quick, efficient and low-cost method to produce hybrid structures with good interfacial bonds or to join structures made of dissimilar materials with a good adhesion between them.

Furthermore, the increased need to quickly modify the surface properties of structural parts or selected surface areas to meet certain design and functional requirements has prompted the development of surface engineering. Surface engineering enables tailoring the chemical and structural properties of surface layers of the substrate, by modifying the existing surface and/or adding certain functional coatings. A wide range of processes have been used for surface engineering, such as laser alloying, cladding, thermal spraying, cold spraying, various liquid deposition methods, anodizing, chemical vapor deposition (CVD), physical vapor deposition (PVD), high-energy laser melt treatment, high-energy electron beam irradiation, plasma spraying, casting and sintering, etc. Some of the conventional coating techniques, e.g. thermal spraying can produce porous coatings and poor bonding between the coating and substrate. Other of the conventional coating processes utilize relatively high temperatures to melt the material before its deposition and can cause its oxidation yielding coatings with a high oxide content. The high temperature processing methods usually result in loss of strength and are not suitable for processing of variety of substrate and coating materials. Contrary, the solid-state additive coating process offers compositional and structural control in the surface layers of the processed substrates and components for specific property enhancement and/or adding functionality. The processed surfaces can have enhanced mechanical properties, such as hardness, tensile strength, fatigue, corrosion and wear resistance.

Furthermore, solid-state additive manufacturing technology has a potential of making surface composites and modifying microstructural features of the surfaces of bulk substrates or structural parts. Due to the generated plastic deformation without the bulk material melting, surface property changes without modifying the basic substrate composition are possible. The potential of addition of the same or different classes of filler materials during the solid-state additive deposition process on the workpiece surface enables in-situ generation of surface composites, surface modification, surface coating and surface functionalization. Surface composites exhibit enhanced characteristics of composites on the surface while retaining the properties of the base material.

Moreover, solid-state additive manufacturing technology has successfully evolved for in situ fabrication proprietary materials compositions, such as metal matrix composites (MMCs). Compared with unreinforced metals, MMCs i.e. metals reinforced usually with ceramic phases, exhibit high strength, high elastic modulus, and improved resistance to wear, creep and fatigue, which make them as promising structural materials. However, these composites also suffer from a loss in ductility and toughness due to incorporation of non-deformable ceramic reinforcement phases, which limits some of their applications. In these cases, it is desirable that only the surface layer of parts is reinforced by ceramic phases, while the bulk of components retain the original composition and structure with higher toughness. Solid-state additive manufacturing systems offer the possibility of making in situ MMCs and many other combinations of similar or dissimilar material compositions. Metal-polymer composites, for example, exhibit the properties of both, the metal and the polymer, and are very important structural materials, which performance is influenced by the structures and the structures are being affected by the manufacturing methods. In general, the methods for production of metal-polymer composites utilize combination of increasing temperature and mixing, such as mechanical milling, vacuum arc deposition, melt mixing, injection molding and so on. The solid-state additive manufacturing system is capable of manufacturing composites in a solid state and in a controlled environment, which is favorable for many materials that cannot withstand higher temperature and ambient conditions. Furthermore, in situ made composites can be subsequently deposited by the same solid-state additive manufacturing system making it a versatile system of compounding and depositing proprietary compositions on a surface of the workpiece or manufacturing (3D printing) the whole object with the proprietary composition.

The present solid-state additive manufacturing technology is also a cost-effective method of generation of ex-situ and in-situ composites. In general, in-situ composites offer many advantages such as a defect-free reinforcement-matrix interface, more thermodynamically-stable reinforcements, improved compatibility, and higher bonding strength between the reinforcements and the matrix with the workpiece. The possibility of adding and dispersing reinforcing particles with solid-state additive manufacturing processes to the workpiece enables generation of composites with improved mechanical, tribological, magnetic, electrical and other properties of the base (matrix) material.

Furthermore, nano-composites comprising nano-particles are of increased interest because the particles' nanometer size leading to high specific surface areas of up to more than 1,000 m2/g, and thus, significantly improving the basic material properties at very low doping level. Commonly used nanoparticles in nanocomposites include carbon nanotubes, carbon nanofibers, montmorillonite, nano-clays, nano-powders like $SiO_2$, $Al_2O_3$, $TiO_2$, nano-silica and others. Among them, single-wall and multi-wall carbon nanotubes (SW-CNTs and MW-CNTs) are very promising reinforcing materials, because of their super high ductility, Young's modulus, strength, unique electrical and magnetic properties. However, CNTs are easily to agglomerate, and thus, hard to disperse in a polymer or a metal matrix. Therefore, the dispersion of CNTs is of crucial importance to improve the performance of the base polymeric or metal composites. Not only CNTs, but the segregation of other types of reinforcing particles seems to be the major problem in the fabrication of in situ composites by conventional methods.

Solid-state additive compounding of in-situ nano-composites can result in superior mechanical and other properties caused by uniformly-dispersed reinforcements with good interfacial bonding to the matrix material. Solid-state additive processes seem to be an effective route for generating in-situ composites as it provides synergistic effect of severe plastic deformation to promote mixing, elevated temperature to facilitate the in-situ reaction and hot consolidation to form a fully dense solid. Moreover, the synergistic effect of grain refinement by the friction stir action and the used reinforcement particles can yield in-situ composites with uniformly refined grain structure.

Solid-state additive surface functionalization is a solid-state processing technology, especially useful for thermally-sensitive materials due to its possibility to add the material from a consumable rod, pellets (granules) or powder onto a substrate producing a coating with a good bonding to the substrate. Besides its application to make surface MMCs, the present solid-state additive manufacturing system can be used for polymer surface engineering. Surface properties of polymeric materials are critically important in many applications and are strongly influenced by the structure and composition of the outermost molecular layers. Generally, special surface properties regarding hardness, hydrophilicity or hydrophobicity, and (micro-)crystallinity are needed for successful application of plastic parts in wide applications such as coatings, friction and wear, composites, etc. A variety of vacuum deposition methods are being used for coating plastic substrates and parts, but they require vacuum chambers, limiting part sizes, and sometimes special surface preparation like plasma/ion etching. Solution-based methods are also being used, as well consequent annealing steps associated with sol-gel coatings. Solid-state additive processes can be very useful method to modify the surface of polymer substrates and plastic parts by adding and bonding dissimilar surface materials that are otherwise hard to bond to inherently low surface energy plastics without any surface preparation or consequent high baking temperature steps.

Since the present solid-state additive manufacturing technology enables the local chemical composition and/or phase content to be manipulated, fabrication of gradient material compositions and gradient structure variations are also possible with the disclosed system. The ability to add similar or different material or dopant (reinforcing agent) or blown gas on the workpiece surface at a controllable rate is a unique system characteristic that cannot be achieved with other known in the art manufacturing methods in a single step.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 2A is a diagram of a cross-sectional view of a solid-state additive manufacturing system for continuous solid (e.g. rod-like) filler material according to embodiments.

FIGS. 3L-R are diagrams showing bottom views of tool shoulders with various passageway cross-sections according to embodiments.

FIGS. 3S-V are diagrams showing bottom views of tool shoulders with various passageway cross-sections and optional nubs according to embodiments.

FIGS. 3Z-AB are diagrams showing cross-sections of tools with tapered tool shoulder geometries according to embodiments.

FIGS. 3AC-AD are diagrams of cross-sections of tools with optional hollow pin with tapered surface according to embodiments.

FIGS. 3AE-AF are diagrams showing cross-sections of tools where the tool passageway changes the cross-section shape and/or size according to embodiments.

FIG. 3AG is a diagram of a cross-section of a tool where the tool passageway splits in multiple passageways to deliver a powder or a pellet filler material on the workpiece surface according to an embodiment.

FIG. 3AH is a diagram showing a cross-section of a tool with pin, where the pin passageway splits in multiple passageways to deliver a powder or a pellet filler material on the workpiece surface according to embodiments.

FIGS. 3AI-AJ are diagrams showing cross-sections of tools with multiple passageways according to embodiments.

FIGS. 3AK-AM are diagrams showing tool shoulders with multiple passageways and optional nubs according to embodiments.

FIG. 4A is a schematic diagram which presents the solid-state additive manufacturing process of material deposition on a workpiece according to an embodiment. Processes, such as 3D printing, coating, joining, repair and in situ surface functionalization are possible with the solid-state additive manufacturing additive manufacturing system.

FIGS. 4B-4G are photographs of solid-state additive manufacturing 3D-printed structures according to embodiments.

FIGS. 5A-D show examples of tantalum (Ta) and niobium (Nb) coated with copper (Cu) with solid-state additive manufacturing process and bended afterwards showing no signs of delamination. FIG. 5E shows solid-state additive manufacturing coating of Al material (Al6061) on Cu substrate (Cu185) without using any intermediate layers.

FIG. 9D shows radially-oriented grains; and FIG. 9E shows elongated grains usually resulted from applied strain during the processing and/or cooling step.

DETAILED DESCRIPTION OF VARIOUS EMBODIMENTS OF THE INVENTION

Figure 1A:
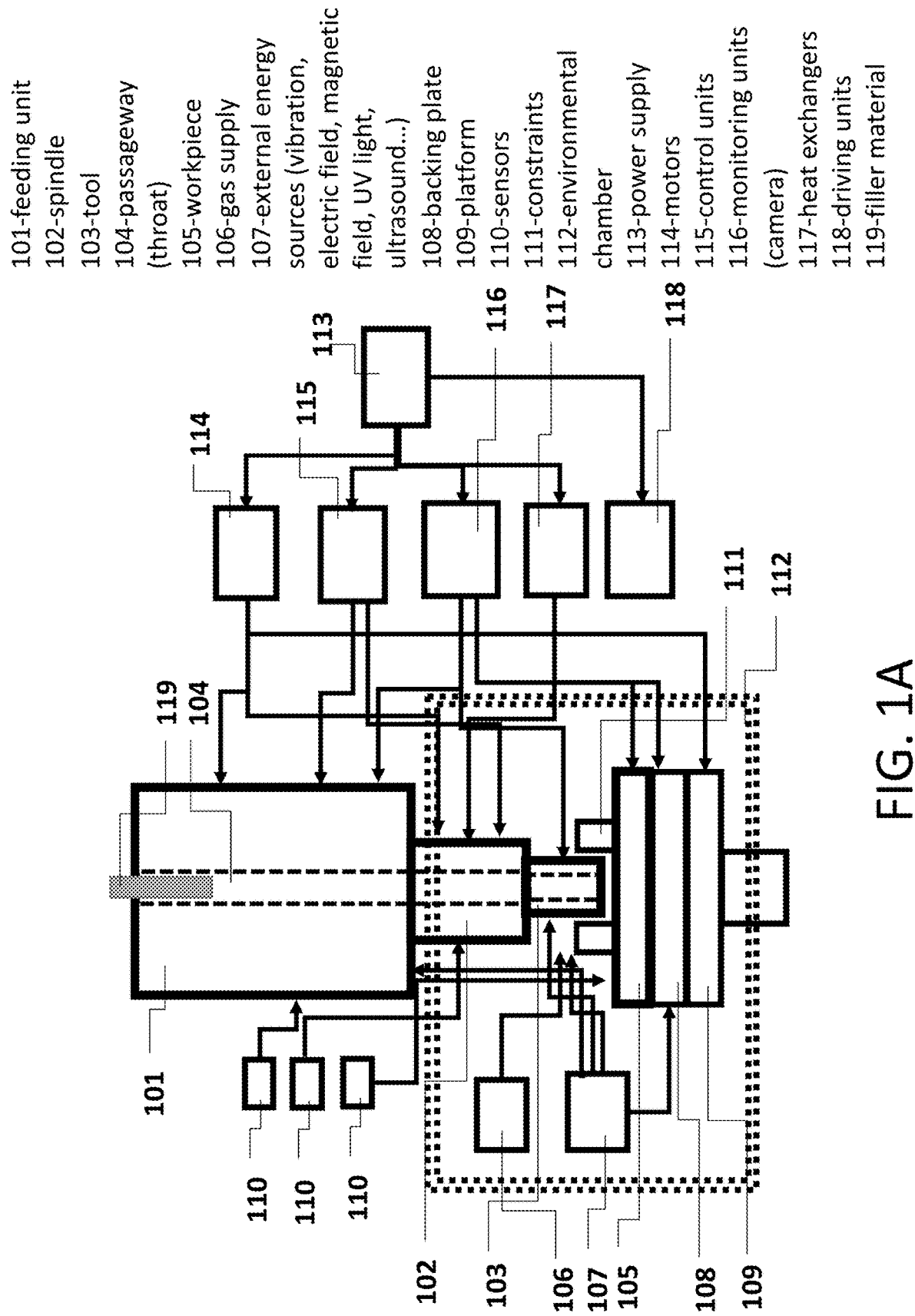
FIG. 1A is a schematic diagram which illustrates a solid-state additive manufacturing system according to an embodiment.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The present invention is related to a solid-state additive manufacturing system and associated solid-state thermomechanical processes performed by the disclosed system. Moreover, materials, compositions, and structures generated by the disclosed system are presented. The present invention relates to deposition of variety of materials, additives, and reinforcement particles to a workpiece for part fabrication, coating, joining, surface modification, functionalization, repair and formation of in situ MMC or other composites by using the solid-state additive manufacturing system to perform such processes. The solid-state additive fabrication system of embodiments of the invention include a machine, a feeding unit, a spindle system, a tool holder and a tool. Additional system parts and accessories are disclosed, as well.

Solid-state additive manufacturing tools of embodiments of the invention include configurations capable of imparting frictional heating, compressive loading, and/or mechanical stirring of the deposited material and/or substrate material during processing to allow for the coating material to be applied, adhered, deposited, and/or intermixed with the material of the substrate to form a coating on the substrate. As discussed in detail below, embodiments allow for the use of the same or different coatings providing improved results in the applications in which they are sometimes used.

It should be noted that in the examples and description provided in this application, various modifications can be made and are also intended to be within the scope of the invention. For example, the described methods can be practiced using one or more of the method steps described, and in any order. Further, method steps of one method may be interchanged and/or combined with the steps of other methods described and/or with method steps known to those of ordinary skill in the art. Likewise, the features and configurations for particular tooling described in this application may be omitted, interchanged, and/or combined with other features described or known to those of ordinary skill in the art. Even further, tooling to obtain certain results or to perform specific steps of methods described in this application is also included in the scope of the invention even though the particular details of such tools are described relative to performing method steps instead of the tools themselves.

Very generally, embodiments are directed to solid-state additive manufacturing systems and processes for friction-based deposition of material(s) on a substrate. Such processes include applying deposit materials to a workpiece (substrate, part) by forming a surface layer on a substrate, e.g. by depositing a coating on a substrate using frictional heating and compressive loading of a coating material against the substrate, in which a tool supports the coating material during frictional heating and compressive loading and is operably configured for forming and shearing a surface of the deposit.

Solid-state additive manufacturing tools for performing such processes are preferably designed or configured to allow for a consumable coating material to be fed through or otherwise disposed through an internal portion of a non-consumable member, which may be referred to as a throat, neck, center, interior, or through hole disposed through opposing ends of the tool. This region of the tool can be configured with a non-circular through-hole shape.

Various interior geometries for the tooling are possible. With a non-circular geometry, the consumable filler material is compelled or caused to rotate at the same angular velocity as the non-consumable portion of the tool due to normal forces being exerted by the tool at the surface of the tool throat against the feedstock. Such geometries include a square through-hole and an elliptical through-hole as examples. In configurations where only tangential forces can be expected to be exerted on the surface of the filler material by the internal surface of the throat of the tool, the feed stock will not be caused to rotate at the same angular velocity as the tool. A circular geometry for the cross-section of the tool in combination with detached or loosely attached feedstock would be expected to result in the deposit material and tool rotating at the same or different velocities.

The form of the consumable material can be of any form or shape, such as solid bar, powder, solid tubes filled with powder, scrap pieces, wires, pellets or any combination of them, to name a few. For instance, coating material can be deposited on a substrate using a downward frictional force in combination with translational movement across the surface of the substrate at a fixed distance. The filler material is consumed by being forced toward and deposited on the surface of the substrate through the throat of the non-consumable tool using rotation of the tool (and consequently the feed material) and other relative movement between the tool and the substrate such as translational movement. The downward force can be imposed on the filler rod for example by pulling or pushing the material through the throat of the tool. A preferred method is to push the rod with an actuator toward the surface of the substrate. As shown, the use of a non-circular through-hole and corresponding shape of filler material may be one example of a way to compel the material in the tool to spin at the same angular velocity as the tool. It has been found that rotational movement of the filler material may be desired for certain applications and that no rotational movement between the filler material and inner geometry of the non-consumable portion of the tool be experienced during use. Further, it is desired that the filler material be operably configured to move freely lengthwise through the tool so as to allow for semi-continuous or continuous feeding of the material toward the substrate for a desired period of time.

Another aspect of the present invention is to provide a method of forming a surface layer on a substrate, such as repairing a defective surface or defective object, building up a surface to obtain a substrate with a greater thickness, adding customized or pre-made features to parts, joining two or more parts together, or filling holes in the surface of a substrate. Such methods can comprise depositing a material on the substrate with tooling described in this application, and optionally friction stirring the deposited material, e.g. including mechanical means for combining the deposited material with material of the substrate to form a more homogenous deposit-substrate interface. Depositing and stirring can be performed simultaneously, or in sequence with or without a period of time in between. Depositing and stirring can be performed with a single or separate tools, which can be the same or different.

Embodiments of the solid-state additive manufacturing system are able to perform various solid-state additive manufacturing processes, which dispose the filler material in a localized area or along a predetermined path, or dispose the filler material as a coating over the whole substrate or structure. The versatility of the disclosed solid-state additive manufacturing system enables to build-up, repair, compound proprietary composition, coat or modify the surface of a substrate using frictional and other forces, frictional heating and compressive loading of the filler material onto substrate.

Particular methods include depositing material on a substrate using frictional stirring, frictional heating and compressive loading of a depositing material against the substrate, whereby a tool supports the depositing material during frictional heating and compressive loading and is operably configured for forming and shearing a surface of the deposit.

The tooling in some embodiments comprises a shearing surface. This surface is used for shearing the surface of the deposit material being deposited to form a new surface of the substrate. The shearing surface can be incorporated in the tool in a variety of ways, including to obtain tooling comprising a collar, spindle, anvil, cylindrical tool, shoulder, equipment, rotating tool, shearing tool, spinning tool, stir tool, tool geometry, or threaded-tapered tool to name a few. The shearing surface is defined more completely by its function, e.g., the surface(s) of the tool capable of trapping, compressing, compacting or otherwise exerting at least a downward force on the coating material deposited on the substrate and through the coating material to the substrate.

Solid-State Additive Manufacturing System

An embodiment of the present invention provides a solid-state additive manufacturing system as presented in FIG. 1A. According to embodiments, the system of FIG. 1A includes but is not limited to the presented constituent components, viz. feeding unit 101, spindle 102, tool 103, passageway (throat) for the filler material (feedstock) 104, workpiece 105, gas supply 106, external energy sources (e.g. source for vibration, electric field, magnetic field, UV light, heat, ultrasound and so on, or their combination) 107, backing plate (optional) 108, platform (support table for the workpiece) 109, multiple sensors for temperature, pressure, torque, translational and angular velocity, length and so on 110, constraints 111, environmental chamber 112, one or more power supplies 113, multiple motors 114, multiple control units 115, multiple monitoring units (e.g. cameras) 116, one or more heat exchangers 117, multiple driving units 118, and filler material (feedstock) 119.

According to embodiments, feeding units 101 can dispense consumable filler material through a non-consumable tool 103 onto substrate. Friction-based fabrication tooling 103 includes a non-consumable body formed from material capable of resisting deformation when subject to frictional heating and compressive loading and a throat 104 defining a passageway lengthwise through the body and comprising means for exerting forces on a material in the throat during rotation of the body.

Specific embodiments of the invention include a machine comprising a platform 109, a control process software 115, motors 114 and variable frequency drives 118, wherein the platform is a carrier of feeding unit 101, tool 103, spindle 102, process-controlling software 115, motors 114 and variable frequency drives 118, wherein the process control software 115 controls the tool rotation speed and substrate movement speed, wherein motors run the tool 103 through a spindle 102, wherein the variable frequency drives 118 control the tool rotation speed through the motors 114 and spindle 102. The software can comprise computer-executable instructions for controlling any one or more parts of the systems described herein, and/or for effectuating any one or more of the method steps described herein, and/or for creating any one or more product with the functionality and/or features described herein.

Figure 1B:
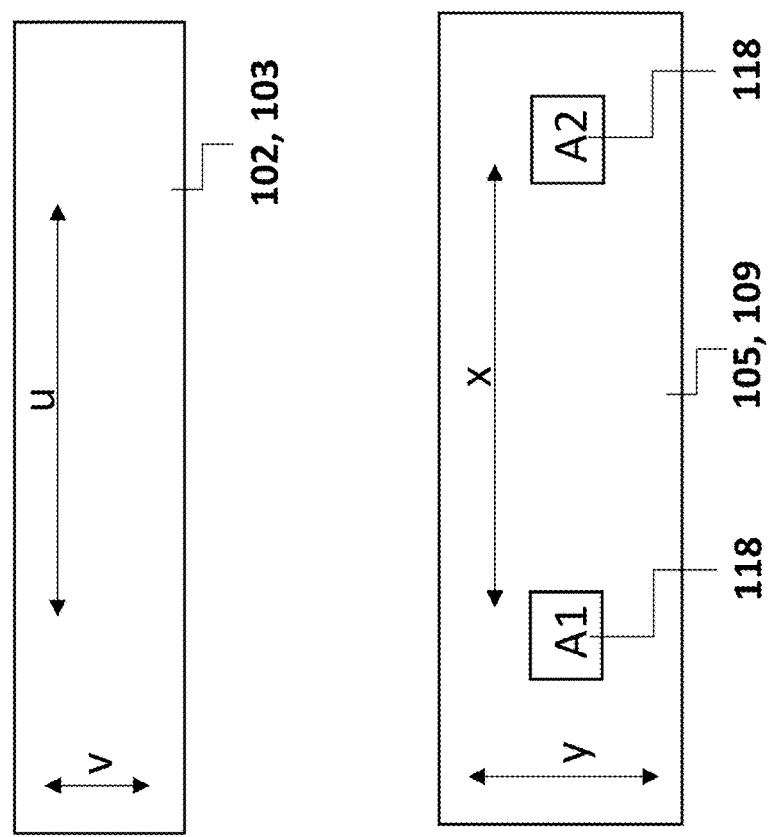
FIG. 1B is a diagram illustrating different movements and rotations of parts and accessories of a solid-state additive manufacturing system according to an embodiment.
Figure 1B:
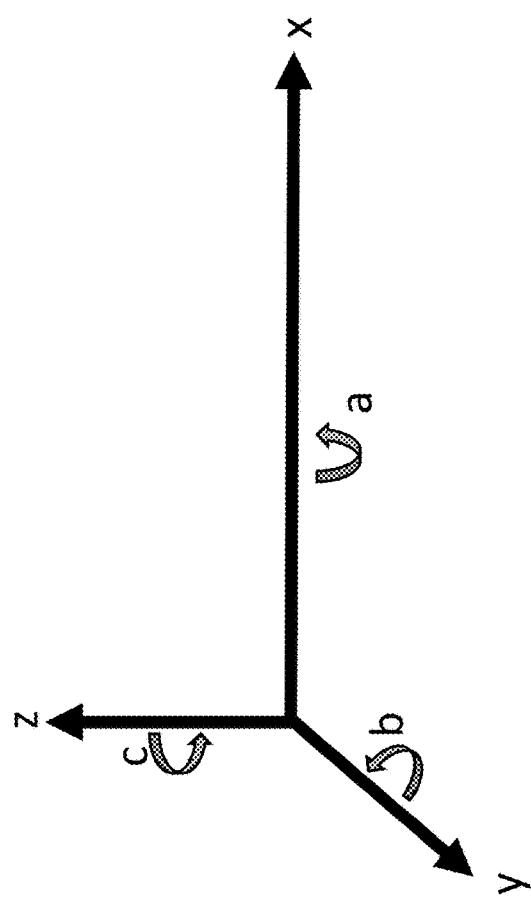

FIG. 1B shows potential movements and rotations of particular system components, such as the spindle 102, the tool 103, the workpiece 105 and the platform (base) that supports the workpiece 109 along with one, two or more auxiliary A-axis 118, which provide additional movements a, b, and c around x, y and z axis, respectively. The solid-state additive manufacturing system is able to perform various solid-state additive manufacturing processes translating across the typical CNC axes of a vertical mill known in the art, using as an example only but not limited to x-, y-, z-, u-, v-, a-, b- and c-axes, and any combination of some or all of them. More specifically, the working piece 105 platform (base 109) is capable of moving in x-, y- and z-direction, while the spindle 102 and the tool 103 are able to move independently in u- and v-axes, which can be the same or different axes as those for movement of the workpiece platform (see, e.g., FIG. 1B). For example, in FIG. 1B, the u- and v-axes correspond with spindle and/or tool movement as viewed from above and the x-, y- and z-axes correspond with workpiece and/or workpiece platform movement as viewed from above. The Auxiliary A-axis part adds additional movements to the workpiece, in particular, a-, b- and c-rotations around x, y and z axis, respectively. Multiple A-axis parts 118 (e.g. A1, A2) can provide independent rotations (a1, a2, b1, b2, c1 and c2) of the workpiece.

Specific embodiments of the invention include a feeding unit for continuous solid- (rod-) like filler material (FIG. 2A). FIG. 2A is a schematic presentation of cross-sectional view of the feeding unit 201, the spindle 202 and the tool 203 with operational passageway 204 and the workpiece 205 for continuous solid (e.g. rod-like) filler material. Other system components, such as the motors 214, drive pulleys for spindle 218, rod filler material 219, secondary spindle, which is floating (non-driven) 223, lower spindle 224, tool holder 225 and pressure plate 226 are presented, as well.

Figure 2B:
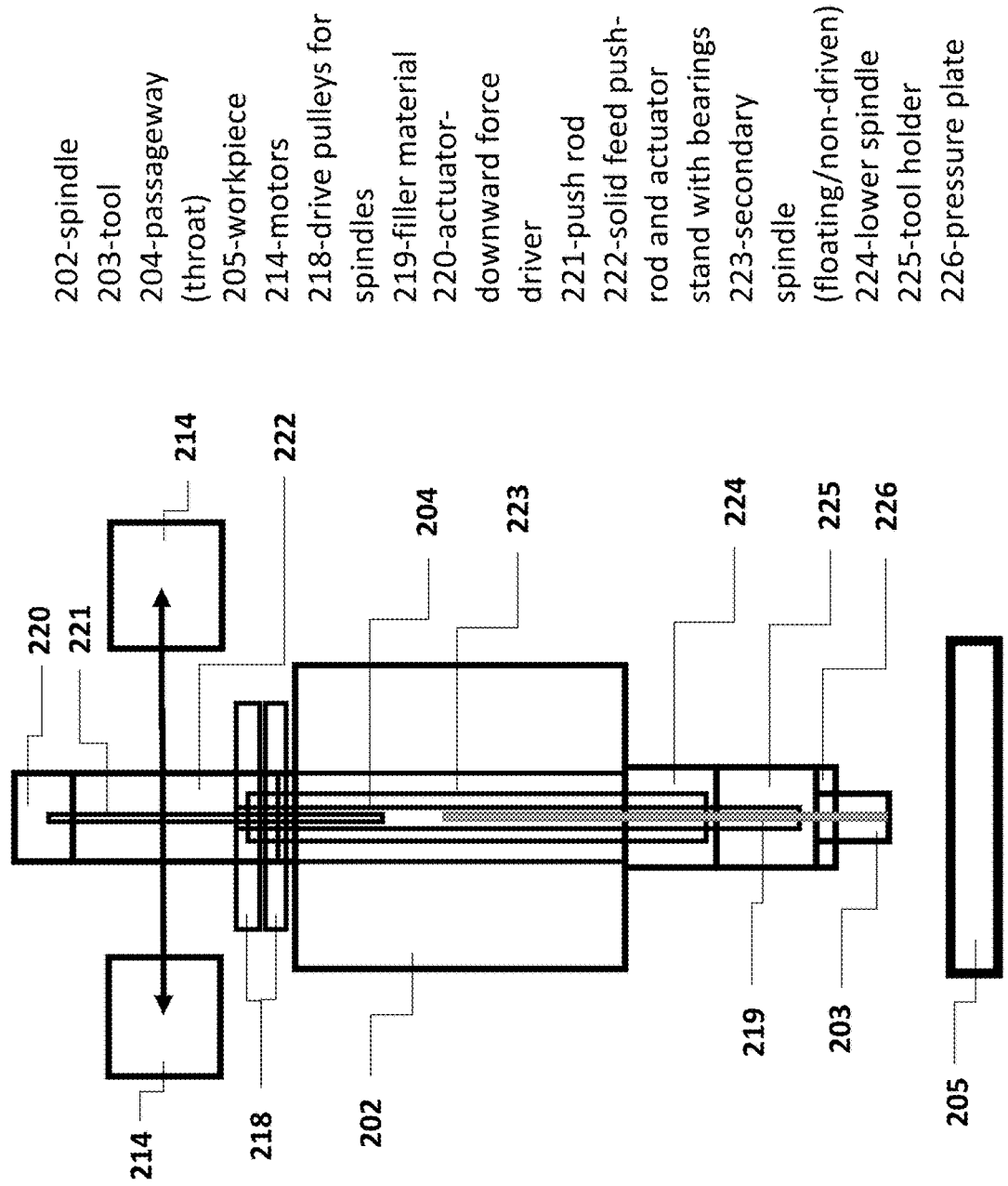
FIG. 2B is a diagram of a cross-sectional view of a solid-state additive manufacturing system for discontinuous solid (e.g. rod-like) filler material according to embodiments.

Specific embodiments of the invention include a feeding unit for discontinuous solid- (rod-) like filler material. FIG. 2B includes a cross-sectional view of the spindle 202 and the tool 203 with operational passageway 204 and the workpiece 205 for discontinuous solid (e.g. rod-like) filler material. Other system components, such as the motors 214, drive pulleys for spindle 218, rod filler material 219, actuator-downward force driver 220, push rod 221, solid feed push-rod and actuator stand with bearings 222, secondary spindle, which is floating (non-driven) 223, lower spindle 224, tool holder 225 and pressure plate 226 are presented, as well.

Figure 2C:
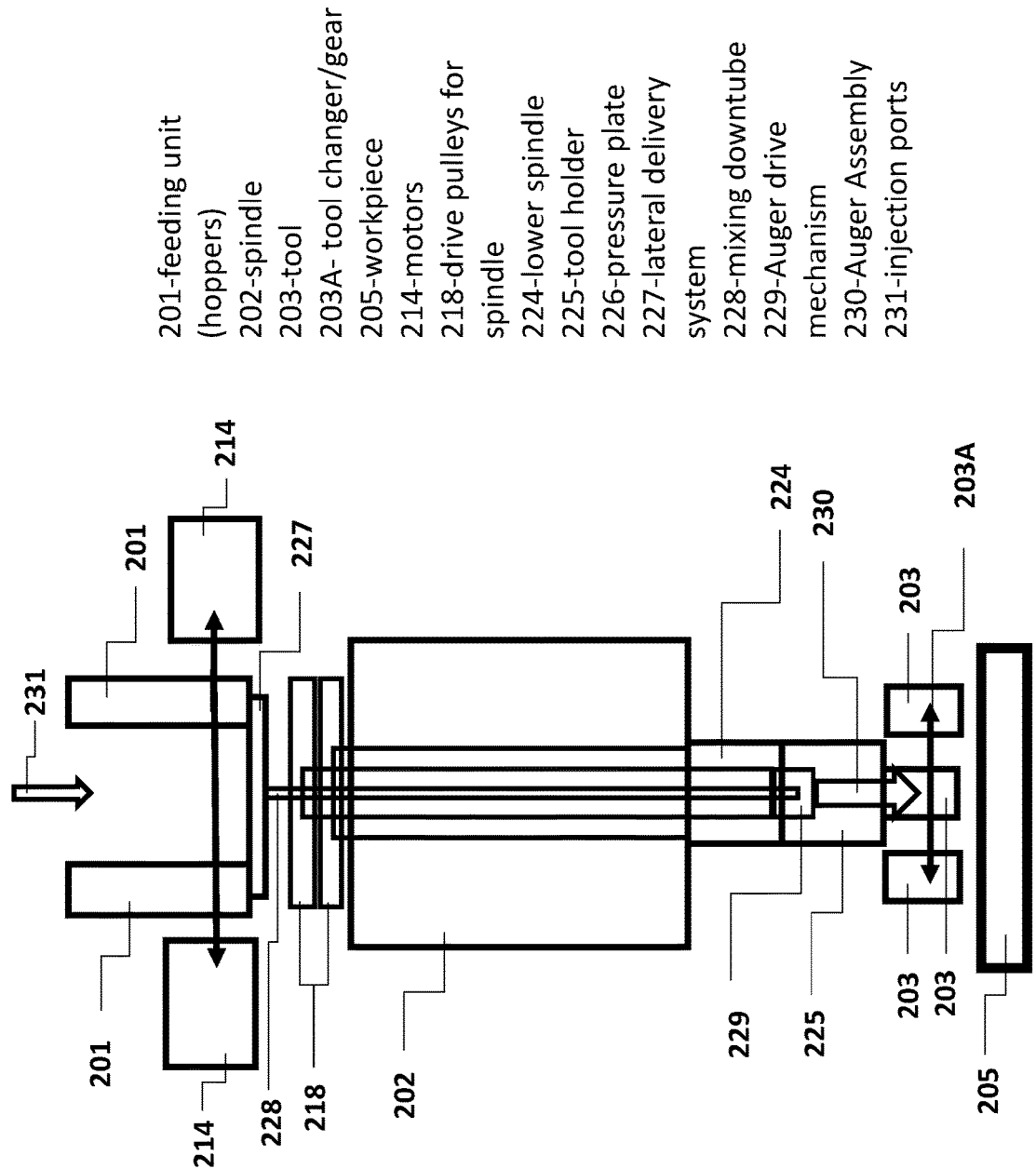
FIG. 2C is a schematic diagram of a cross-sectional view of a solid-state additive manufacturing system for powder- or pellet-like filler material according to an embodiment.

Specific embodiments of the invention include a feeding unit for powder- or pellet-type filler material (FIG. 2C). FIG. 2C includes a cross-sectional view of the feeding unit 201, the spindle 202 and the tool 203 with operational passageway 204 and the workpiece 205 for powder- or pellet-like filler material. Other system components, such as the motors 214, drive pulleys for the spindle 218, secondary spindle, which is floating (non-driven) 223, lower spindle 224, tool holder 225, pressure plate 226, lateral delivery system 227, mixing downtube 228, Auger drive mechanism 229, Auger Assembly 230 and optional injection ports for liquid additives (e.g. lubricants, catalysts, etc.) 231 are presented, as well.

The feeding units include an actuator 220, a push rod 221, two guide rods and cross member, wherein the actuator creates a downwards force to push feedstock onto substrate through a push rod, wherein the guide rods and cross member are for stabilizing the push rod. Furthermore, the embodiment includes a spindle housing for solid (rod) filler material (FIGS. 2A and 2B) and for powder- or pellet-type filler material FIG. 2C) comprising: bearings, oiler system spindles and a hole in the center; wherein the bearings allow rotation of spindles 202, wherein the spindles 202 drive the tool 203 for rotating through a tool holder 225, wherein the hole in the center allows feedstock to get through the spindles.

Yet in another embodiment, injection ports 231 are installed around the feeding unit (e.g. around the hoppers in FIG. 2C) to add additives (lubricants, stabilizers, catalysts, initiators and others) to the filler material.

In another embodiment, the feeding system is capable to accept scrap pieces disregarded from certain industries or applications, which pieces differ in size and shape.

Specific embodiments include a tool holder 225 with a throat. The tool holder is capable to hold and rotate the tool, and the throat allows feedstock to get through it.

Another embodiment includes a tool changer 203A (FIG. 2C), which enables changes of one or multiple tools; certain example includes changing with the same tool for the purpose of replacing a worn tool of the same type, or another example is changing to a different tool with the purpose to impart a different functionality in the deposited layer during the deposition process. In embodiments, a tool changer 203A is optional and can be configured for example similar to the twisting head of a microscope where lenses with different magnifications can be selected and moved or rotated into a working position, e.g., the tool changer 203A can comprise a variety of tools disposed in dormant positions (e.g., waiting to be used) and can comprise a mechanism for automatically or manually positioning a selected tool into an active position (e.g., where the tool can actively be used). Other examples include changing tools with variety of tool geometries and tool throat designs to be implemented during the deposition process affecting the track thickness and width, deposited material compositions and structures, etc.

Specific embodiments also include a tool 203 comprising: a non-consumable member having a body and a throat; wherein the throat is shaped to exert frictional and other forces on a consumable coating material disposed therein for imparting rotation to the coating material from the body when rotated at a speed sufficient for imposing frictional heating of the coating material against a substrate; wherein the body is operably connected with means for dispensing and compressive loading of the deposit material from the throat onto the substrate and with means for rotating and translating the body relative to the substrate; wherein the body comprises a surface for trapping deposit material loaded on the substrate in a volume between the body and the substrate and for forming and shearing a surface of a deposit on the substrate.

Figure 3A:
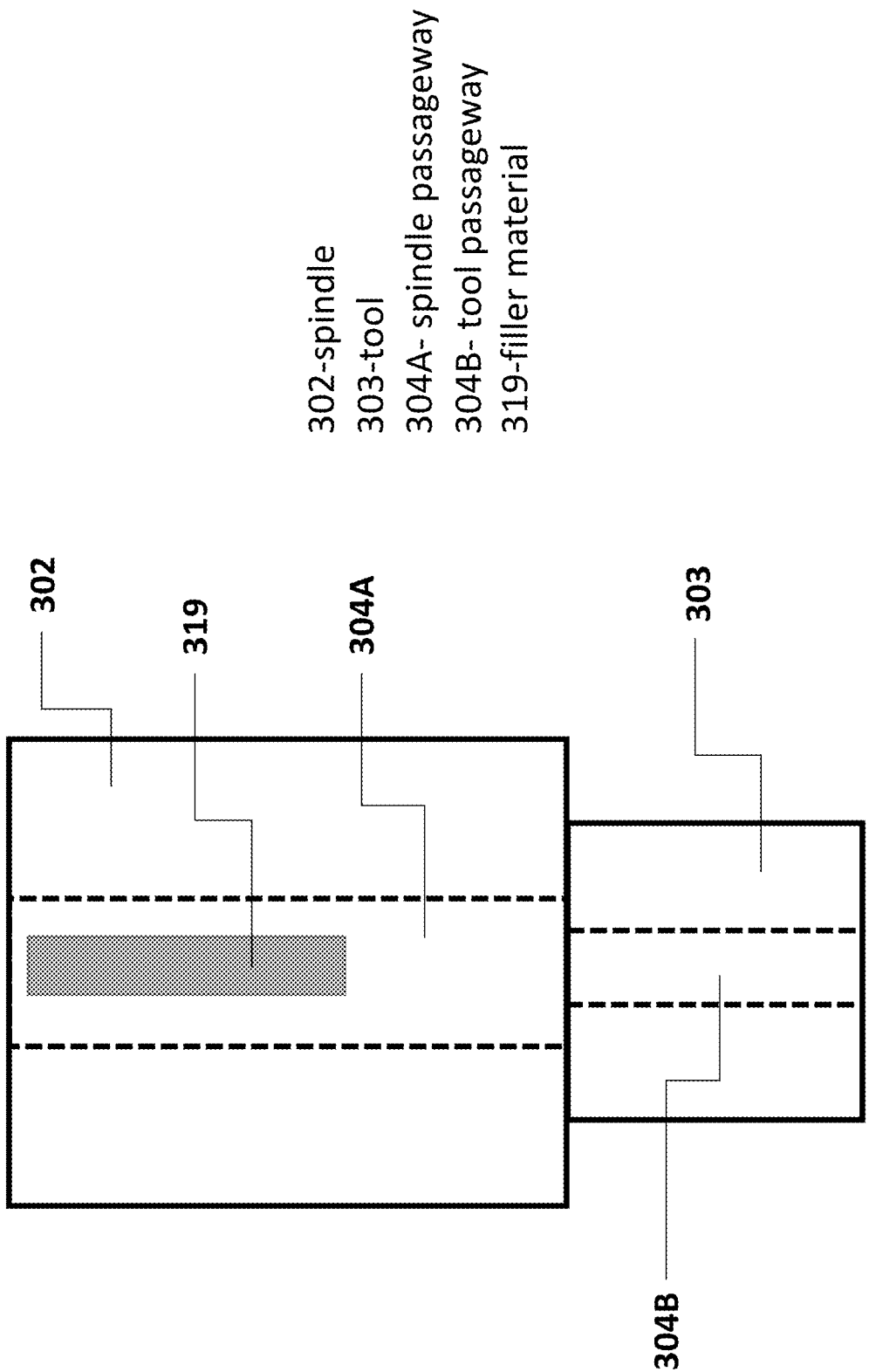
FIG. 3A is a diagram showing a cross-sectional view of a solid-state additive manufacturing spindle and tool with internal passageways that are in communication with each other according to an embodiment.

In some embodiments, the spindle 302 includes a spindle passageway 304A and tool 303 includes a tool passageway 304B in operable communication with each other (FIG. 3A). A filler material 319 is fed through the spindle passageway 304A. In other embodiments, one or more injection ports (not shown) are installed to add additives (lubricants, stabilizers, catalysts, initiators and others) to the filler material in the main passageway 304A of the spindle 302.

According to some embodiments, the tool materials can be the following but not limited to tool steels, W-based materials, WC-based materials, WRe—HfC materials, W—La materials and PCBN materials.

Figure 3B:
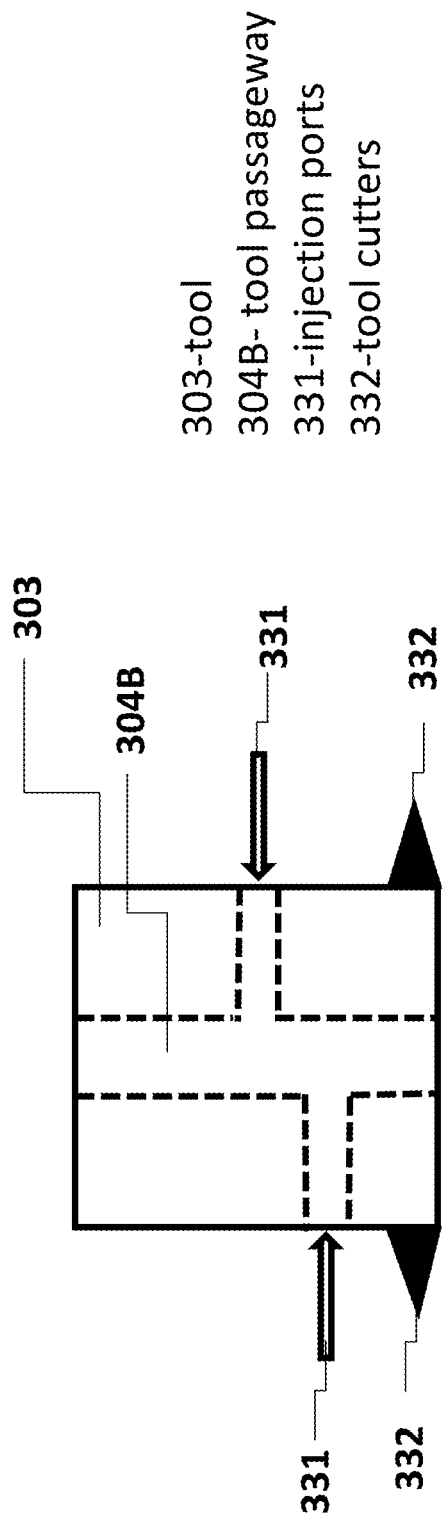
FIG. 3B is a diagram showing a cross-sectional view of a tool with optional injection ports and side cutters according to an embodiment.

Yet in another embodiment, the non-rotating tool body 303 comprises one or more injection ports 331 with internal passage connecting the port(s) to the main throat 304B of the tool for supplying additives to the main filler material, such as lubricants, cross-linkers, initiators, catalysts, stabilizers and so on (FIG. 3B).

In some embodiments, the tool 303 is equipped with certain accessories, such as tool cutters 332 located on the peripheral side of the tool, and are being used for cutting "extra" material that is flashing during the deposition process (FIG. 3B).

Figures 3C, 3D:
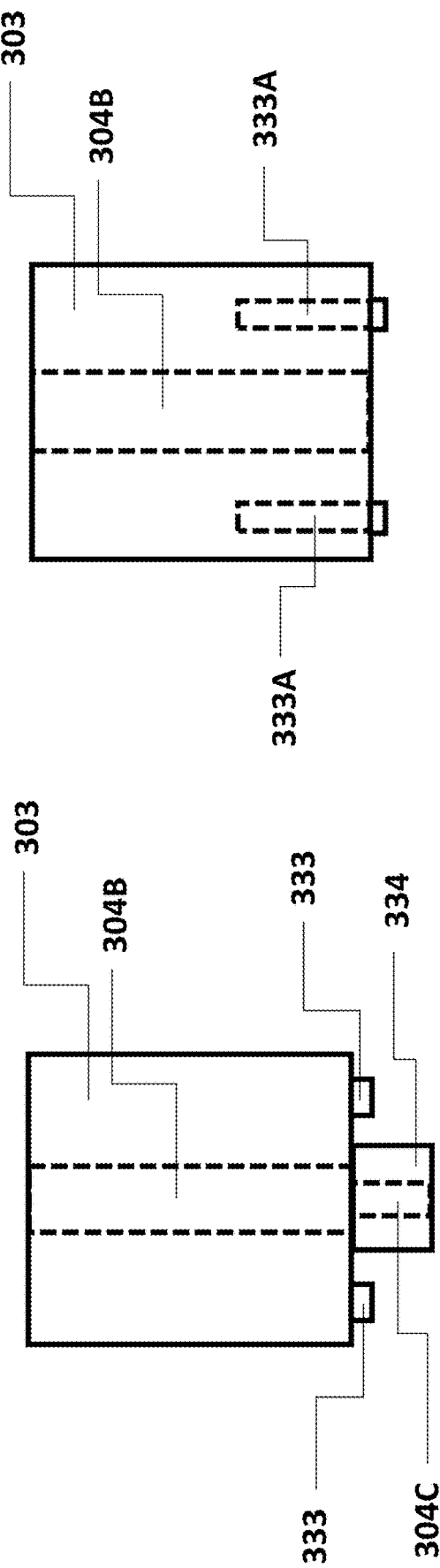
FIG. 3C is a diagram showing a cross-sectional view of a tool with optional hollow pin and nubs according to an embodiment.
FIG. 3D is a diagram showing a cross-sectional view of a tool with optional replaceable nubs according to an embodiment.
Figure 3E:
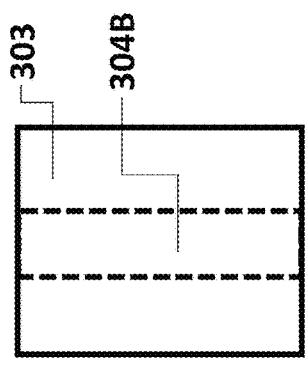
FIGS. 3E-K are diagrams showing cross-sections of different tool shapes according to embodiments.
Figure 3F:
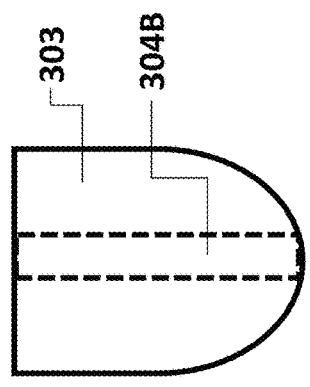
Figure 3G:
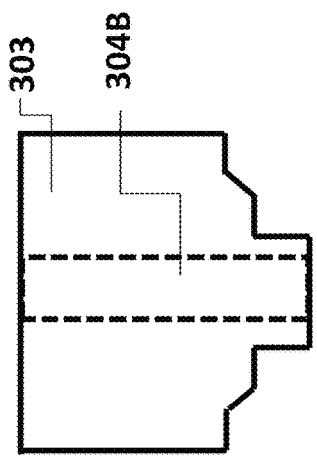
Figure 3H:
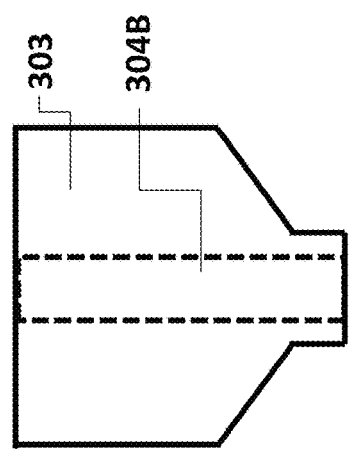
Figure 3I:
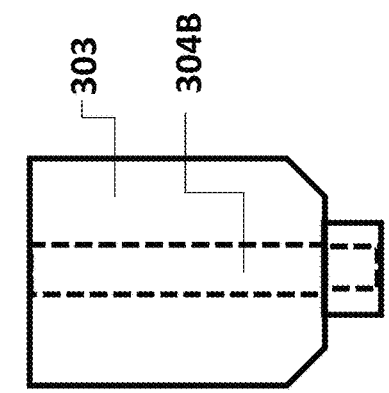
Figure 3J:
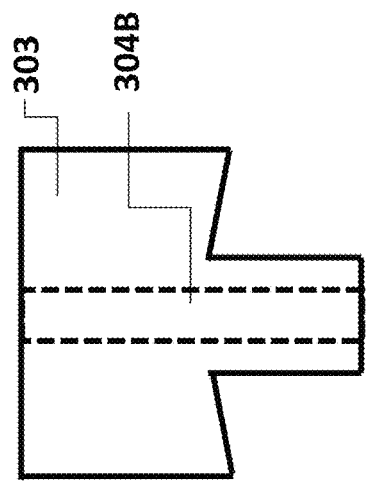
Figure 3K:
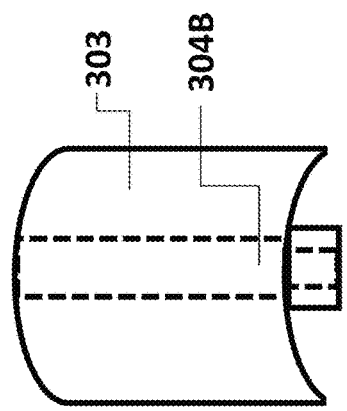

Furthermore, in some embodiments, a pin 334 with a throat 304C extends from the tool shoulder, where the pin throat 304C is in operational communication with the tool throat 304B (FIG. 3C). A pin 334 in all embodiments is an optional component of the solid-state additive manufacturing additive manufacturing system. The pin 334 enables better stirring of the surface region of the workpiece and the filler material. In certain embodiments, the hollow pin might contribute to a better joining of dissimilar materials or parts, where the supplied filler material from the pin throat acts as a sealant.

In some embodiments, the tool shoulder facing the workpiece comprises at least one nub 333 made of the same or different material as the tool material (FIG. 3C).

In some embodiments, the geometry structures on tool shoulder may be nubs having various shapes and located in various positions of the tool shoulder for enhancing mechanical stirring of the deposited material.

In some embodiments, the tool shoulder may extend into a pin 334 with passageway 304C in operational communication with the tool passageway 304B (FIG. 3C), which is particularly useful when dissimilar materials need intensive stirring and/or joining.

In yet other embodiments, the nubs 333A are replaceable (FIG. 3D). The replaceable nubs will extend significantly the tool life-time as it allows only the nubs to be replaced after they undergo certain wear and not the whole tool. Moreover, the nubs can be made of stronger and more expensive material than the tool material, e.g. diamond or sapphire or PCNB or W—Rh—Hf or Ti, and thus, provide less expensive tool but still enough strong to withhold the extreme-wear stirring conditions.

In some embodiments the tool geometry varies with the shoulder having flat, convex or concave shape or any other shape. Some examples of cross-sections of tools of various shapes are given but not limited to those presented in FIGS. 3E-K.

In embodiments the tool body can comprise an internal passageway. The passageway might have a variety of cross-sectional shapes 304B, such as a square, circular, oval, rectangular, star-like, hexagonal or any other cross-sectional shape (FIGS. 3L-3R) as shown via the bottom views of different tool shoulders 303A.

Furthermore, in certain embodiments, beside the surface features of the shoulder, the nubs 333 having various shapes and sizes are displaced at different locations on the tool shoulders 303A (FIGS. 3S-3V). These figures also show tool shoulders 303A with various passageway cross-sections 304B.

Figure 3Y:
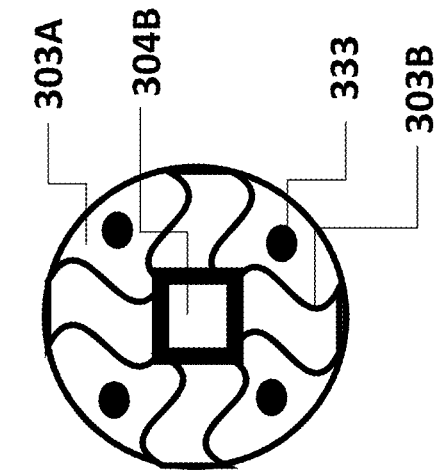
FIGS. 3W-Y are diagrams showing bottom views of tool shoulders with various passageway cross-sections, nubs, and/or different shoulder features according to embodiments.
Figure 3X:
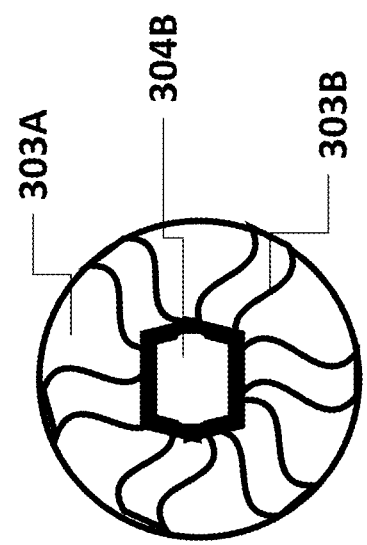
Figure 3W:
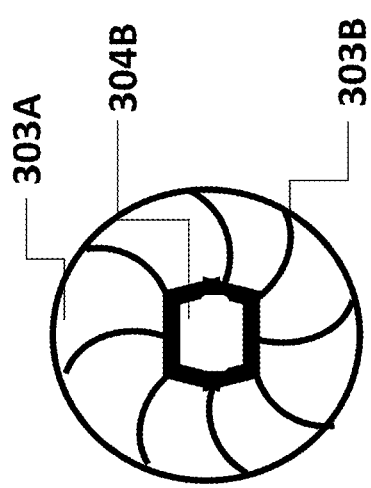
Figure 3A:
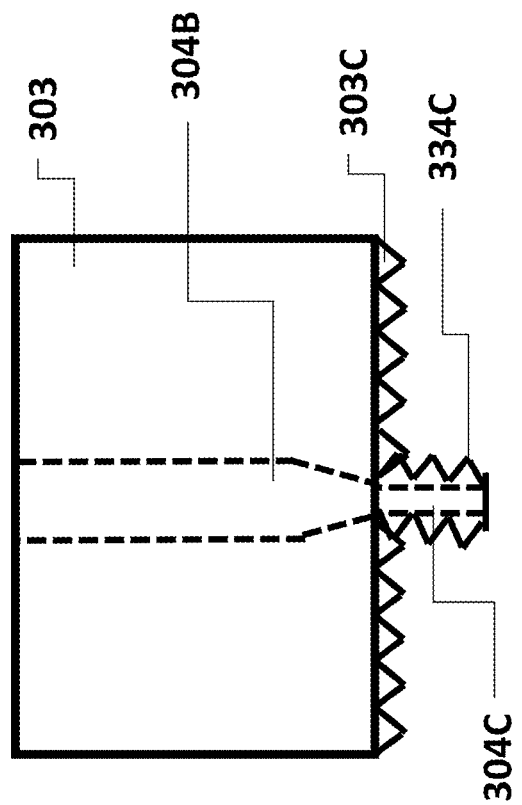
Figure 3A:
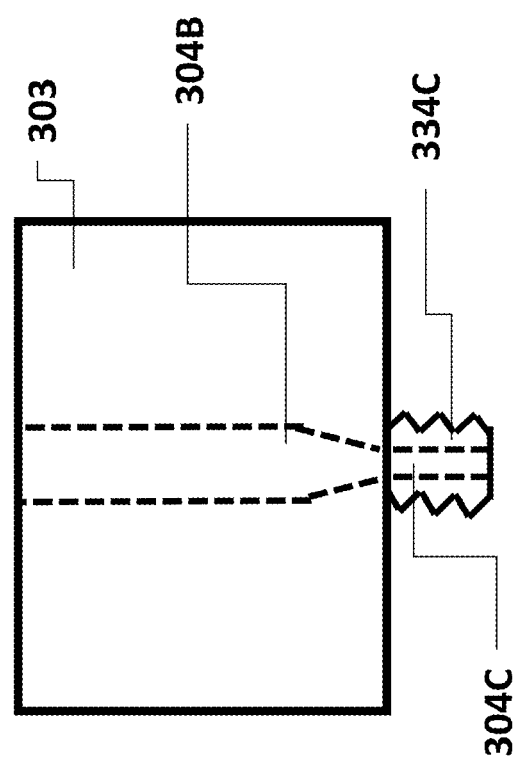
Figure 3A:
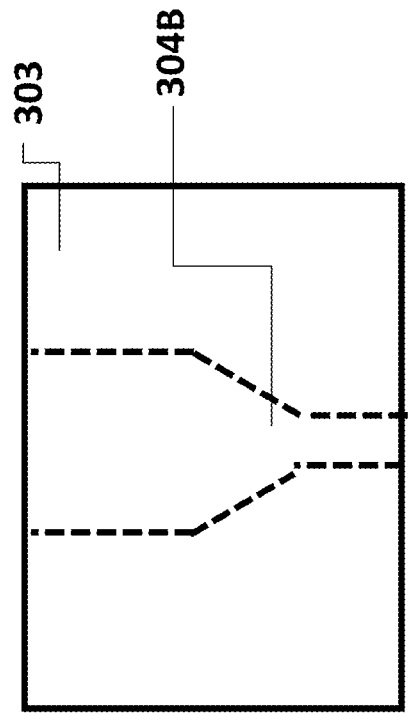
Figure 3A:
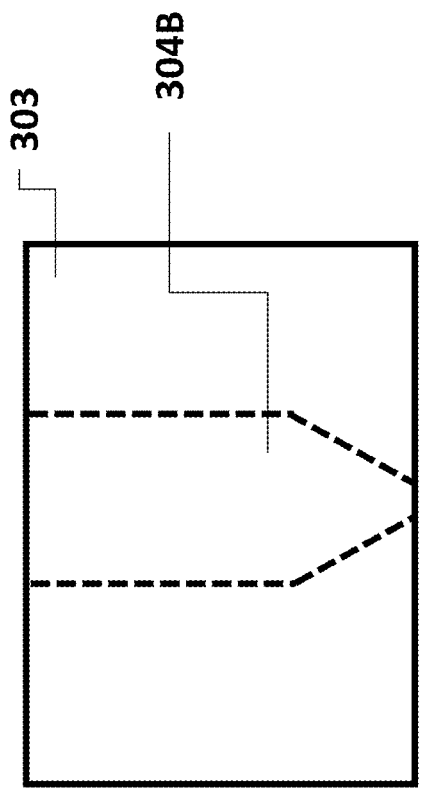
Figure 3A:
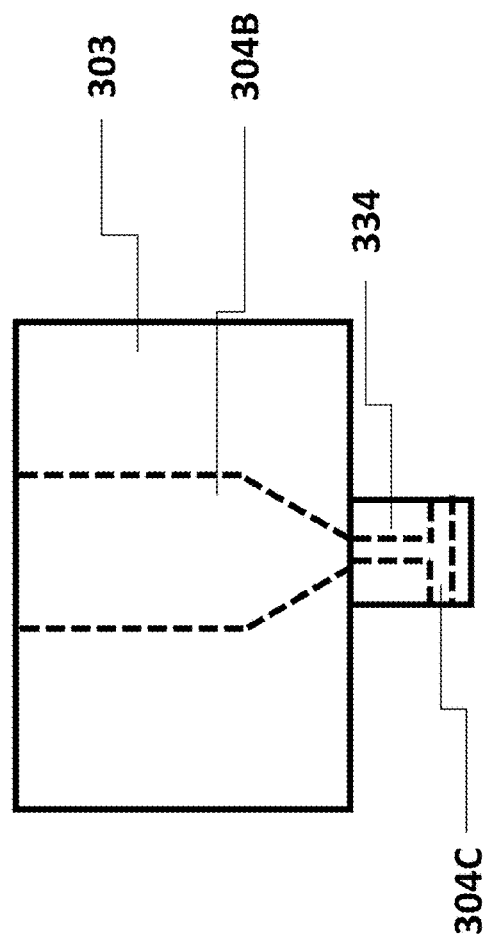
Figure 3A:
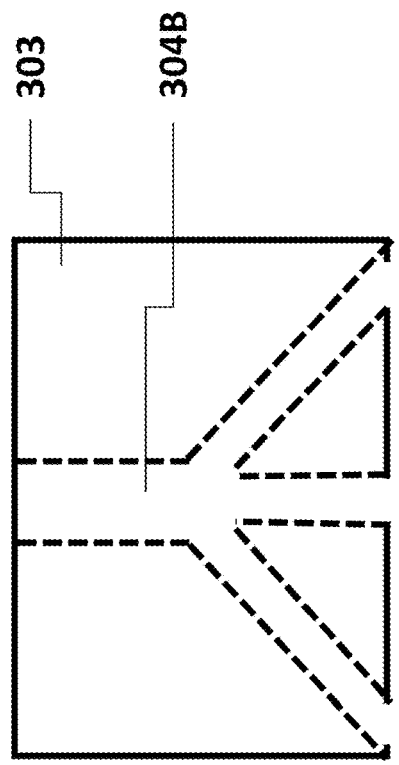
Figures 5A, 5B, 5C, 5D, 5E:
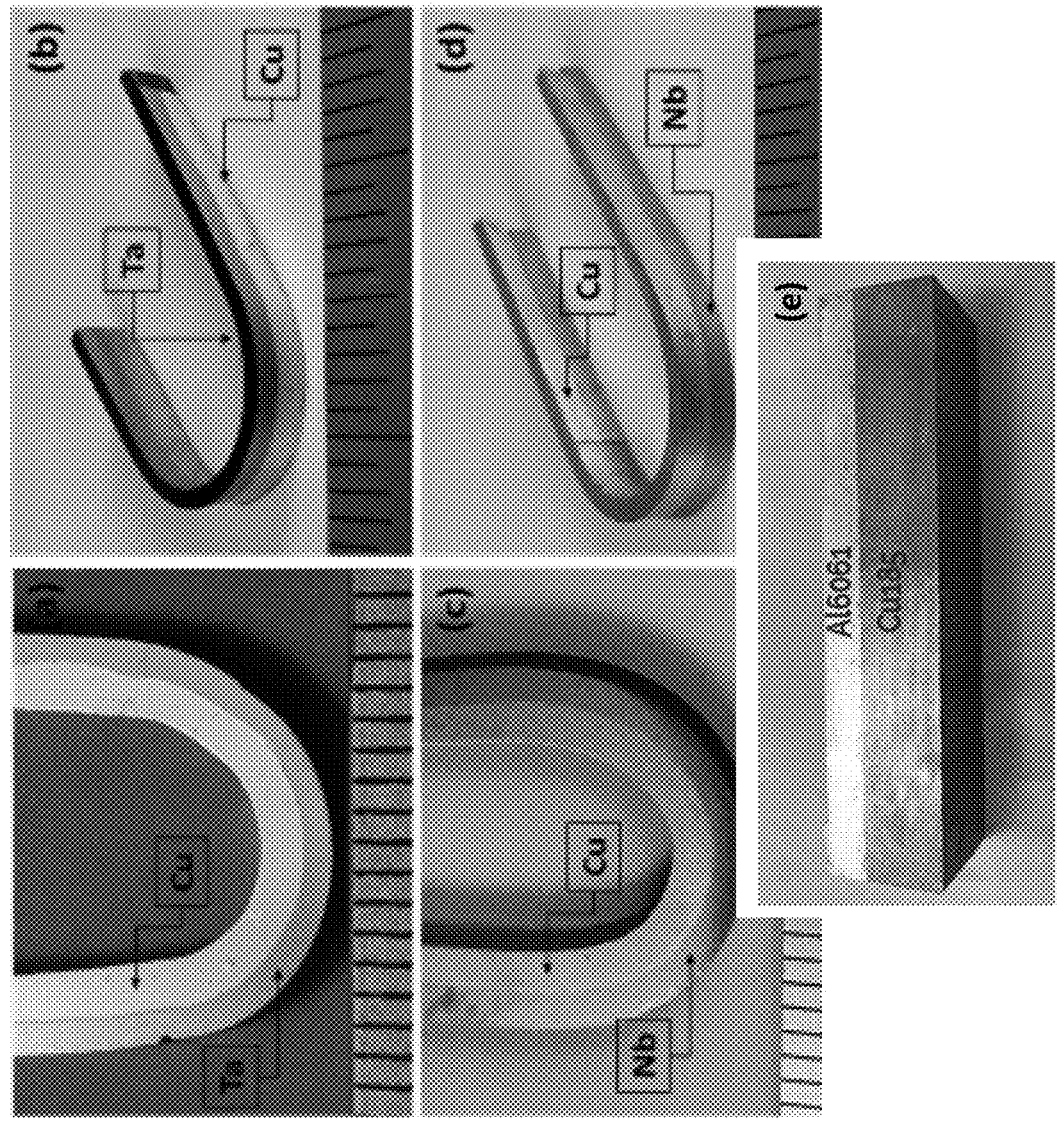
FIGS. 5A-E are photographs of samples coated with the solid-state additive manufacturing system according to embodiments.

In yet other embodiments (FIGS. 3W-3Y), the tool shoulders 303A might have certain passageway cross-sections 304B, optional nubs 333 and different shoulder features 303B. The surface features (spiral, propeller-type features and so on) are capable of increasing the efficiency of the material displacement and its stirring underneath.

In another embodiment, the tool comprises tapered shoulder and or/tapered hollow pin, if the pin is used. FIGS. 3Z-AB are schematic presentations of cross-sections of tools 303 with tapered tool shoulder geometries 303C. FIGS. 3AC-AD are schematic presentations of cross-sections of tools 303 with optional hollow pin with tapered surface 334C. The tapered shoulder and/or pin (if used) enable better stirring in the surface area of the workpiece with the filler material. The tapered zone on the shoulder and the pin (if used) might be filled with features of the same or various shapes and sizes.

In embodiments, the passageway of the spindle in communication with the tool passageway may change its cross-sectional shape and size as it advances from the feeding section through the spindle and the tool. FIGS. 3AE-AF are schematic presentations of cross-sections of tools 303 where the tool passageway 304B changes the cross-section shape and/or size. The internal passageway of the spindle or tool can diverge or converge, they can diverge or converge in the same direction or in opposite directions.

In some embodiments, the spindle and/or the tool might have multiple passageways for supplying the filler material. FIG. 3AG is a schematic presentation of a cross-section of a tool 303 where the tool passageway 304B splits in multiple passageways to deliver a powder or a pellet filler material on the workpiece surface.

FIG. 3AH is a schematic of a cross-section of a tool 303 with pin 304, where the pin passageway 304C splits in multiple passageways to deliver a powder or a pellet filler material on the workpiece surface.

FIGS. 3AI-AJ are schematic presentations of cross-sections of a tool 303 with multiple passageways 304B.

FIGS. 3AK-AM are bottom views of tool shoulders 303A with multiple passageways 304B and optional nubs 333.

The tool can include a passageway that branches in two or more openings toward the end of the tool passageway for e.g. the filler material to cover wider area on the workpiece surface (FIGS. 3AG-3AH).

The tool shoulder can include nubs, static or replaceable, in addition to the multiple passageways. The passageways can have any cross-sectional shape, some of them as presented in FIGS. 3L-3R. In the case of multiple passageways, a circular cross-section, shown in FIGS. 3AK-3AM, is presented as an example only.

In some embodiments, the environmental "chamber or shield" 112 is a flexible part of the system. It provides a space enclosure around the working piece, the tool and the spindle useful when deposition in a controlled atmosphere is required. In specific examples, the supply of gasses in the enclosed environment enables sensitive to air (oxygen) materials to be deposited, thus avoiding oxidation of the material during the deposition. In other examples, the enclosed space provides certain gas environment which together with the filler material contributes toward the final composition and/or structure of the deposited material. In this way, metal nitrides are possible to be deposited from metals and metal alloys in a nitrogen environment, or porous structure, such as Al-foams and polymer foams, are possible by blowing air or gasses during the deposition of the filler materials.

Filler Materials

In certain embodiments, the filler material and substrate can each be metallic materials, metal matrix composites (MMCs), polymers, ceramics, plastic compositions, such as polyolefins, polyurethanes, Teflon-type polymers, polyesters, polyacrylates, polymethacrylates, polyamides (nylons), styrene, engineering plastics (PSU, PEI, PEEK, PEAK) or metals independently chosen from steel, Al, Ni, Cr, Cu, Co, Au, Ag, Mg, Cd, Pb, Pt, Ti, Zn, Fe, Nb, Ta, Mo, W, or an alloy composing one or more of these metals.

In some embodiments the filler material 119 is a rod, powder, pellet, powdered-filled tube, wire, or scrap pieces, or any combination of them.

In embodiments, the filler material can be the reinforcing material in form of micro- and nano-particles, fibers, multi-wall or single-wall carbon nanotubes (MW-CNT and/or SW-CNTs) and others added to a polymer or metal to enhance properties of the base material.

In yet another embodiment, the filler material is a composition comprising base matrix, metal or polymer, metal alloy, polymer blend or composite, with certain additives such as lubricants, stabilizers, initiators, catalysts, cross-linkers, etc.

The means for creating various forces on a material in the throat during rotation of the tool body may be a throat having a non-circular cross-sectional shape. Additionally, any filler material may be used as the deposit material, including consumable solid, powder, pellets, or powder-filled tube type deposit materials. In the case of powder-type deposit material, the powder is a loosely or tightly packed within the interior throat of the tool, with the forces being more efficiently exerted on tightly packed powder filler material. Packing of the powder filler material is achieved before or during the deposit process.

In some embodiments, the tool and depositing material preferably rotate relative to the substrate. The tool can be attached to the depositing material and optionally in a manner to allow for repositioning of the tool on the deposited material. Such embodiments can be configured to have no difference in rotational velocity between the depositing material and tool during use. The depositing material and tool can alternatively not be attached to allow for continuous or semi-continuous feeding or deposition of the depositing material through the throat of the tool. In such designs, it is possible that during use there is a difference in rotational velocity between the depositing material and tool during the deposition. Similarly, embodiments provide for the depositing material to be rotated independently or dependently of the tool.

Preferably, the depositing material is delivered through a throat of the tool and optionally by pulling or pushing the depositing material through the throat. In embodiments, the depositing material has an outer surface and the tool has an inner surface, wherein the outer and inner surfaces are complementary to allow for a key and lock type fit. Optionally, the throat of the tool and the depositing material are capable of lengthwise sliding engagement. Even further, the throat of the tool can have an inner diameter and the depositing material can be a cylindrical rod concentric to the inner diameter. Further yet, the tool can have a throat with an inner surface and the depositing material can have an outer surface wherein the surfaces are capable of engaging or interlocking to provide rotational velocity to the coating material from the tool. In preferred embodiments, the depositing material is continuously or semi-continuously fed and/or delivered into and/or through the throat of the tool. Shearing of any deposited material to form a new surface of the substrate preferably is performed in a manner to disperse any oxide barrier coating on the substrate.

Solid-State Additive 3D Printing

In some embodiments, the disclosed solid-state additive manufacturing system is capable to build up (3D print) 3D parts. FIG. 4A is a schematic presentation of a process of deposition of filler material 419 on a workpiece 405 resulting in deposited layers 435. Solid-state additive manufacturing processes, such as 3D printing, coating, joining, repair and in situ surface functionalization are possible with the solid-state additive manufacturing system. Use of one or more external energy sources, 407, e.g. sources of electric field, magnetic field, vibration, heat, UV light and so on, during the processes is optional.

Several examples of solid-state additive manufacturing printed objects are in FIGS. 4B-4G.

In embodiments, the parts formed by the solid-state additive manufacturing system with 3D deposition exhibit anisotropic mechanical properties achieved by depositing e.g. a filler material doped with anisotropic particles with high mechanical properties. By preferential deposition of such filler material and/or application of external energy source 407, preferential orientation of the dopant particles is possible yielding parts with anisotropic mechanical properties.

In embodiments, the solid-state additive manufacturing deposition process can be used in combination with other manufacturing processes as the final step or staring step or as an intermediate step. For example, a plastic part is produced by a different process, e.g. by injection molding, and then, subjected to the solid-state additive manufacturing process for coating the part with e.g. a conductive coating, or simply causing a surface modification of the plastic part.

In embodiments, the solid-state additive manufacturing system is suitable for deposition of a variety of 3D structures (parts) of numerous materials. In some embodiments, such parts can be made of conductive materials or insulating materials. The conductive materials used can be intrinsically conductive materials, or can be insulating materials or semiconducting materials doped with conductive particles. In yet other embodiments, the conductive parts can be made to exhibit anisotropic conductivity, i.e. will exhibit enhanced conductivity in a certain direction, while the conductivity in the other two directions is much lower. This is possible by using conductive dopants with high aspect ratio in the insulating or semi-conductive filler materials and their preferential orientation during the deposition process.

In other embodiments, the solid-state additive manufacturing system is capable to add customized features or attach pre-made features or reinforcement structures or other functional features to the workpiece. Specific examples include attaching pre-formed rings to tubular workpieces, such as high-pressure vessel or adding flanges to parts.

Solid-State Additive Coatings and Surface Composites

In certain embodiments, the solid-state additive manufacturing system is used for surface functionalization, surface protection, surface coating and/or cladding. The solid-state additive manufacturing deposition of a coating using particular filler material(s) on a workpiece and providing a good chemical (metallurgical) bonding to the workpiece (substrate, part) is done with the purpose of functionalizing or protecting the workpiece surface (FIGS. 5A-E). As examples only, the deposited coating on a workpiece surface is an anti-microbial coating, corrosion-resistant coating, anti-scratch coating, anti-flammable coating, durable coating, anti-wear coating, electrically-insulating coating, electrically-conductive coating, magnetic coating, coating with high ballistics resistance, coating with pronounced shatter resistance, and so on.

Specific examples include coating of copper (Cu) on niobium (Nb) and tantalum (Ta) substrates like those presented in FIGS. 5A-D. The coated substrates have been bended in different directions after the solid-state additive manufacturing deposition of Cu material showing no signs of delamination or weak bonding between Cu and Nb or Cu and Ta. FIG. 5E is another example, where Al was deposited on copper (Cu) substrate with the disclosed solid-state additive manufacturing system; in all these cases, intermediate layers, sealants or adhesives were not used to bond the presented dissimilar materials.

Figure 6A:
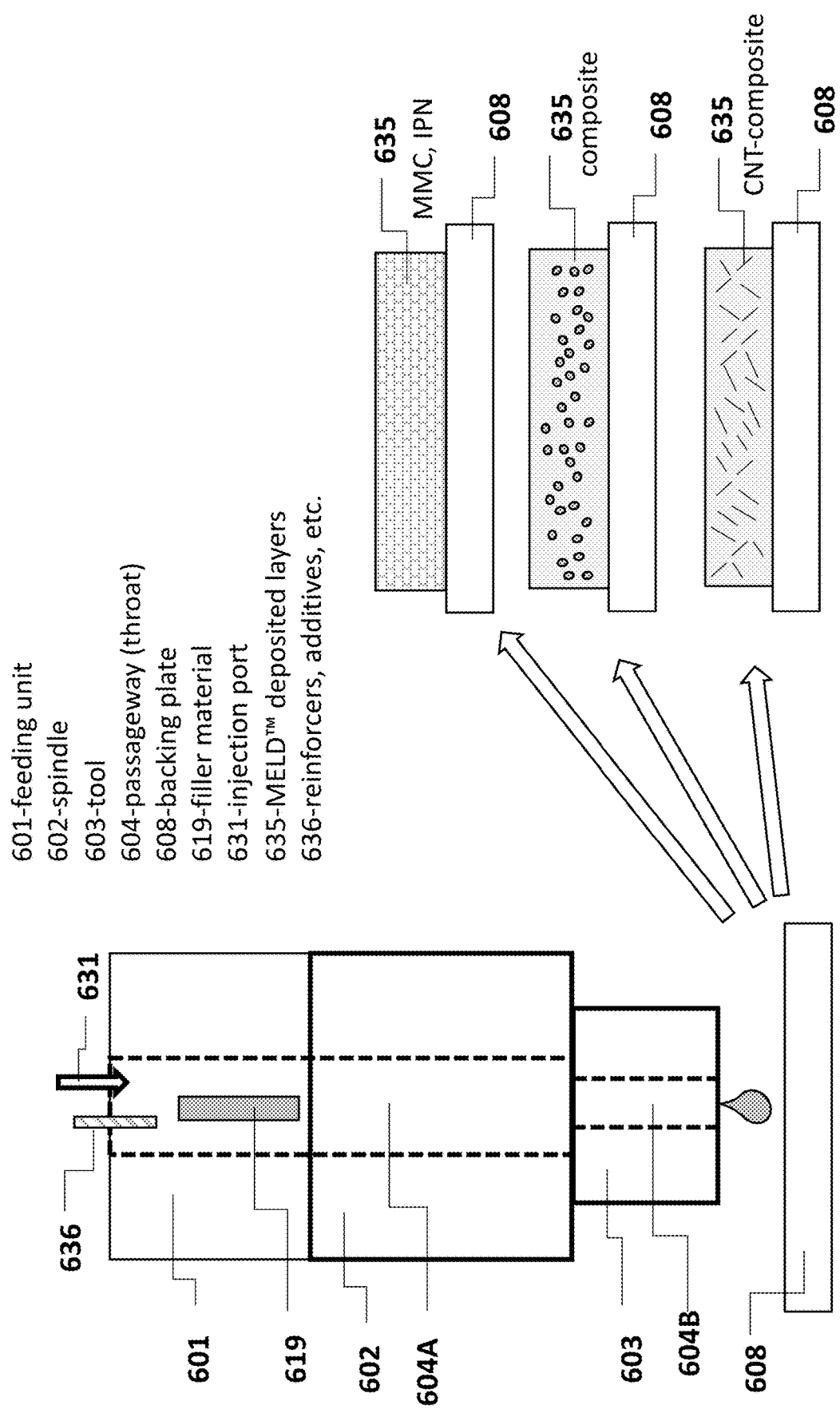
FIG. 6A is a schematic diagram of a solid-state additive manufacturing process in situ compounding and fabrication of proprietary compositions, such as metal matrix composites (MMC), polymer composites, inter-penetrating networks (IPN), reinforced materials and others by mixing, consolidation and deposition of base filler material and reinforcers (and additives, if needed) in one step, according to an embodiment.

In some embodiments, the solid-state additive manufacturing system is used to form an in situ surface composite and subsequently deposit the composite layer only on the surface of a workpiece, where the composite layer is well-bonded to the workpiece (part, substrate. In yet another embodiment, in situ composite formed by the solid-state additive manufacturing system is used to build up the whole 3D printed object. FIG. 6A schematically illustrates the process of in situ compounding and fabrication of proprietary compositions, such as metal matrix composites (MMC), polymer composites, inter-penetrating networks (IPN), reinforced materials and others by mixing, consolidation and deposition of base filler material 619 and reinforcers 636 (and additives, if needed) in one step by the solid-state additive manufacturing system. Deposits 635 of proprietary MMCs, composites and reinforced materials on a backing plate (that can be removed afterwards), or directly on the surface of a workpiece, are possible.

Figure 6B:
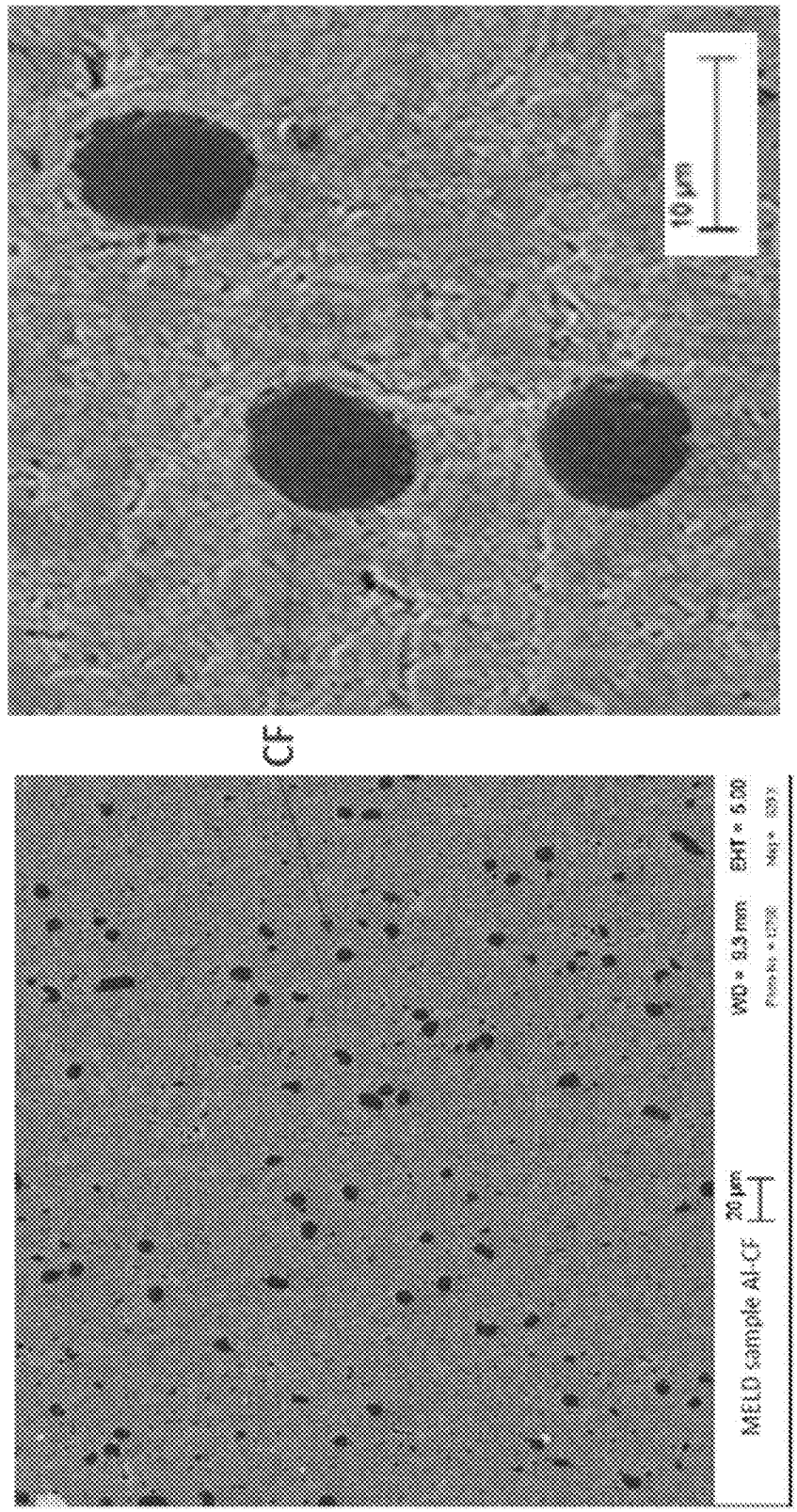
FIG. 6B is a scanning electron microscopy image of an in situ fabricated Al-carbon fiber composite according to an embodiment.
Figure 6C:
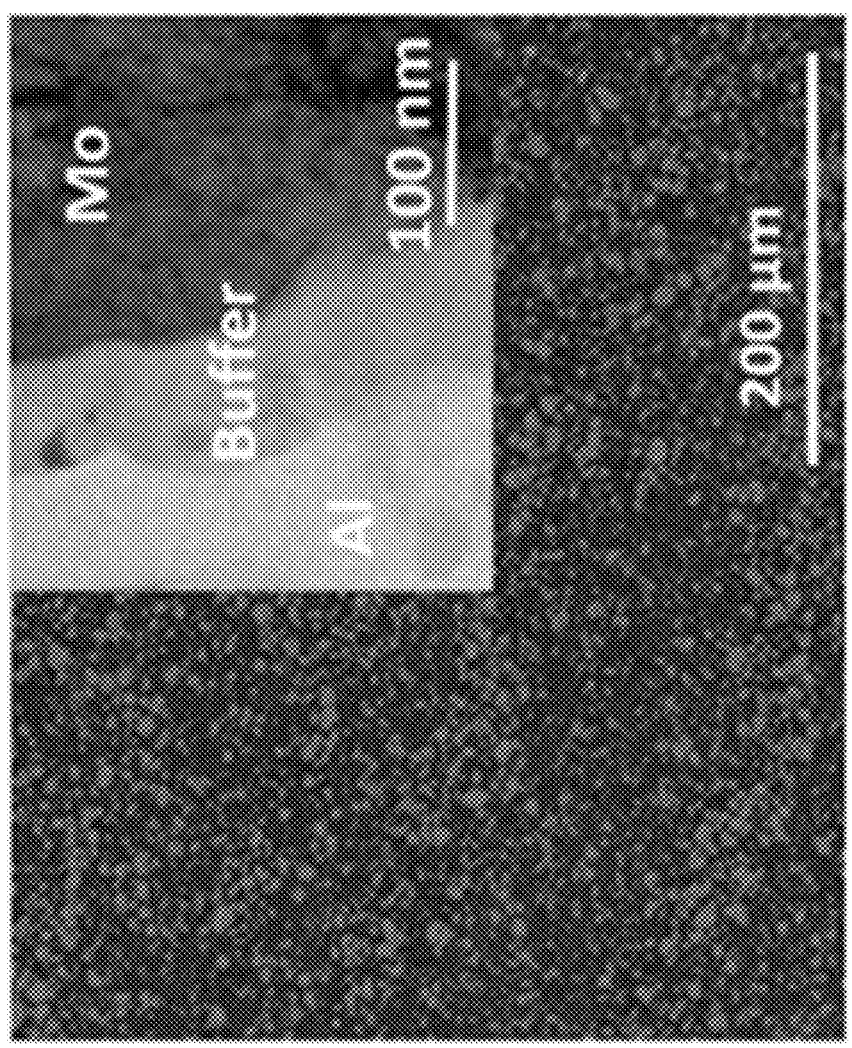
FIG. 6C is a scanning electron microscopy image of an as-deposited Al—Mo composite, which shows a relatively uniform distribution of the reinforcement Mo-particles (~30% volume fraction) in the aluminum matrix; inset: a transmission electron microscopy image showing the formation of a buffer layer between the matrix and reinforcement according to an embodiment.

Examples of reinforced composites fabricated by solid-state additive processes are given in FIGS. 6B-C. In particular, FIG. 6B is a scanning electron microscopy image of in situ fabricated Al-carbon fiber composite. Chopped carbon (C) fibers are being added to aluminum (Al) in the feeding section of the solid-state additive manufacturing system yielding a composite with improved mechanical properties. FIG. 6C presents a scanning electron microscopy image of an as-deposited Al—Mo composite, which shows a relatively uniform distribution of the reinforcement Mo-particles (~30% volume fraction) in the aluminum matrix, while the inset is a transmission electron microscopy image showing the formation of a buffer layer between the matrix and reinforcement. The Al base material is being reinforced with molybdenum (Mo) particles. A uniform distribution of reinforcing particles is accomplished in both cases.

In some embodiments, the surface of the workpiece is drilled with holes or contains pockets or grooves filled with reinforcers. Passing with the solid-state additive manufacturing tool having certain nubs' geometry and adding the filler material on the surface of the workpiece provides an intense stirring in the surface zone and making a surface composite. In the case with anisotropic reinforcing particles (e.g. CNTs), their preferential orientation is possible via application of external electric or magnetic field, and/or moving the tool in a preferential direction. In other embodiment, the anisotropic reinforcing particles along with the filler material are added on the workpiece surface via the throat of the tool.

Figure 6D:
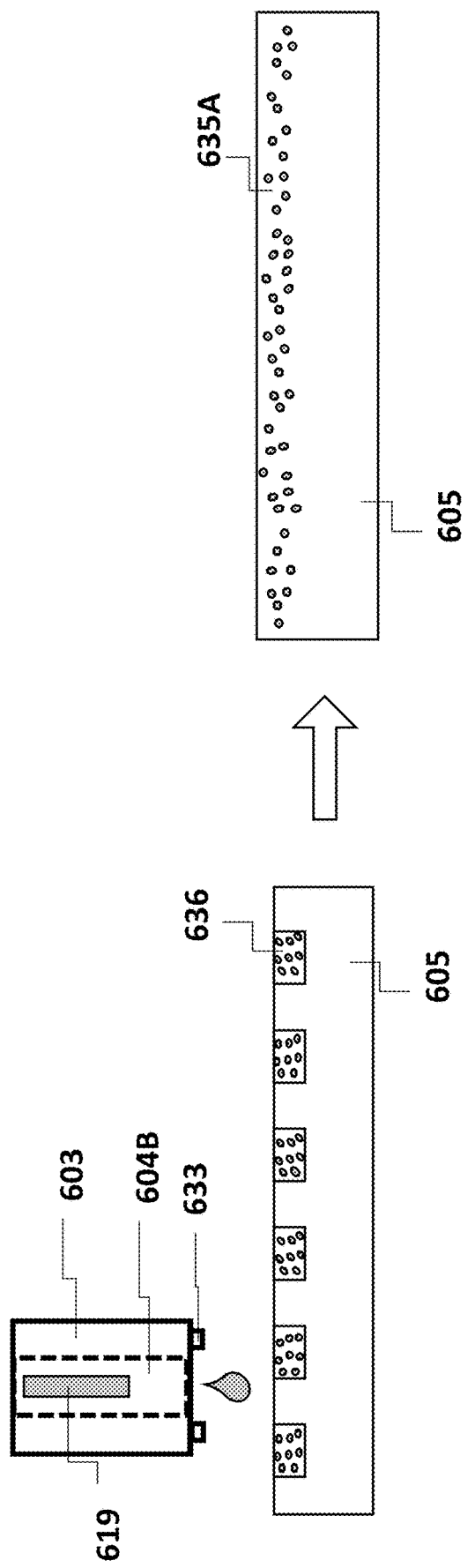
FIG. 6D is a schematic diagram of a solid-state additive manufacturing process of manufacturing surface composites, where the workpiece surface has pockets (holes or groves) filled with the reinforcing particles according to an embodiment.

FIG. 6D schematically illustrates the process of in situ fabrication of surface composites 635A, such as metal matrix composites (MMC), polymer composites, reinforced materials and others by adding the base filler material 619 via the tool passageway 604B, while the reinforcers (and additives) 636 are being placed in pockets, holes or groves on the surface of a workpiece.

Figure 6E:
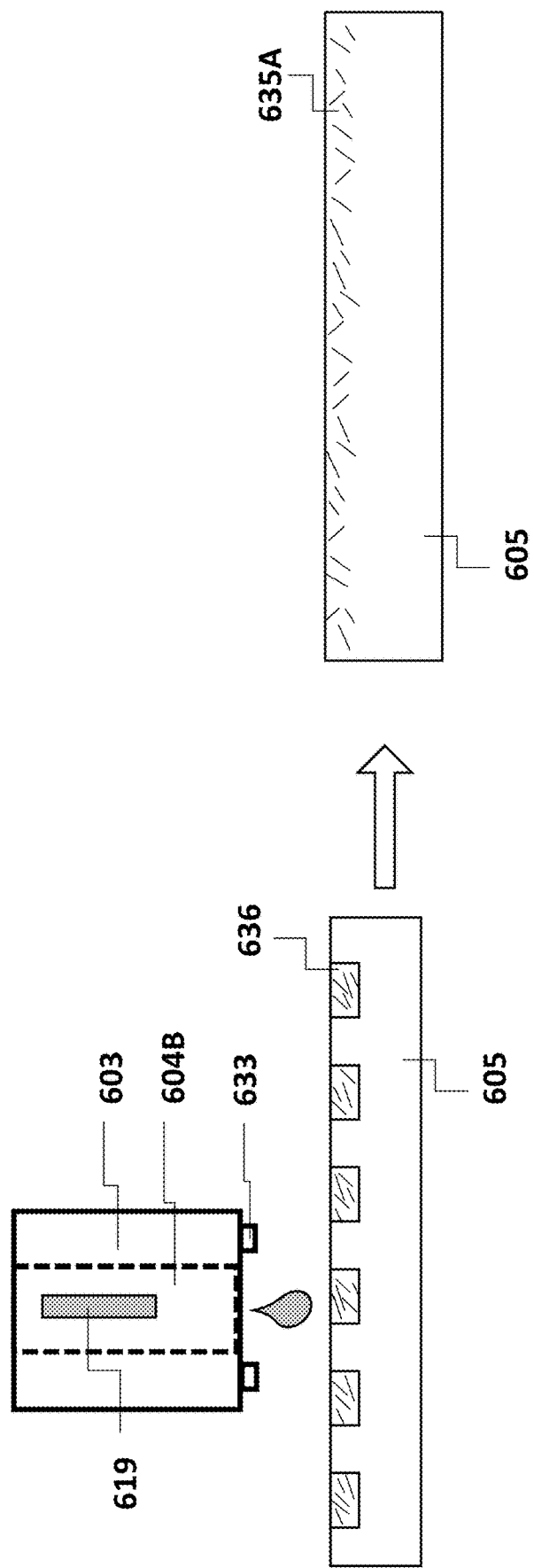
FIG. 6E is a schematic diagram of a solid-state additive process of manufacturing a surface composite according to an embodiment, where the workpiece surface has pockets (holes or groves) filled with the reinforcing particles with anisotropic shape, such as CNTs, according to an embodiment. Without preferential transverse moving of the tool along the workpiece surface, random orientation of anisotropic reinforcers is achieved.
Figure 6F:
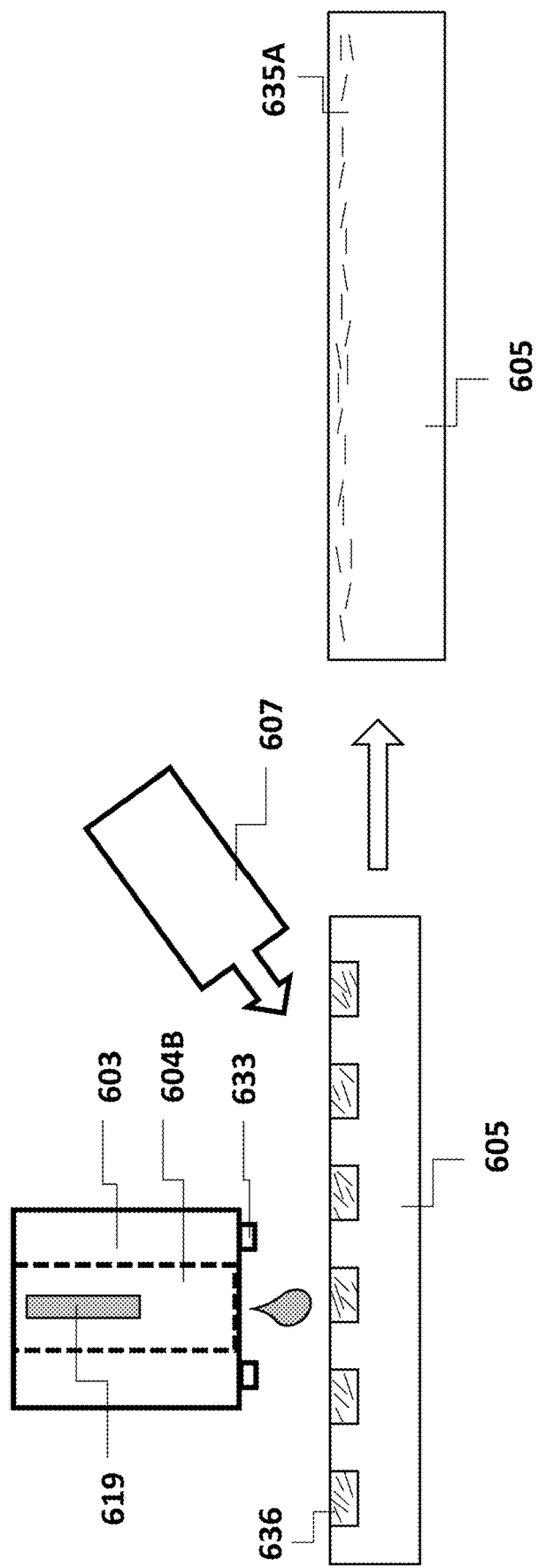
FIG. 6F is a diagram of a solid-state additive process of manufacturing a surface composite according to an embodiment, where the workpiece surface has pockets (holes or groves) filled with the reinforcing particles with anisotropic shape, such as CNTs, according to an embodiment. By application of an external field, e.g. electric field and/or preferential transverse moving of the tool, a preferential orientation of CNTs or carbon fibers is achieved.

FIG. 6E schematically illustrates the process of in situ fabrication of surface composites 635A with reinforcers with anisotropic shape (e.g. needle-like, fiber-like, rod-like reinforcers) by adding the base filler material 619 via the tool passageway 604B, while the anisotropic reinforcers 636 are being placed in pockets, holes or groves on the surface of a workpiece. By applying an external energy source 607 (e.g. electric or magnetic field in preferred direction), the anisotropic reinforcing particles (e.g. carbon nanotubes, chopped carbon fibers, metal fibers, etc.) in the surface composite 635A are preferentially oriented (FIG. 6F).

Figure 6G:
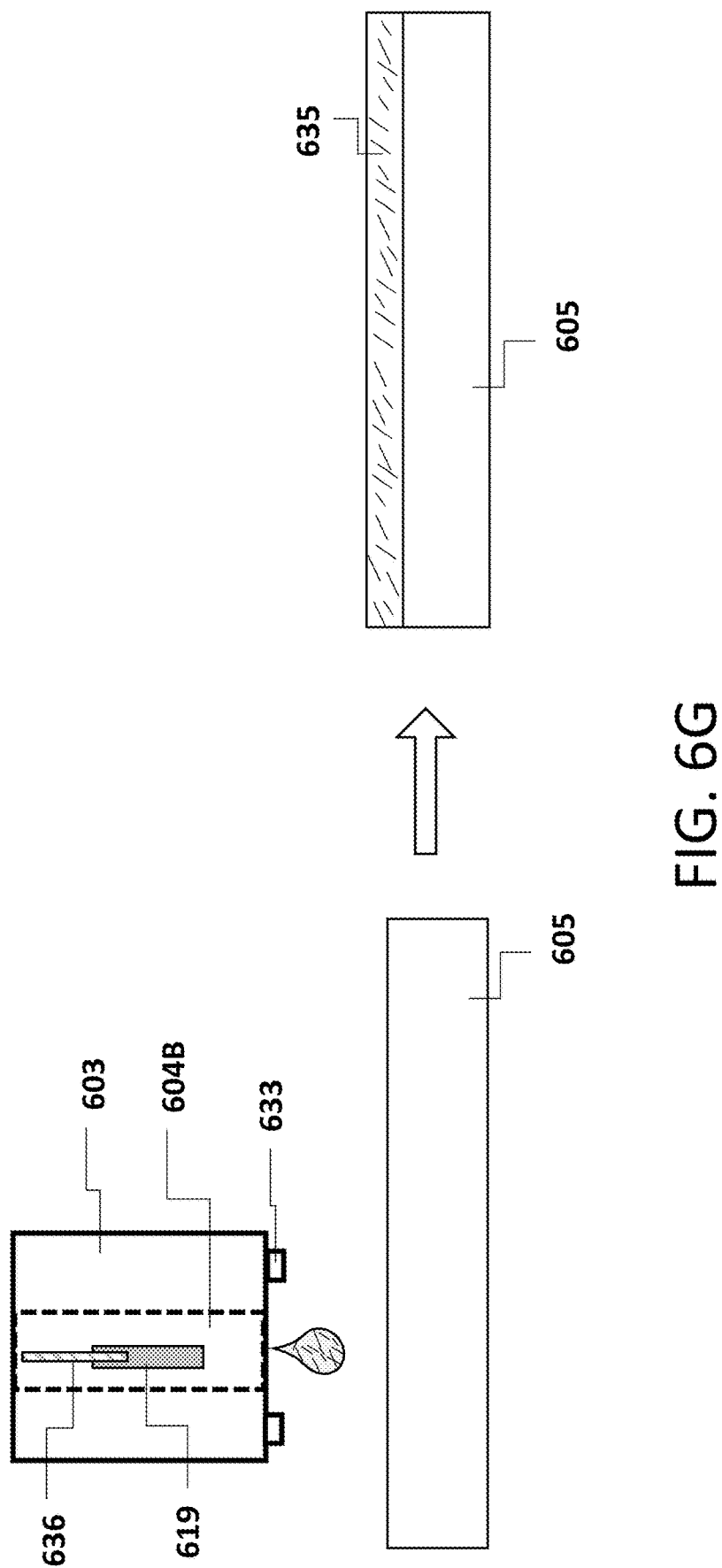
FIGS. 6G and 6H are schematic diagrams of the solid-state additive process of depositing filler material comprising reinforcing particles according to an embodiment, such as CNTs or carbon fibers through the tool throat. Without preferential transverse moving of the tool along the workpiece surface, random orientation of anisotropic reinforcers is achieved (FIG. 6G). By application of an external field, e.g. electric or magnetic field and/or preferential transverse moving of the tool, a preferential orientation of CNTs or carbon fibers is achieved (FIG. 6H).
Figure 6H:
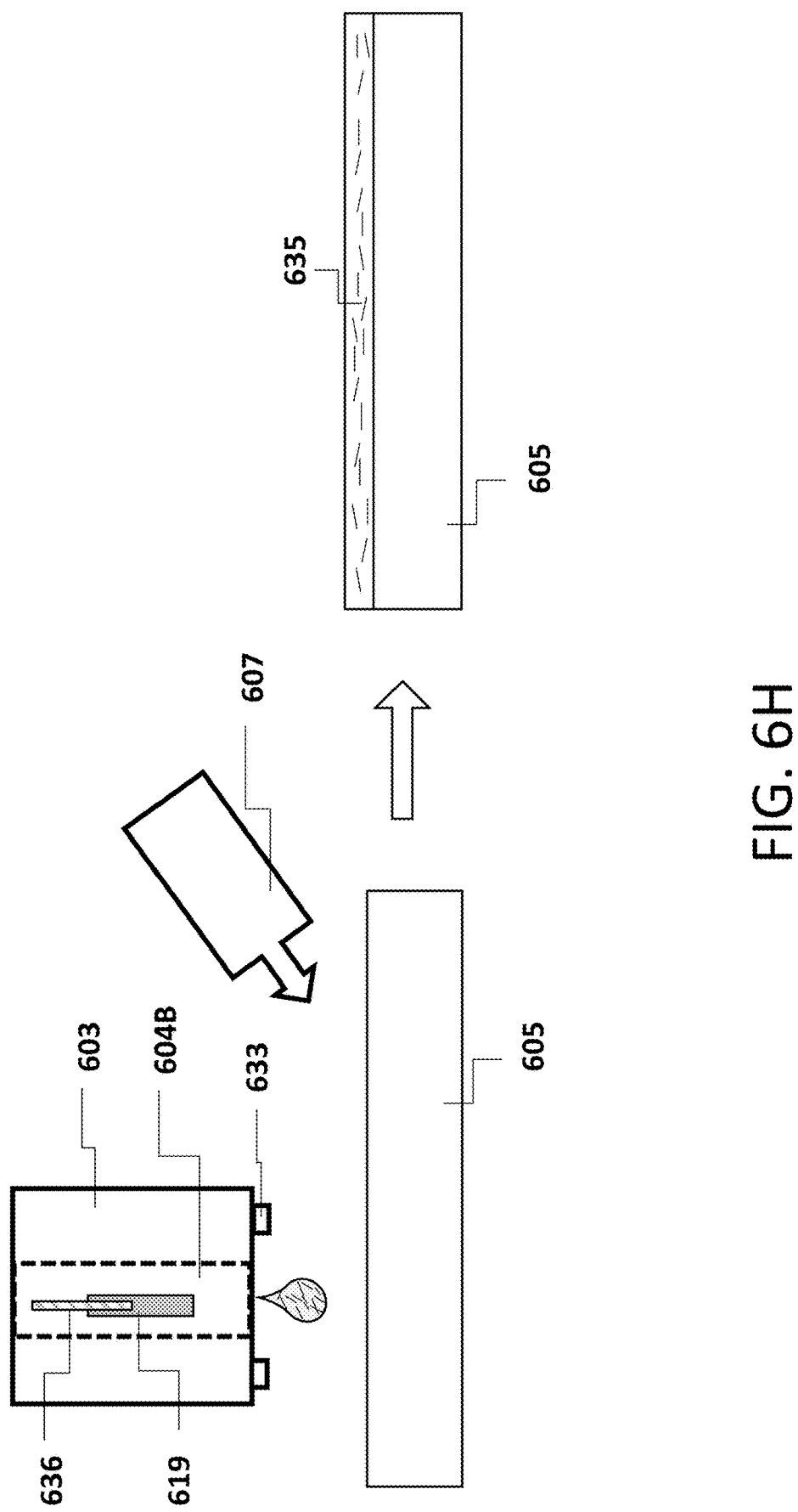

FIG. 6G schematically illustrates the process of in situ fabrication of deposited surface composites 635 where both, the base material 619 and the reinforcers (and additives, if needed), are added via the passageway 604. By applying an external energy source 607 (e.g. electric or magnetic field in preferred direction) in the case of the anisotropic reinforcing particles (e.g. carbon nanotubes, chopped carbon fibers, metal fibers, etc.), the surface composite 635 will be composed of preferentially oriented reinforcing particles (FIG. 6H).

In some embodiments, reinforcing of the workpiece surface is achieved by adding the reinforcers in the surface zone only.

In yet other embodiments, the whole object is printed from the reinforced filled material, and thus, the whole object has improved properties (e.g. mechanical) compared to object build up from the filler material only.

In other embodiments, solid-state additive manufacturing system is capable of manufacturing ex situ composites. As example only, difficult to mix and bond materials are stirred well within the solid-state additive manufacturing system and are deposited on a workpiece. Subsequently, if needed, the composite could be separated from the workpiece and will be further use as a customized material in other manufacturing processes.

In another embodiment, the metallic material is brought in contact and stirred with a prepolymer or a monomer material. During the deposition and the consequent friction stirring, due to both, the friction and the heating, the prepolymer or monomer polymerize and form 3D-network (cross-links) in the affected zone, thus, bonding to the metal.

In yet another embodiment, the prepolymer or a monomer material is subjected to an additional field, e.g. electric field or UV light exposure, and thus, cross-linking (or polymerization) happens in the deposited layers yielding chemically-bonded compositions.

Solid-State Additive Manufacturing of Controlled Micro- and Nano-Structures

In certain embodiments, the solid-state additive manufacturing system is used for materials densification and/or materials grain refinement by intense stirring of the surface layers. Such densified layers exhibit improved strength, microhardness and better wear properties.

Figure 7A:
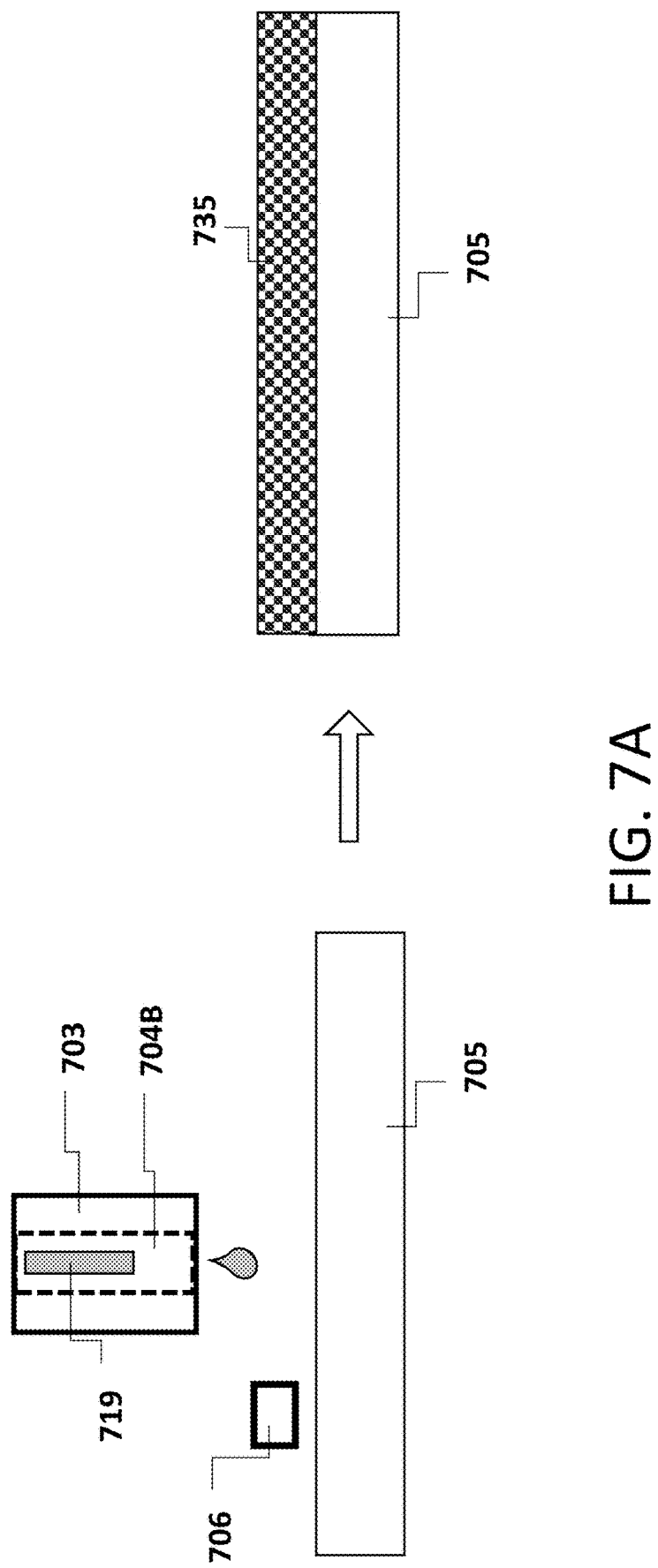
FIGS. 7A and 7B are schematic diagrams illustrating the process of material deposition with the aid of blown gas during the deposition of the filler material with the solid-state additive manufacturing system according to an embodiment. The blown gas may contribute to the final composition i.e. stoichiometry of the deposited material (FIG. 7A) or may generate pores in the deposited surface layer (FIG. 7B).

In yet another embodiment, the solid-state additive manufacturing system equipped with an inert gas supply and controlled gas compartment is being used to produce surface deposited layers, where the layer composition (i.e. stoichiometry of the final deposited material) is affected by the blown gas. FIG. 7A schematically illustrates the process of material deposition with the aid of blown gas (air, inert gas) via a gas supply source 706. The blown gas contributes to the final composition i.e. stoichiometry of the deposited material layer 735.

By way of an example only, a Ti or Ti-alloy is used as a filler material added via the throat of the tool to the substrate in a nitrogen-environment yielding TiN surface layer composition, known for its hardness and antibacterial functionality.

Yet in another embodiment, the gas is blown over the surface of the workpiece and deposited material, where the gas provides a "shielding effect" and protects the materials during the deposition process from e.g. degradation or oxidation.

In another embodiment, the solid-state additive manufacturing system uses gases (air, $O_2$, $N_2$, Ar) to generate certain material structures, such as porous materials and foams, produced with the aid of a gas blown during the solid-state additive manufacturing process. Open and closed pores are possible and they are being controlled by the solid-state additive manufacturing process parameters.

Figure 7B:
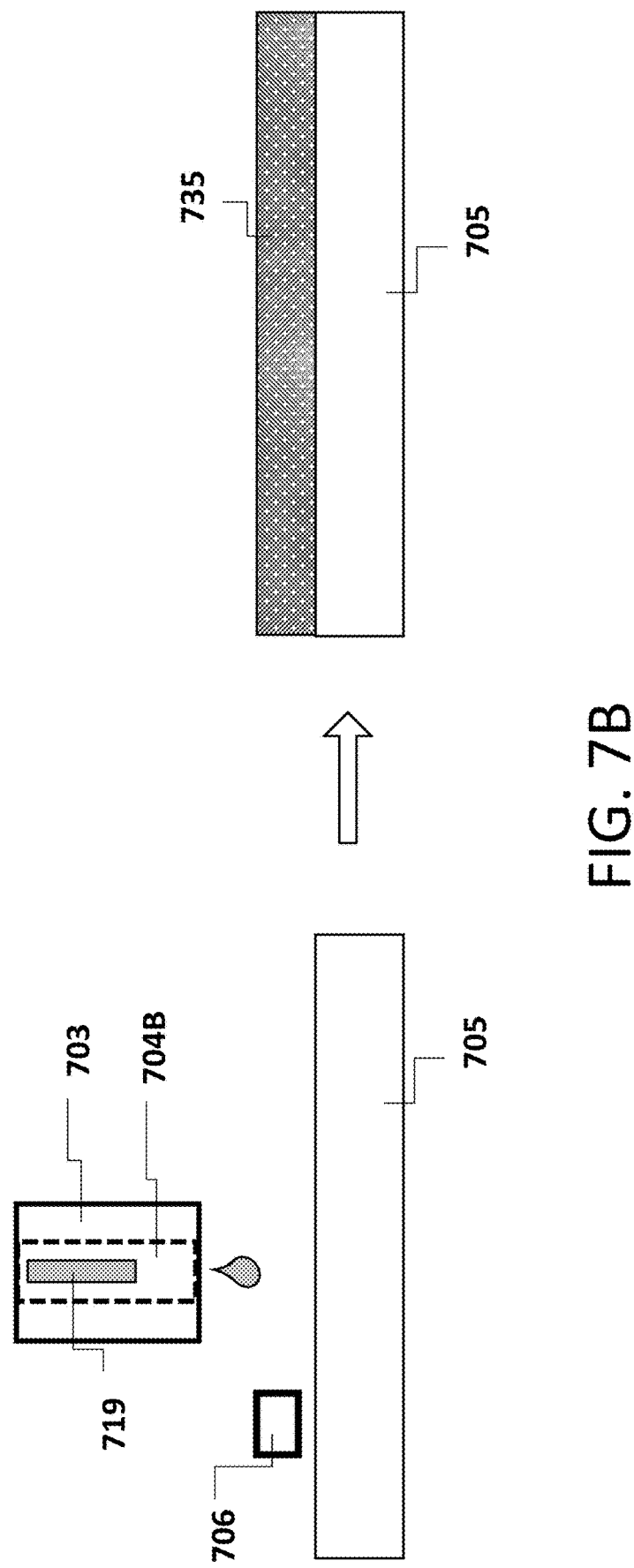

In another embodiment, surface material layers with reduced density are possible. By blowing a gas during the deposition of the filler material on the substrate, a porous structure can be achieved for applications that still need certain mechanical strength of the base material, but final light-weight parts. FIG. 7B illustrates the process of material deposition with the aid of blown gas, where the gas generates pores in the deposited material layer 735.

By way of an example only, a PVC foam or Al-foam can be formed by blowing gasses during the friction stir of PVC or Al, respectively.

In one embodiment, gradient material composition along the transverse direction of the moving tool of the solid-state additive manufacturing system occurs. By making changes in the content of the filler material, e.g. changing the concentration of the reinforcing particles in the filler, a surface composite with the same or different level of reinforcing particles along the transverse direction is possible. In another embodiment, gradient material composition along the depth of the deposited layers is possible. The capability of the solid-state additive manufacturing system to do layer by layer deposition coupled with the fact that the feeding system contains several ports to enter the filler materials, reinforcing particles and additives, enables variation in the composition of each of the deposited layers.

In yet another embodiment, gradient micro-/nano-structure along the transverse direction of the moving tool of the solid-state additive manufacturing system occurs. By making changes in the process parameters during the deposition, as the tool is moving in a transverse direction, the structure of the deposited layer can change.

In some embodiments, gradient micro-/nano-structure along the depth of the deposited layers is occurs. The capability of the solid-state additive manufacturing system to do layer by layer deposition coupled with the fact that the process parameters can vary during the deposition of each of the layers, layers with the same or different and/or gradient micro-structure are possible.

In yet another embodiment, gradient porous structure is possible with the solid-state additive manufacturing system equipped with gas blowing units. By varying the gas blowing rate and other process parameters during the deposition of each layer, a gradient porous structure is possible along the stack of the deposited layers.

In yet another embodiment, gradient functionality is achieved along the deposited material by depositing gradient material composition and/or gradient structure.

Figure 8A:
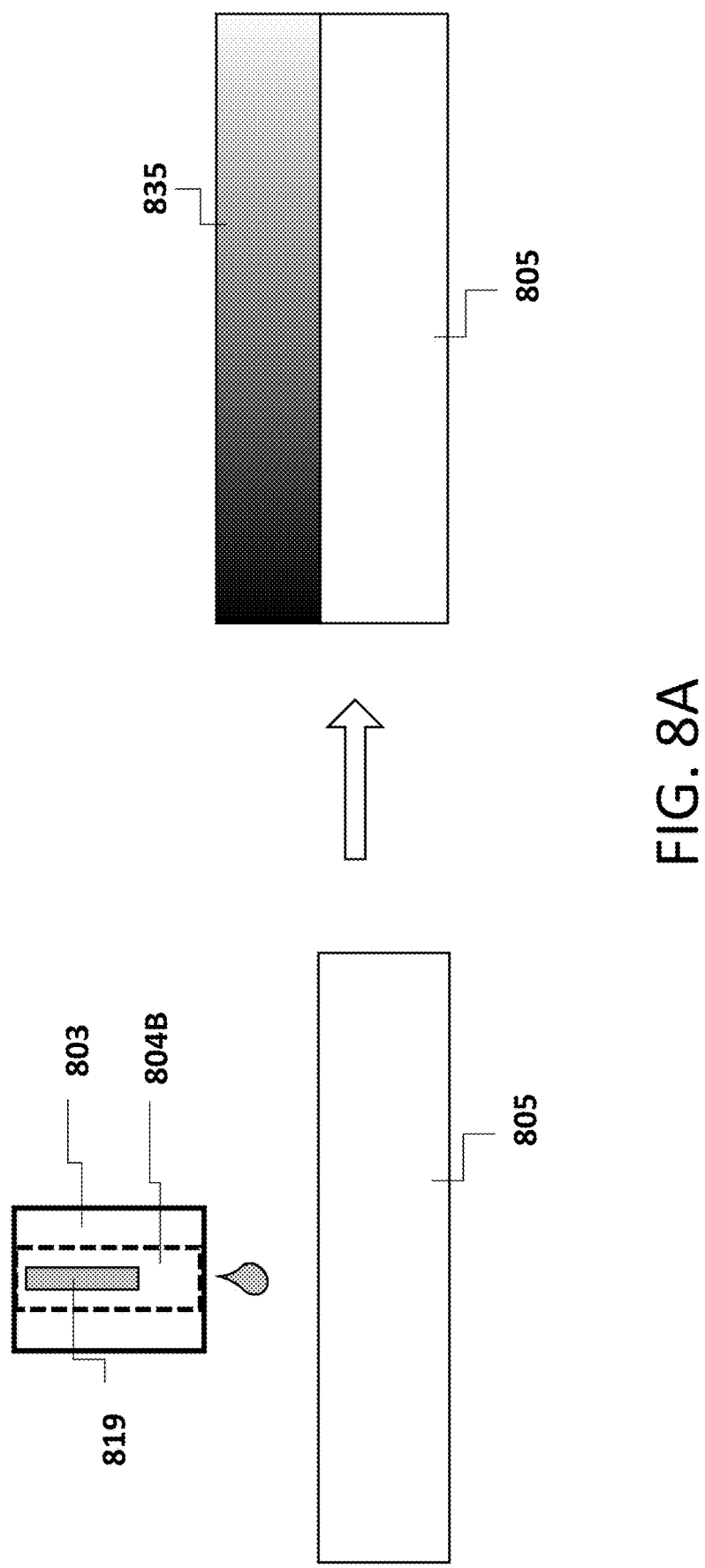
FIGS. 8A-8B are diagrams showing the generation of gradient material composition and/or gradient material structure with a solid-state additive manufacturing system according to an embodiment. Gradient composition and/or structure is possible in a transverse direction (FIG. 8A) or in z-direction (depth) of deposited layers (FIG. 8B).
Figure 8B:
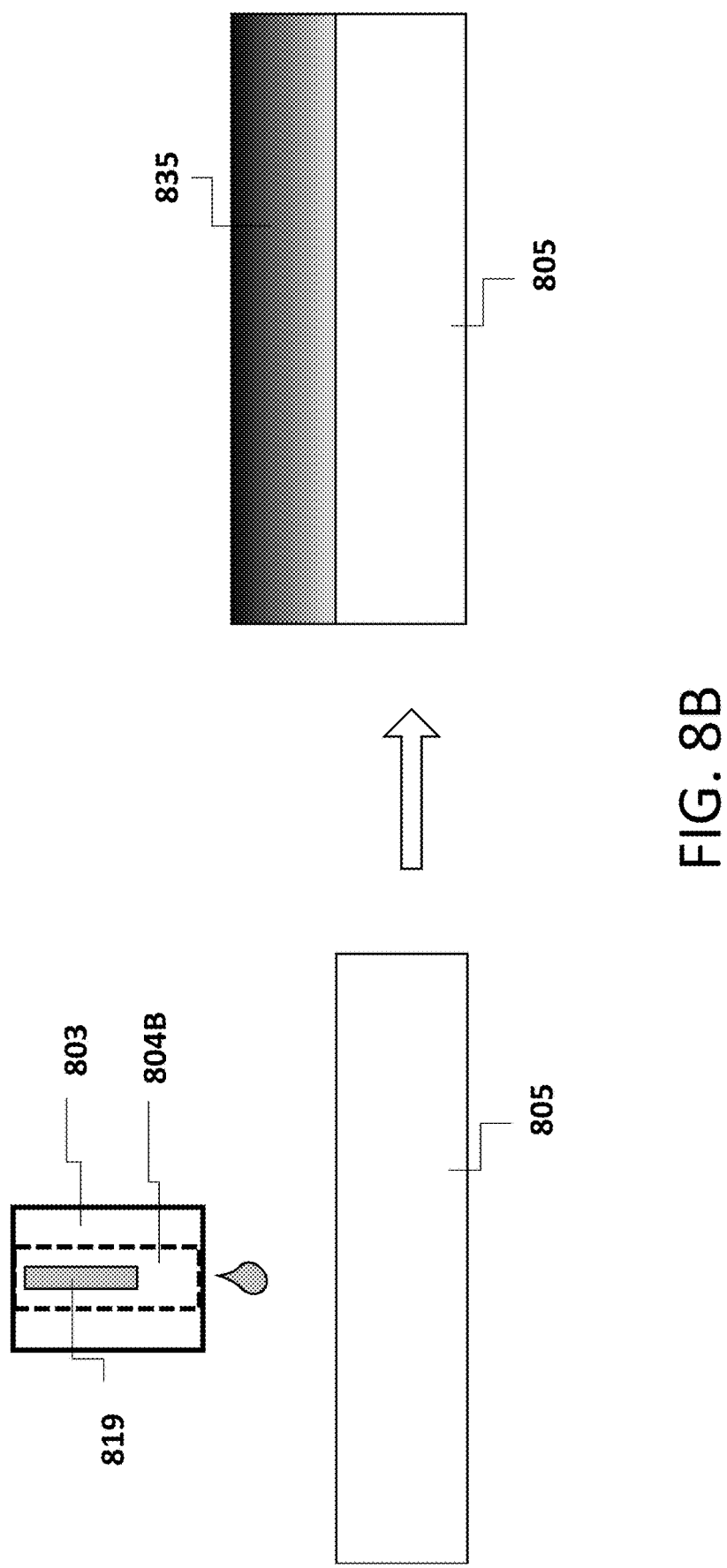

FIG. 8A-B schematically illustrate processes of generation of gradient material composition and/or gradient material structure in the deposited layers 835. The gradient composition and/or structure can be generated in a transverse x-direction (FIG. 8A) or in z-direction (i.e. the depth) of deposited layers (FIG. 8B).

Figure 8C:
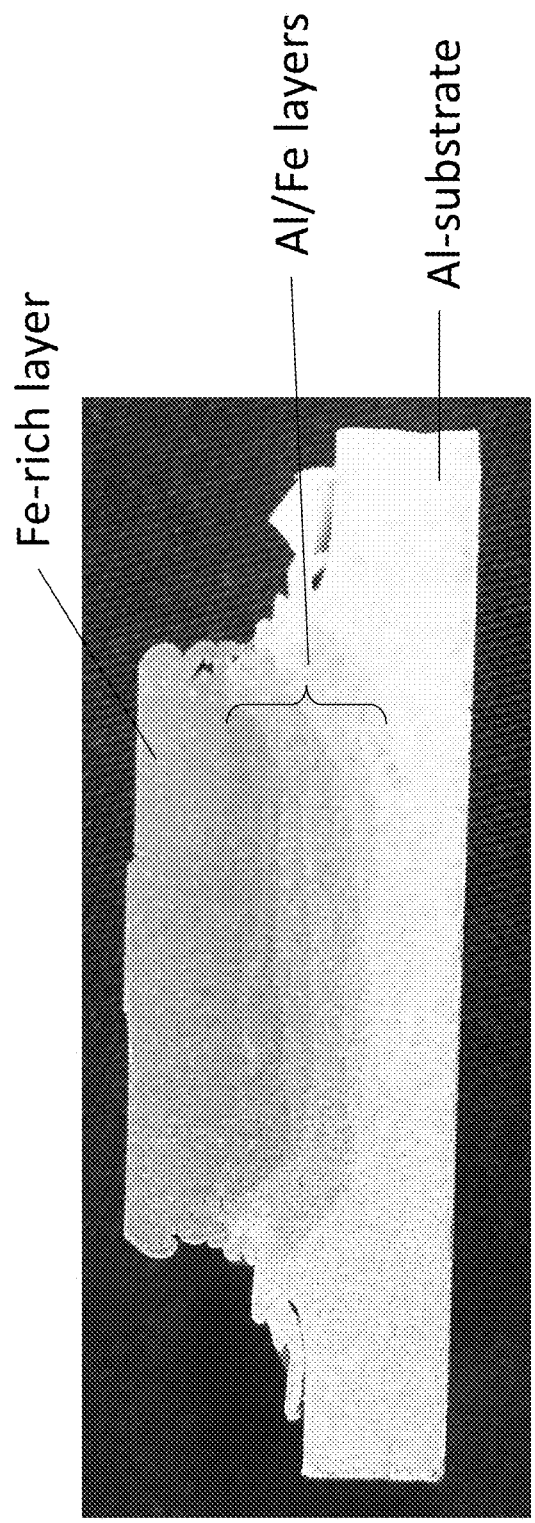
FIG. 8C is a photograph showing an example of a gradient material composition comprising aluminum and iron by changing the ratio Al/Fe during the deposition on Al substrate.

As an example, gradient aluminum (Al)/iron (Fe) material composition deposited on Al substrate by the disclosed solid-state additive manufacturing system is shown. FIG. 8C presents a fabricated specimen of a gradient material composition comprising aluminum (Al) and iron (Fe) by changing the ratio Al/Fe in the feedstock during the deposition on Al-substrate (workpiece).

In some embodiments, the material microstructures (e.g. material grains) after the solid-state additive manufacturing process have no preferential orientation and the material exhibits isotropic properties. Depending on the feed material used, the grains in the metal, metal alloy or metal matrix composite (MMC) are refined compared to those in the feed material yielding even better mechanical properties in the deposited layer or part. In some embodiments, recrystallization occurs during and after the solid-state additive manufacturing process. In other embodiments, depending on the solid-state additive manufacturing process conditions, a grain growth occurs.

In certain embodiments, a single solid-state additive manufacturing process parameter is used to affect the final microstructure in the manufactured material. In other embodiments, a set of solid-state additive manufacturing process parameters is used to affect the final microstructure(s).

Depending on the scale of observation, in some embodiments the changes in microstructure during the specific solid-state additive manufacturing process occurs on a meso- or micro-scale, but not on macro-scale. In other embodiments, the changes in material microstructure occur on all three scales (macro-, meso- and micro-scale).

In some embodiments, the heat is used to control the microstructures. More heat, supplied to the solid-state additive manufacturing process, or generated during the solid-state additive manufacturing process, results in higher temperature of the material being manufactured and larger grains. The manufactured material is still in the range below its melting point (Tm), i.e. in a so-called malleable state and usually this range is 0.4 Tm-0.8 Tm. By tight control of the material temperature during the solid-state additive manufacturing process, the grain sizes and shapes in the final manufactured part can be tailored. Consequently, the mechanical properties of the part are predictable.

Figure 9A:
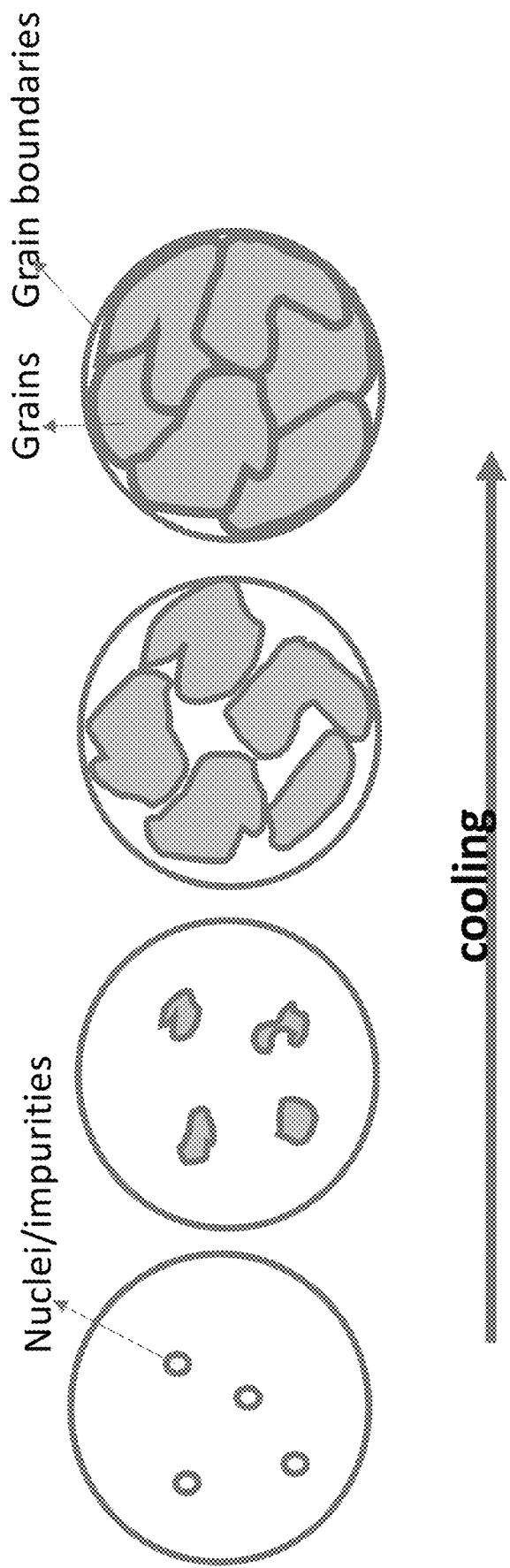
FIG. 9A is a schematic diagram showing a process of grain formation in metals according to an embodiment.

As it is known, as the temperature drops, depending on the material type and its propensity to crystallize, the atoms will organize around nuclei or "impurities" and crystals begin to form. The crystals (or grains, as they are called) will continue to grow until all of the material reaches ambient temperature. During their growth, they will begin to impinge on one another, giving rise to boundaries between the crystals where the atoms are irregularly arranged. These boundaries, also called grain boundaries, are sometimes considered as defects in the crystal structure of the material. The process of grain formation is shown schematically in FIG. 9A. Fine grain sizes are usually desirable in metals (but not always), because they give rise to the yield stress and many other mechanical properties are improved compared to the original filler material. One way to promote a finer grain size is rapid solidification (quenching), which will be discusses below. Also, the presence of many nucleating sites will give rise to a fine grain size.

FIG. 9B-E are schematic presentations of potential grains that can be formed depending on the material, heating and cooling conditions and the magnitude and direction of the strain applied during the material processing.

Figure 9B:
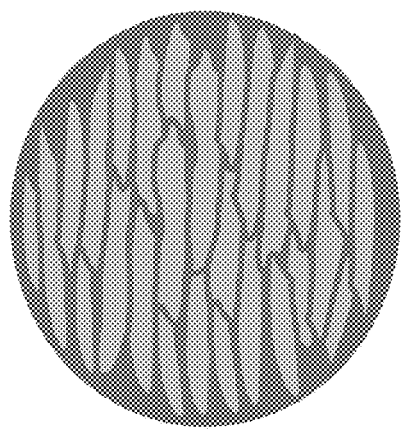
FIGS. 9B-9E are schematic diagrams showing potential grain shapes and their orientation in metals during and after solid-state additive process according to an embodiment, where FIGS. 9B and C show equiaxed grains.
Figure 9C:
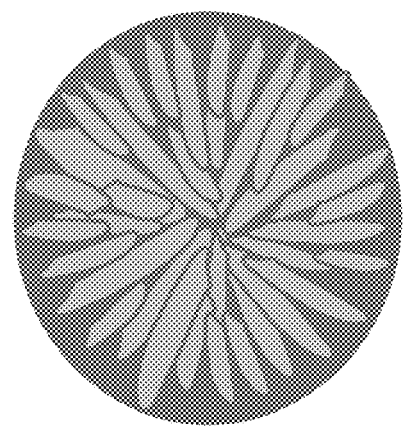
Figure 9D:
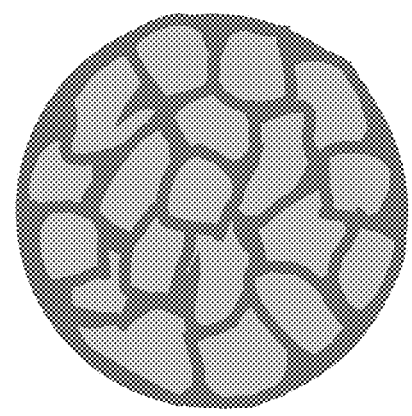
Figure 9E:
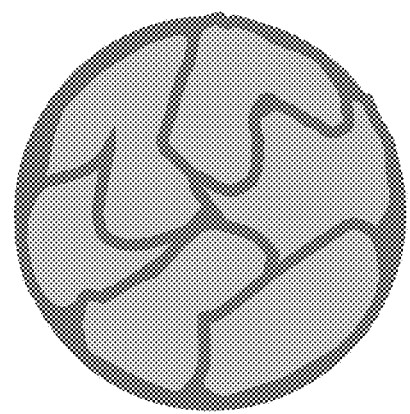

In some embodiments, the solid-state additive manufacturing process is generating equiaxed refined grains (FIG. 9C) from initial material with larger grains (e.g. equiaxed grain presented in FIG. 9B, or not-equiaxed grains). In other embodiments, depending on the material, and most often in cases when sufficient cooling time is allowed for cooling of the material, radial grains (FIG. 9D) are observed. In yet another embodiment, when directional strain/stress is applied during the processing and/or cooling step of the material, elongated and oriented grains are possible (FIG. 9E).

In some embodiments, the grains are avoided during the solid-state additive process. This is particularly important for some polymers, where amorphous phase is desirable over the crystalline phase of the polymer. Example is when the polymer material is cooled quickly or quenched after the solid-state additive deposition step.

In one embodiment, the temperature is controlled by the spindle and tool angular velocity. The higher the angular velocity, the more heat is generated and higher temperature of the material, thus, larger grains are found in the final produced part.

In some embodiments, the layer (track) thickness is used to control the grain size. The ticker layer deposited during one pass of the solid-state additive manufacturing tool over the substrate surface usually yields larger grain sizes.

In another embodiment, the down (push) force is used to control the microstructure of the resultant part. The higher the down force, the lower grain sizes in the deposited layer.

In other embodiments, the transverse speed of the tool over the surface of the substrate is used to control the grain size. Smaller grain sizes are produced in the deposited layer by the increased tool transverse speed.

In another embodiment and closely related to the down force, the spindle angular velocity and the tool transverse speed, is the friction generated between the added material (filler) and the substrate. The higher the friction between the filler and the substrate, the smaller the grain sizes are found in the resultant parts.

In other embodiments the heat used to control the temperature of the material is generated during the solid-state additive manufacturing process as a result of the generated friction. In other embodiments the heat is introduced in the process by auxiliary means, i.e. by an external heating source.

In some embodiments, the rate of heating the material and the rate of cooling the resultant part are used to control the grain size. As an example only, the higher heating rate of the material yields larger grain sizes. In another example, the higher cooling rate of the resultant part yields smaller grain sizes. In yet another example, the quenching of the resultant part yields the smallest grain sizes.

In certain embodiments, the grain sizes are controlled by the addition of lubricant and/or other types of additives. Depending on the filler material and the additive type coupled with the solid-state additive manufacturing process parameters, a variety of tailored grains are possible.

In some embodiments, the introduction of a small percentage of reinforcing material, e.g. carbon fibers (continuous or chopped fibers), carbon nanotubes (CNT), boron nitride (BN), and so on, alter the grain shape and size compared to compositions with no reinforcers. In addition to the altered microstructures, the final material in most of the cases exhibits significantly improved mechanical properties, and in some cases altered electrical, magnetic and other properties.

In certain embodiments, the added filler or additive or reinforcer acts as an initiation spot (impurity/nuclei) to cause crystallization in the material. In another embodiment, additive or reinforcer is used to suppress the crystallization process of the material e.g. in some polymers and the final material is amorphous or semi-crystalline with low percentage of crystallinity.

In some embodiments, the solid-state additive manufacturing process yields materials with equiaxial grains and isotropic mechanical and other properties of the deposited material. In other embodiments, the solid-state additive manufacturing process yields directional grains, and consequently, a material with anisotropic mechanical and other properties. One example is when the resultant grains are unidirectional.

In some embodiments, the solid-state additive manufacturing process yields a material with homogenous microstructures. One example is when the deposited material mainly consists of grains of sizes within a narrow range, e.g. in the range between 1 and 10 μm, and more preferably in the range from 1 to 5 μm. Another example is when the solid-state additive manufacturing process yields a material with grains of specific shapes.

In another embodiment, the solid-state additive manufacturing process yields a material with non-homogenous microstructures. A range of grain shapes and/or broad range of grain sizes could be achieved by controlling certain solid-state additive manufacturing process parameters.

In certain embodiments, the solid-state additive manufacturing process is capable of causing a phase transformation in the material, and the resulting microstructures and mechanical properties are being tailored.

In some embodiments, the percentage crystallinity, i.e. the ratio of crystalline/amorphous phase is controlled via a particular solid-state additive manufacturing parameter. In other embodiments, the percentage crystallinity is tailored via a set of solid-state additive manufacturing parameters.

In certain embodiments, the solid-state additive manufacturing process controls the crystalline structure (crystal lattice) of the material. In another embodiment, the crystalline lattice orientation is changed after solid-state additive deposition of the material. In yet another embodiment, the equiaxial lattice orientation in the material is achieved by the solid-state additive process.

In some embodiments, the texture of the material is controlled through a particular solid-state additive manufacturing process parameter or combination of solid-state additive manufacturing process parameters.

In certain embodiments, the solid-state additive manufacturing process parameters are adjusted in such a way as to result in a particular microstructure type for a given material type. For example, a set of parameters can yield grains or spherulites in certain metallic materials. Other set of process parameters can yield recrystallization of the original crystallites, and yet another set of process conditions can cause changes in the crystalline lattice type and/or changes in the lattice orientation.

In certain embodiments, the co-existence of two of more phases within the same material are being controlled by the solid-state additive manufacturing process parameters. One example is when the final solid-state additive manufacturing deposited material contains a continuous phase, where another phase (or phases) are distributed within it. Another example is when two or more co-existing continuous phases are generated after solid-state additive manufacturing deposition of the material. One of the final phases could be the same as the phase of the initial material or the resulting phases could be very different than the one(s) of the original material.

In certain embodiments, the cooling of the manufactured part or deposited layer (coating) on a substrate is by natural means, i.e. by convection in the surrounding environment. In another embodiment, a cooling fluid is introduced under the part being manufactured (or the substrate being coated) and by means of heat exchanger the cooling happens. In yet another embodiment, the cooling occurs by an external cooling source causing cooling or even quenching of the heated part.

In the Table 1 below is given a summary of the effects of some of the solid-state additive process parameters on the deposited material grain size.

TABLE 1

Microstructure (grain) size trend with changes (particularly with increase) in some of the solid-state additive process parameters

| Process parameter | | Grain size trend |
|---|---|---|
| Temperature (heat) | ↑ | ↑ |
| Down (push) force | ↑ | ↓ |
| Friction force | ↑ | ↓ |
| Filler flow rate | ↑ | ↑ |
| Angular velocity | ↑ | ↑ |
| Spindle/tool torque | ↑ | ↑ |
| Transverse velocity | ↑ | ↓ |
| Heating rate | ↑ | ↑ |
| Cooling rate | ↑ | ↓ |
| Layer thickness | ↑ | ↑ |

In some embodiments, the grain shape and composition are regulated by the ambient atmosphere where the deposition happens. In one example, a controlled composition of oxygen ($O_2$) and an inert gas like argon (Ar) or nitrogen ($N_2$) gas in the surrounding environment, are purged in the deposition area. Depending on the gas composition, the grains could be pure metal or MMC or alloy if the gas environment (the so-called shielding gas during the deposition) is 100% an inert gas (e.g. Ar). In another example, the grains could be composed of oxides of the involved metals, if the surrounding (shielding) gas contains higher percentage of oxygen. In such case, the grains are harder than the grains composed of metals only. By controlling $O_2$/inert gas ratio in the shielding gas, one can control the grain shape in the final deposited material and its hardness.

In yet another embodiment, the grain size is manipulated by the feedstock type, such as but not limited to powders of different size distributions, solid bars, beads, granules, scrap pieces and metal shavings, etc. Highly depending on the material type, the powder feedstock yields smaller grain sizes for some materials, while for other materials might not have any effect on the final microstructure.

In one embodiment, a combination of several parameters is used to affect the grain shapes and sizes in the manufactured parts. For instance, a high heat input as a result of high spindle angular velocity coupled with the low traverse speed will yield larger grains. Such large grains will have lower strength but will exhibit higher ductility.

In another embodiment, low heat input achieved via low spindle angular velocity coupled with high traverse speed will result in small grains, which will have higher strength, but lower ductility.

In some embodiments, gradient microstructures can be obtained by changing the solid-state additive manufacturing process parameters during the deposition of the layer. As example only, the transverse velocity changes during a single layer deposition. The deposition starts at higher velocity and continuously changes to lower velocity. During this deposition, the gain sizes in the layer change from larger to smaller grains within the same layer. Thus, gradient in the microstructure (grain) sizes is achieved along the deposited layer. In another example, one layer is deposited at a constant higher transverse velocity. The next layer is deposited at slightly lower velocity, and the process continues in such way that each subsequent layer is deposited at lower velocity than the previous layer. In this way, a part with gradient in microstructure/grain sizes is manufactured. The gradient occurs along the part thickness. In yet another example, the gradient in grain size occurs due to the change in the spindle angular velocity. For instance, the deposition starts at 300 rpm for a certain time, then increases to 500 rpm for a given time period, and so on, until it increases to 1500 rpm in the final step. The microstructures in the deposited layer are smaller in size in the beginning of the solid-state additive manufacturing process and increase with time as the spindle angular velocity increases.

In other embodiments, the grain shape changes during the solid-state additive manufacturing process. For example, by increases in the angular velocity of the spindle, in addition to the grain size changes, the shape of the grains changes e.g. from elongated (ellipsoidal) shape into more spherical ones.

Below are given particular examples with information on the grain shapes and sizes of different materials that have been subjected to solid-state additive manufacturing deposition.

Example 1. Inconel 625 Superalloy

For many industrial applications, such as aerospace, aeronautical, marine and others, high temperature mechanical stability, including strength and ductility, is required. Such properties are offered by superalloys and among them, Inconel 625, a nickel-based superalloy, has gained a wide industrial usage. This alloy has been found to provide high strength, good ductility and corrosion resistance at temperatures up over 1000° C., as well as the added benefit of oxidation resistance in aggressive environments.

Below will be extensively disclosed the microstructures formed in Inconel 625 superalloy material in different regions of a part manufactured with solid-state additive processes.

Figure 10A:
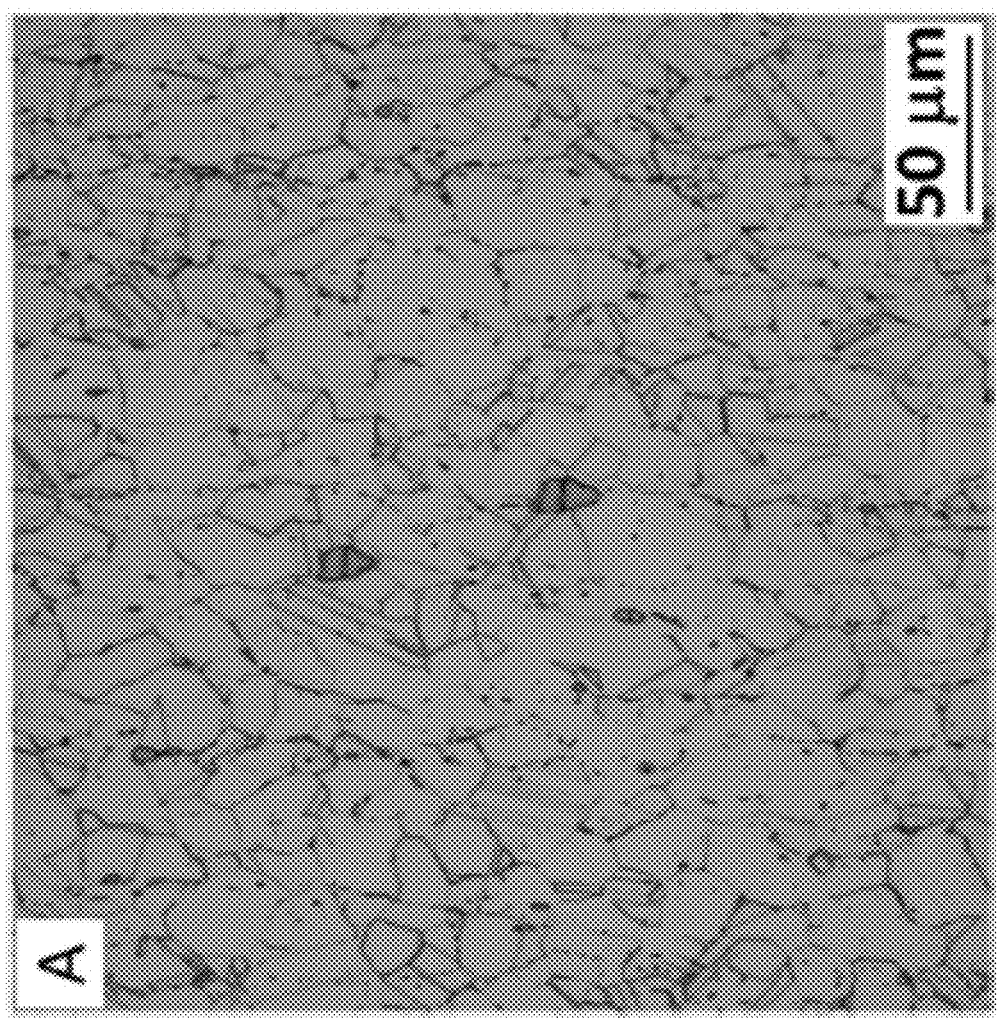
FIGS. 10A-B are scanning electron microscopy images showing microstructures of Inconel 625 before (FIG. 10A) and after (FIG. 10B) the solid-state additive manufacturing process as observed with scanning electron microscope according to an embodiment.
Figure 10B:
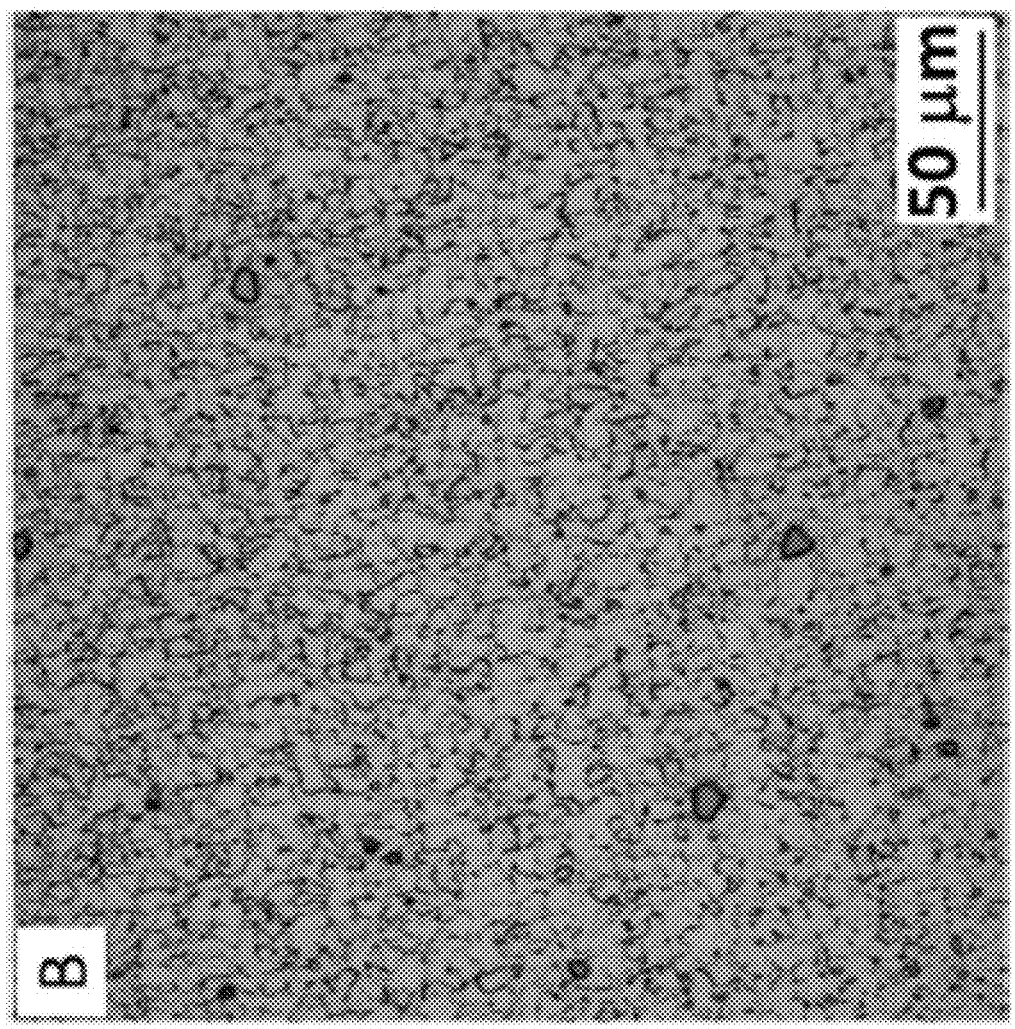
Figure 10C:
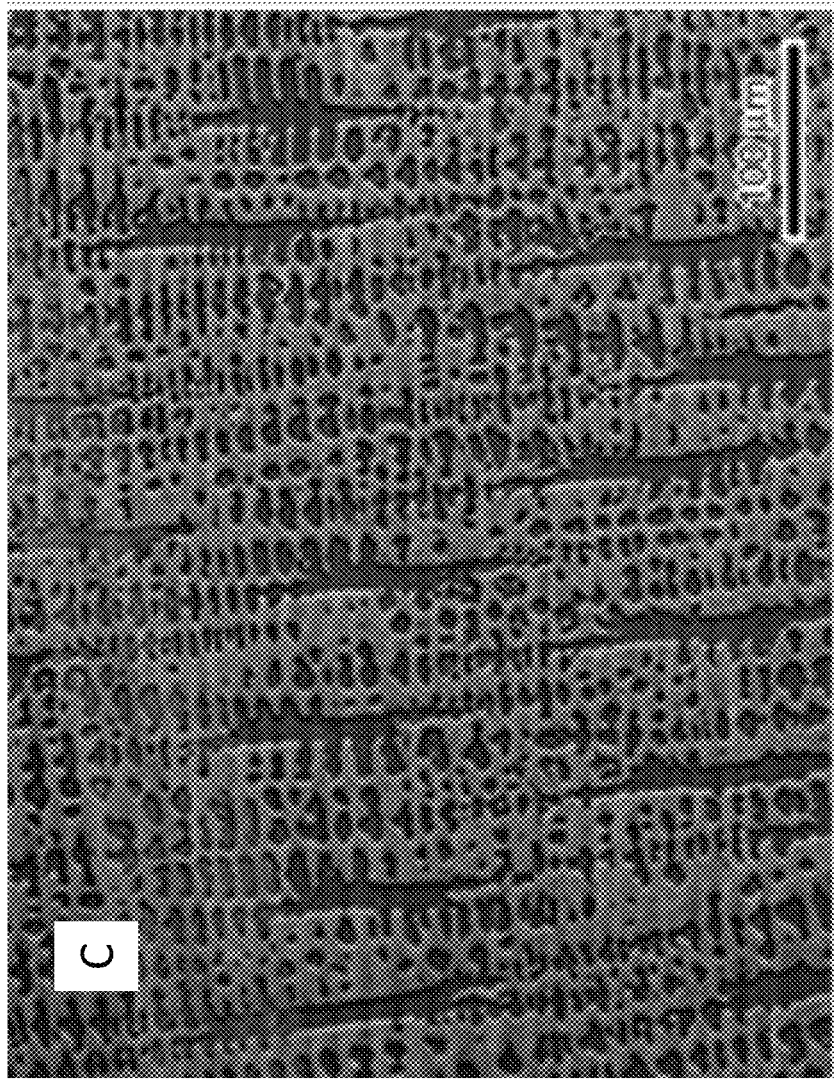
FIG. 10C is a scanning electron microscopy image showing microstructures of Inconel 625 deposited by Pulsed Plasma Arc according to an embodiment.

FIGS. 10A and 10B show the microstructures of Inconel 625 material before and after the solid-state additive manufacturing process. Before solid-state additive manufacturing, the average grain size is 12 μm (FIG. 10A), while after, the average grain size is 5 μm (FIG. 10B), and exactly due to these refined microstructures, the deposited Inconel 625 layer shows better mechanical properties than the original Inconel 625 material. Compared to other technologies used for deposition of Inconel 625, the solid-state additive manufacturing-generated refined microstructures are superior to the microstructures generated by e.g. pulsed plasma arc deposition (FIG. 10C).

Metal grains usually have an orientation. Depending on how the individual grains are oriented to each other, the whole part may be stronger in one direction or another, i.e. might have anisotropic mechanical properties. This different strength to stand up to stress in given directions can sometimes be desirable, but most of the time, parts work best when their strength is equal in all directions, i.e. having isotropic properties. Solid-state additive processes create equiaxed grain structures, meaning the grains are oriented to each other in a similar way in all axes, which means that the manufactured parts have similar strengths in all directions.

Example 2. Ti-6Al-4V Material

Figure 11A:
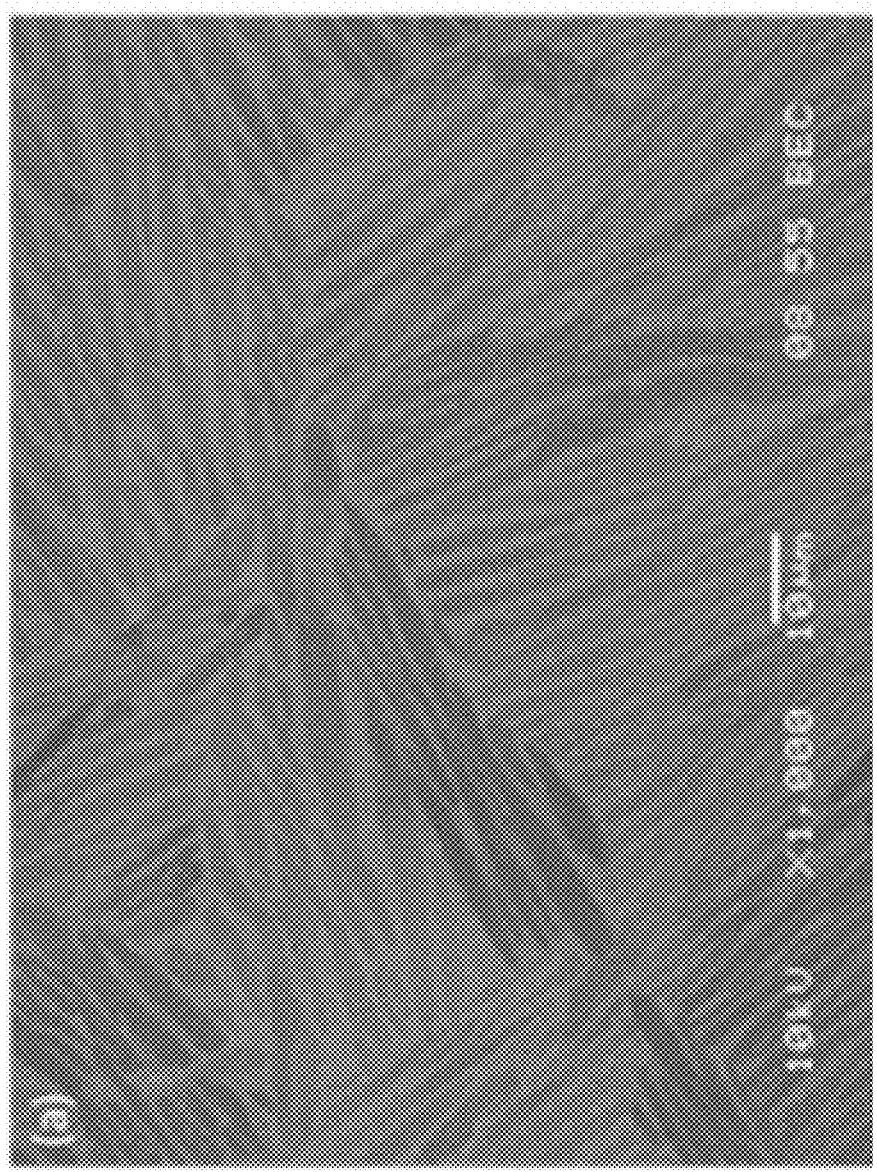
FIGS. 11A and 11B are scanning electron microscopy images showing microstructures of Ti-6Al-4V before (FIG. 11A) and after (FIG. 11B) the solid-state additive process as observed with scanning electron microscope according to an embodiment.
Figure 11B:
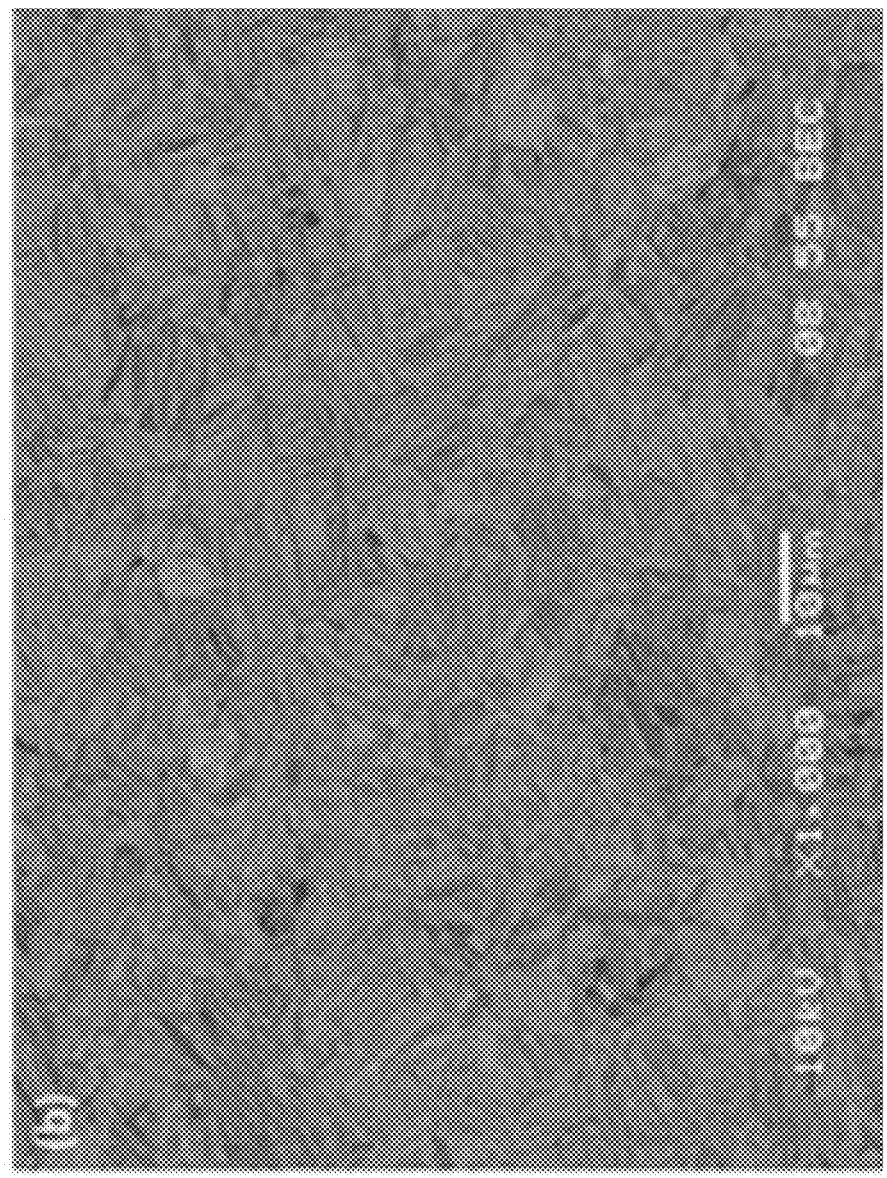
Figure 11C:
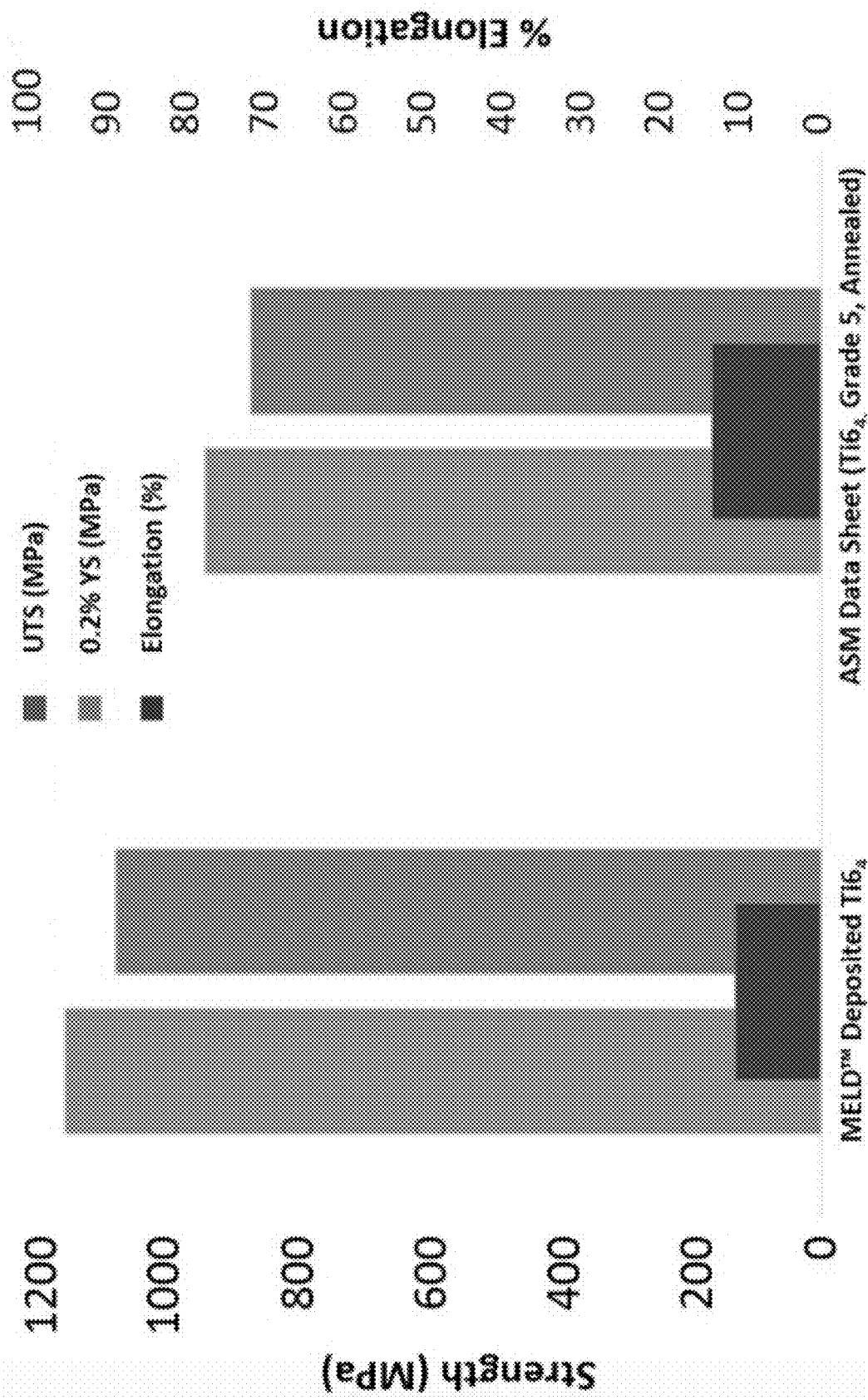
FIG. 11C is a graph showing mechanical strength and % elongation of Ti-6Al-4V deposited by solid-state additive manufacturing compared to ASM data for the same material according to an embodiment.

Another example is the Ti-6Al-4V material which upon deposition with the solid-state additive manufacturing system had a fully dense composition exhibiting significant grain refinement and improved mechanical properties over the parent material, as shown in FIGS. 11A-C. The material had grains of approx. 60-70 μm in size, which are reduced to 5-6 μm after the solid-state additive manufacturing process (compare FIGS. 11A and 11B). Solid-state additive manufacturing-deposited Ti-6Al-4V material showed a significant increase in both ultimate tensile and yield strength, 23% and 24%, respectively, as presented in FIG. 11C.

Examples 3. Stainless Steel

Figure 12A:
FIGS. 12A and 12B are microscopy images showing microstructures of stainless steel 316L before (FIG. 12A) and after (FIG. 12B) the solid-state additive manufacturing process according to an embodiment.
Figure 12B:
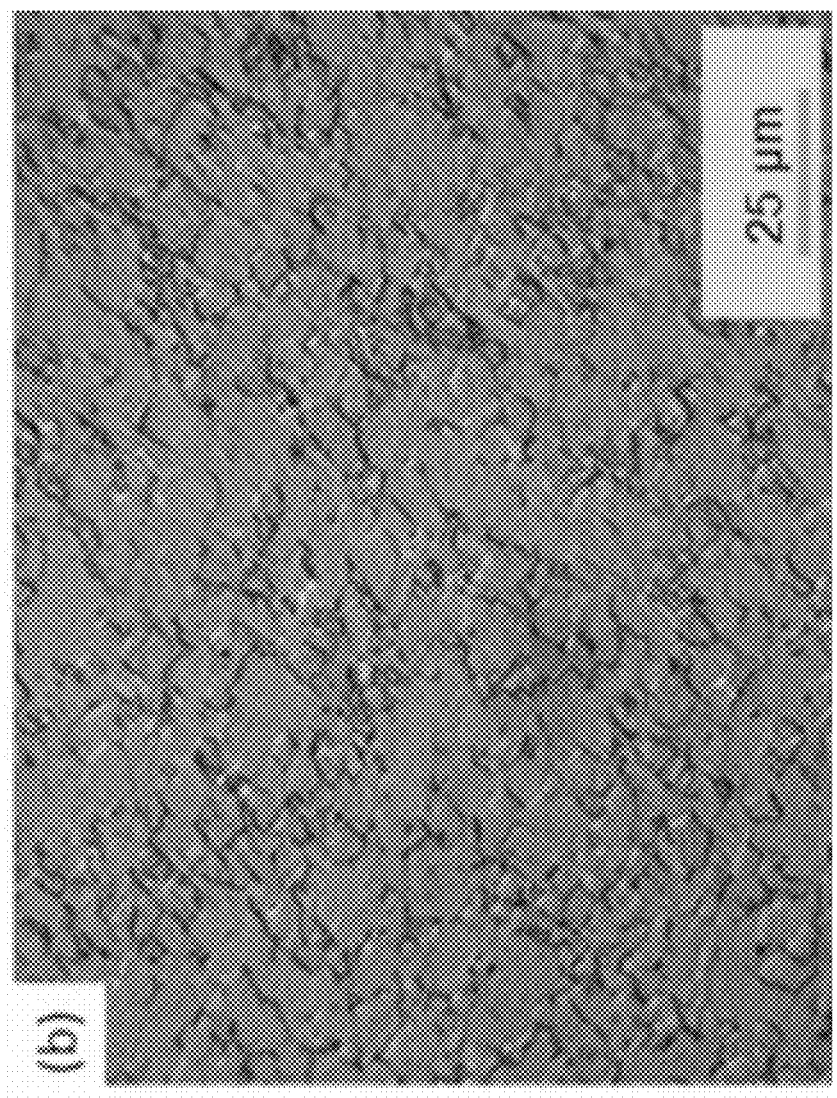

Stainless steel 316L microstructures before and after the solid-state additive manufacturing process are given in FIGS. 12A and 12B respectively. The grains with sizes of 50-70 μm were reduced to 5-10 μm after the solid-state additive process.

Example 4. Aluminum alloy Al2139

Figure 13A:
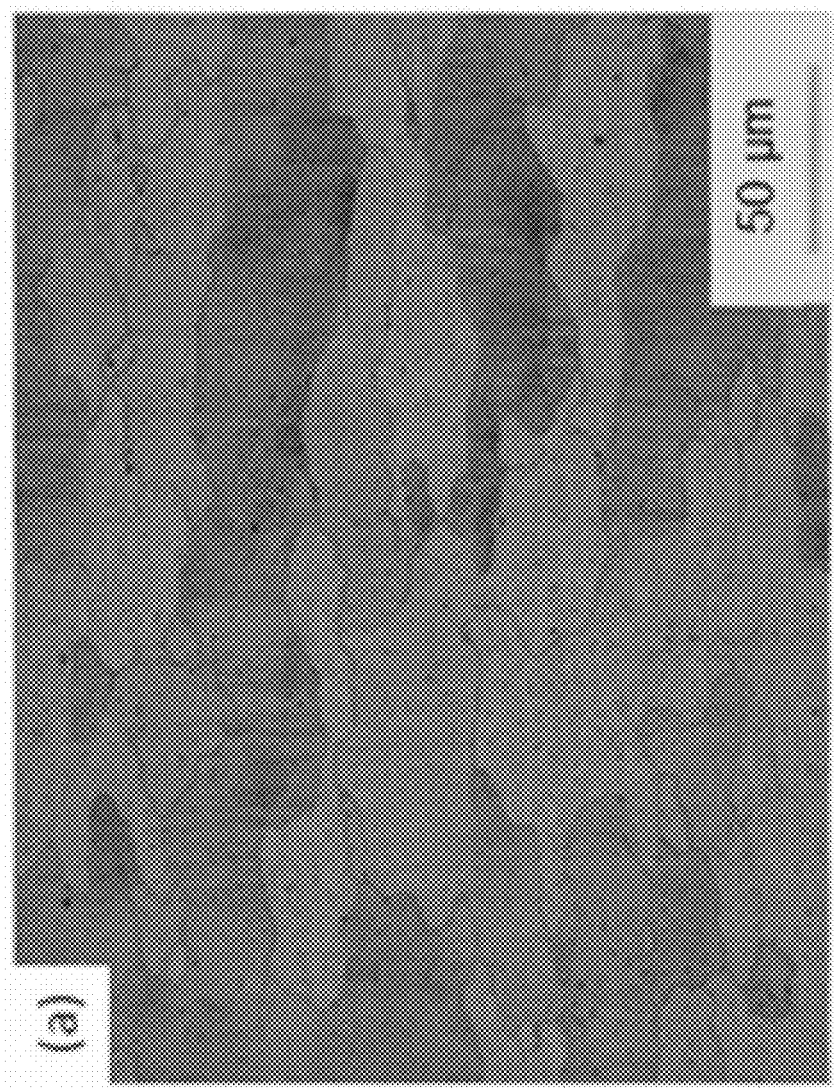
FIGS. 13A and 13B are microscopy images showing microstructures of aluminum alloy Al2139 microstructures before (FIG. 13A) and after (FIG. 13B) the solid-state additive manufacturing process according to an embodiment.
Figure 13B:
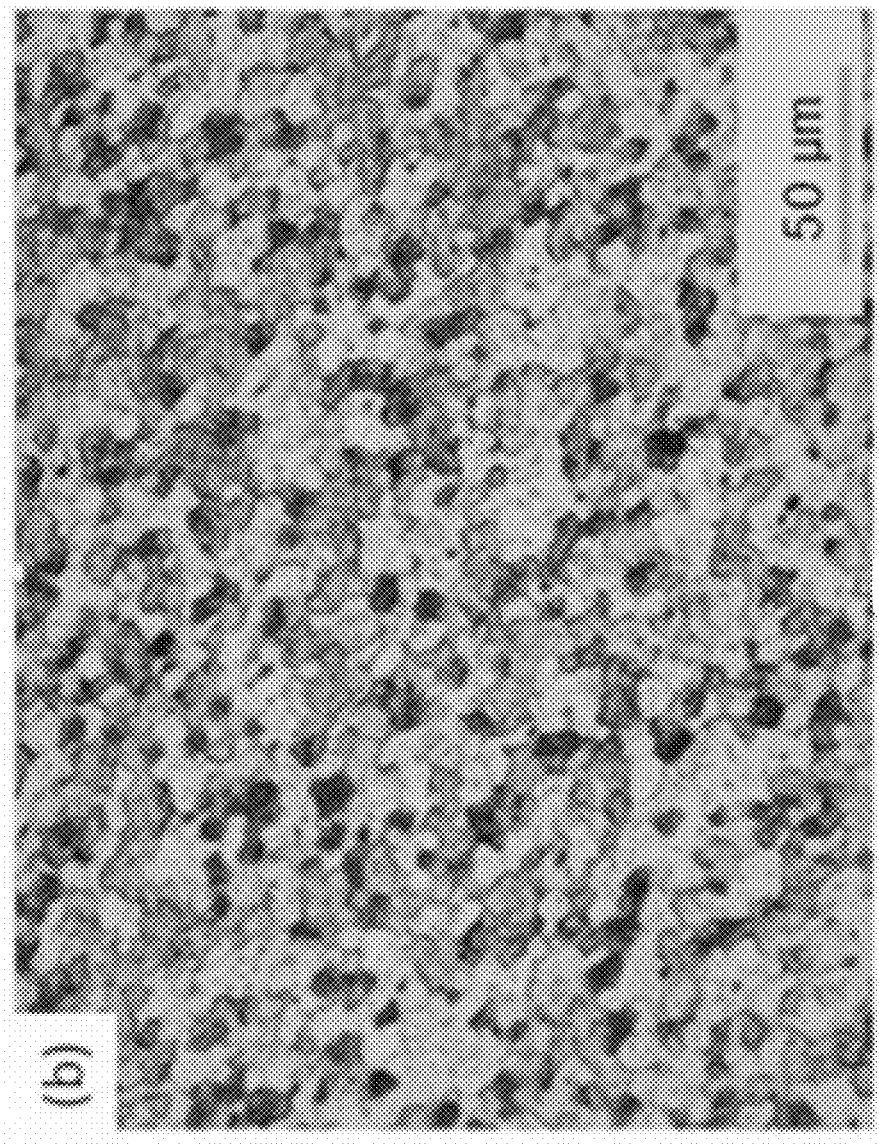

Another example is the aluminum alloy Al2139; its grains with sizes of ca. 400 μm before solid-state additive manufacturing and sizes of 5 μm after, are provided in FIGS. 13A and 13B, respectively.

Example 5. Aluminum-Molybdenum Composite

Another example is in situ compounding of different powders, consolidating them as metal matrix composites (MMCs) or other proprietary compositions, and then, using them as a feed material that can be consequently deposited; all steps performed quickly with the solid-state additive manufacturing system. MMC materials, like Al—Mo, Al—W and Al—SiC have been successfully demonstrated with reinforcement fractions up to 30% by volume. A particular example is the Al—Mo composite with a relatively uniform distribution of Mo-particles within the Al-matrix, as shown in FIG. 6C. Because of the severe plastic formation due to intense friction and other forces, the elevated temperatures, and the intimate contact among different materials, mechanically-induced mixing occurs in normally immiscible materials. In the Al—Mo system, for example, a layer of Al—Mo intermetallic phase is formed at the matrix-reinforcement interface, which is expected to enhance the adhesion and prevent interface porosity. Micro X-ray computed tomography confirms that the composite is fully dense without observed voids, while the mechanical properties are expected to be significantly improved.

Solid-State Additive Joining

In certain embodiments, the solid-state additive manufacturing system is used for joining dissimilar materials which are difficult to be joined by other methods known in the art, such as friction stir welding. The filler material is added to the joint, between two parts made of dissimilar materials and it acts as sealant. A backing plate use is optional.

In other embodiments, the joint between the parts made of two dissimilar materials is partially filled with reinforcing particles and the tool of the solid-state additive manufacturing system passing through the joint stirs all the present materials including the reinforcers and provides a good bond between the two parts. A backing plate use is optional.

In some embodiments, the joint, (i.e. the space between two structures to be joined or to be welded) is filled with reinforcing materials, where the reinforcers are reinforcing fibers or particles, CNTs and so on, which further strengthen the bond between the structures.

In yet another embodiment, solid-state additive manufacturing system is used to join parts of dissimilar materials by adding reinforcing fibers, by example only the fibers being carbon fibers or CNTs, in the joint to enhance the joint strength. A backing plate is optional.

Figure 14A:
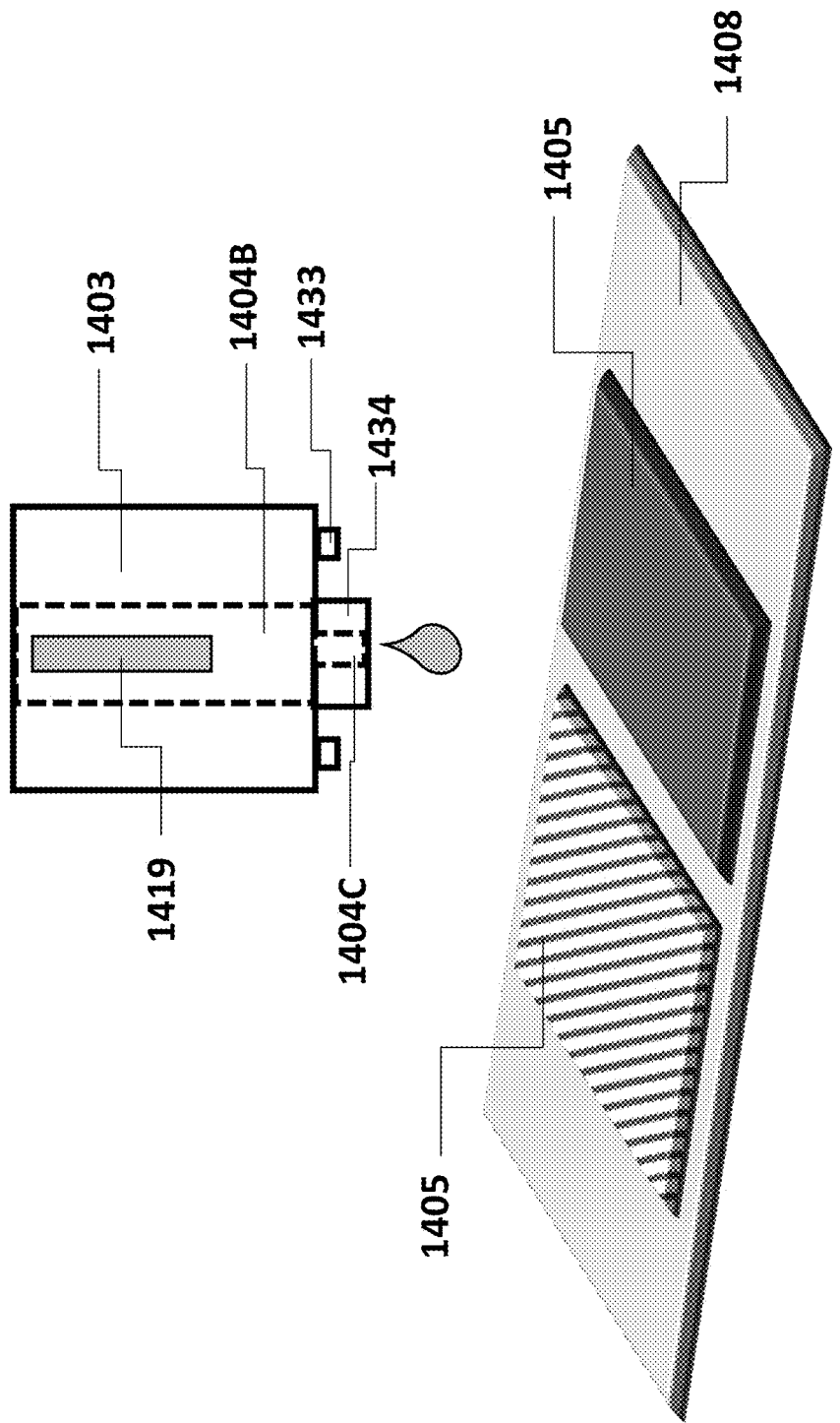
FIGS. 14A and 14B are diagrams showing the joining process between two structures made of dissimilar materials with the solid-state additive manufacturing system according to an embodiment. The joint between the two structures is filled with the filler material (FIG. 14A) acting as a sealant, or the joint is filled with the filler material and reinforcing particles for additional reinforcement of the bond generated between the structures (FIG. 14B).
Figure 14B:
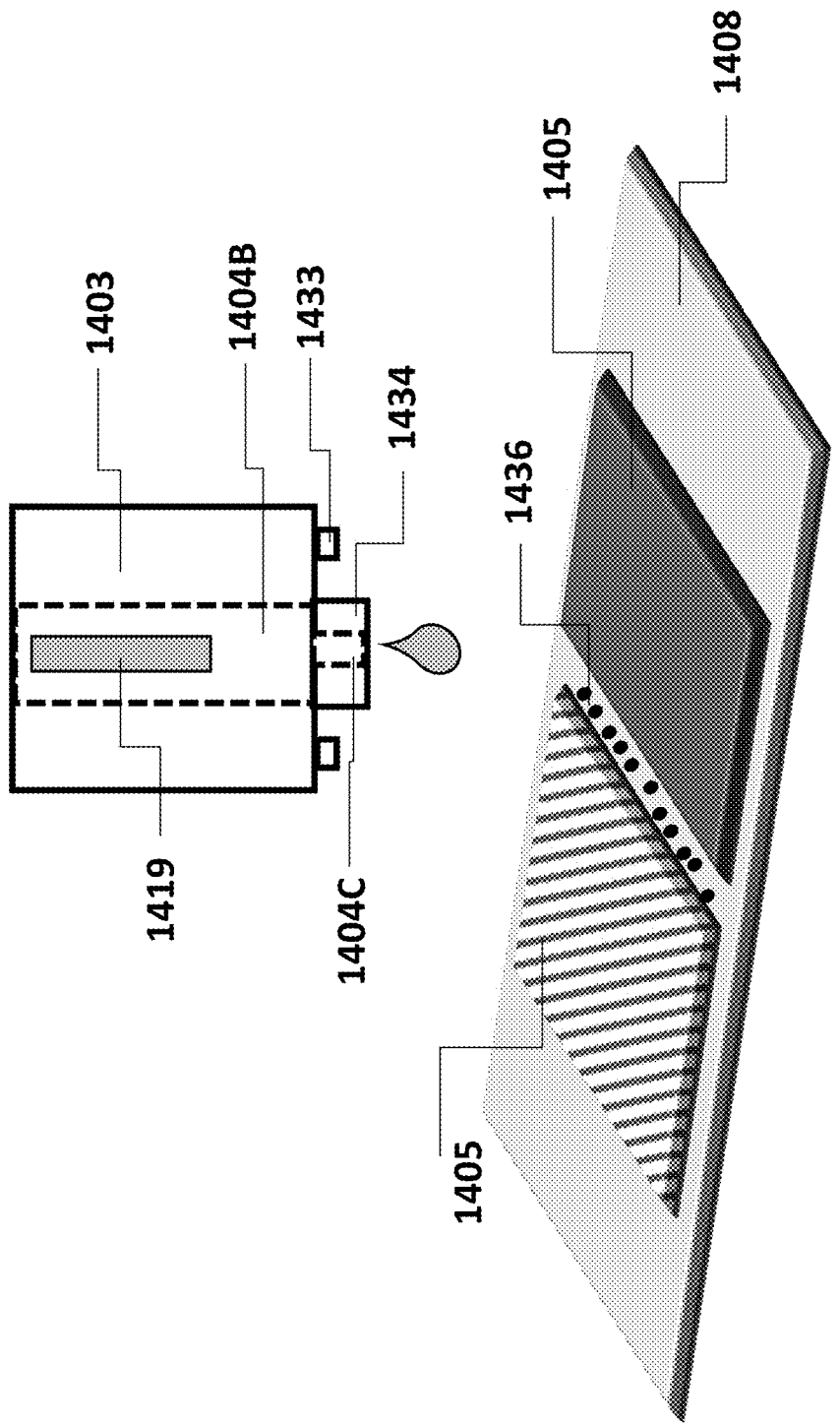
Figure 14C:
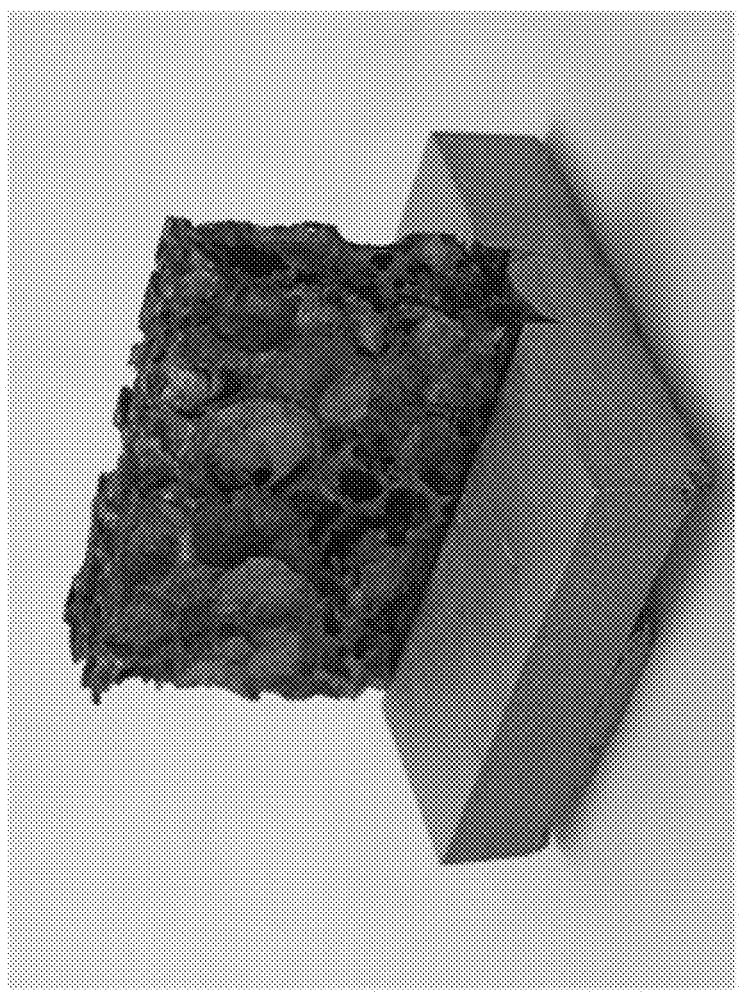
FIG. 14C is a photograph showing solid-state additive joining of porous Al foam on Al substrate according to an embodiment.

FIG. 14A-B are schematic illustrations of joining processes of two workpieces 1405 made of same, similar or dissimilar materials. The joint between the two structures is filled with the filler material 1419 acting as a sealant. Additionally, the joint between the two workpieces 1405 could be filled with reinforcing particles 1436 for additional reinforcement of the bond generated between the workpieces (FIG. 14B). FIG. 14C is a photograph of joined aluminum (Al) foam material to aluminum (Al) substrate.

Solid-State Additive Repair

In some embodiments, the solid-state additive manufacturing system is capable of repairing defects and damage on flat or curved surfaces, tubular and other workpieces of any shape and size. The solid-state additive manufacturing system is capable of filling the hole or a defective crack in a workpiece by using filler material and depositing the filler material in the hole/crack with or without using a backing plate. As an example only, the solid-state additive manufacturing system uses the same material as the base material of the workpiece to repair its defective spot. In other examples, the solid-state additive manufacturing system uses dissimilar material or reinforced material to repair the workpiece, and provides enhanced strength in the repaired spot.

Figure 15A:
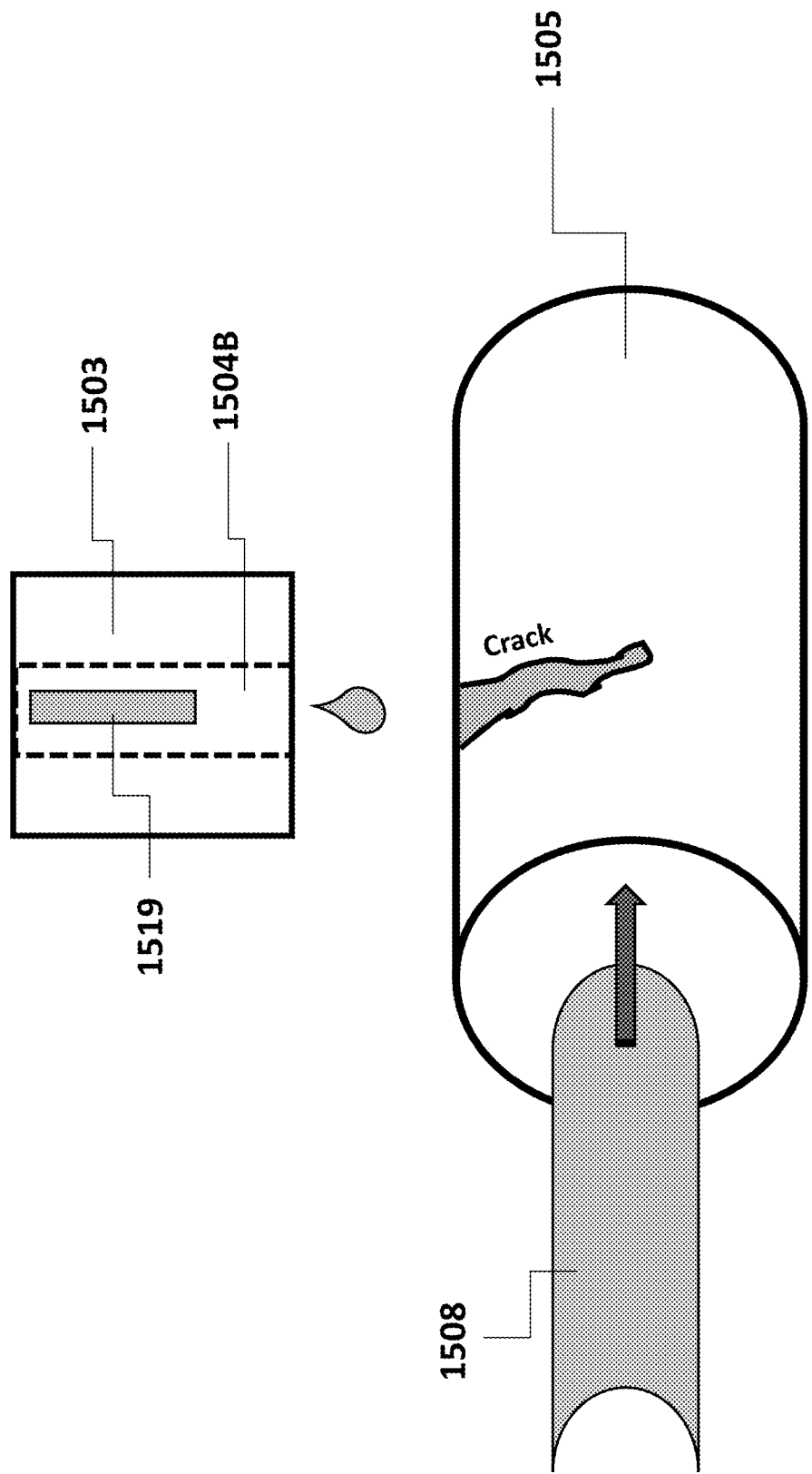
FIG. 15A is a schematic diagram showing the process of repairing a defective tubular structure having a crack with the present solid-state additive manufacturing system using a backing plate according to an embodiment.

In a particular embodiment, the solid-state additive manufacturing system is used to repair a defect or a crack in a complex shape workpiece, e.g. rail, which cannot be repaired by other means. In another embodiment, the solid-state additive manufacturing system is used to repair a location on a workpiece that is hard to reach. In yet another embodiment, the solid-state additive manufacturing system is used to repair a pipe with a surface crack which can be locally repaired by inserting a backing plate. FIG. 15A is a schematic presentation of a repairing process of a defective tubular structure (workpiece) 1505 using a backing plate 1508. Moreover, the pipe can be overcoated to further strengthen or protected against e.g. wear or corrosion.

Figure 15B:
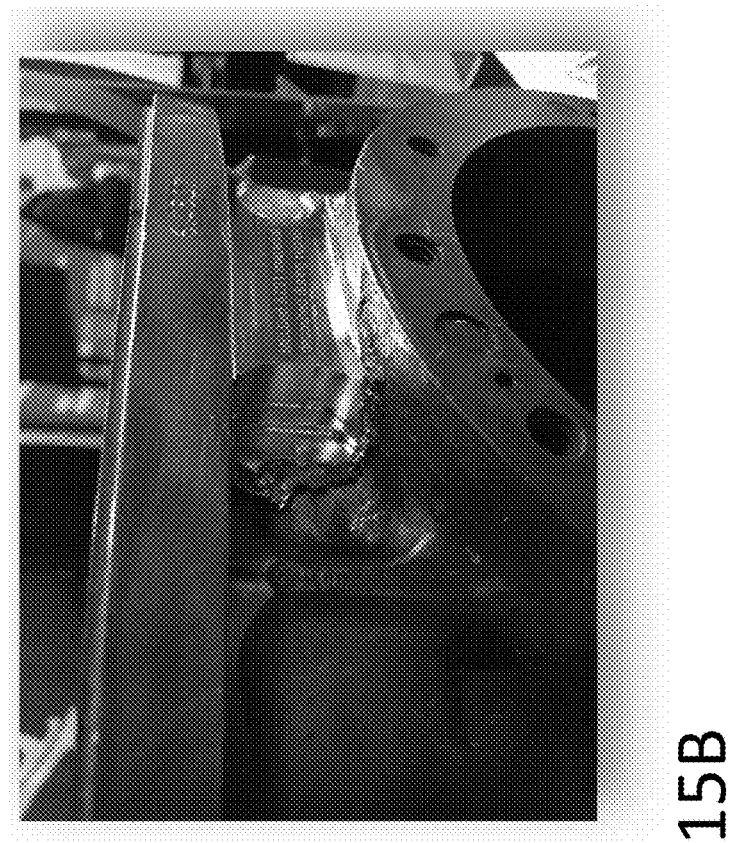
FIG. 15B is a set of photographs showing solid-state additive repair of a helicopter transmission gear box according to an embodiment: the fractured rib, previously considered unrepairable due to non-fusion weldable properties of MgAz91 material, is being repaired using the same cast MgAz91 material.
Figure 15B:
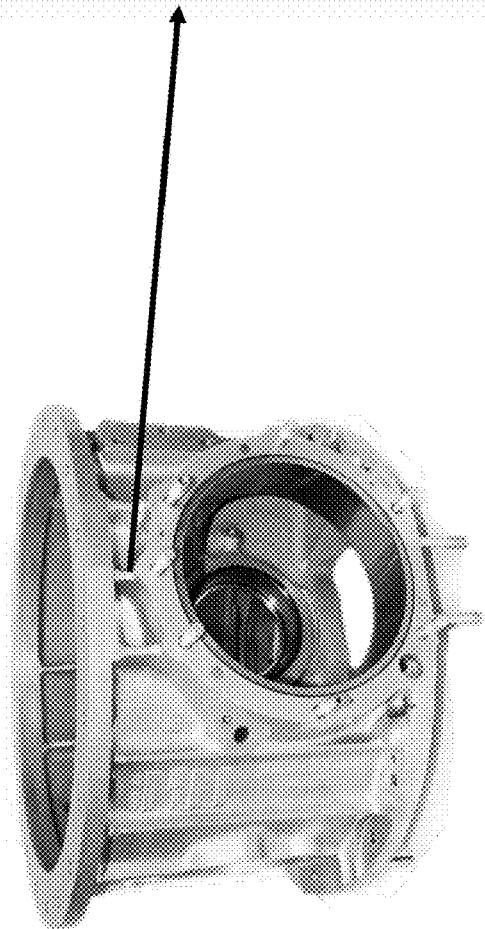

Specific example includes repair of a helicopter transmission gear box (FIG. 15B). The fractured rib was considered unrepairable due to the non-fusion weldable properties of the material that the gear box was made of (MgAz91 material). The solid-state additive manufacturing system repaired the gear box damage using the same base material as the gear box and providing even enhanced strength in the repaired location.

Figure 15C:
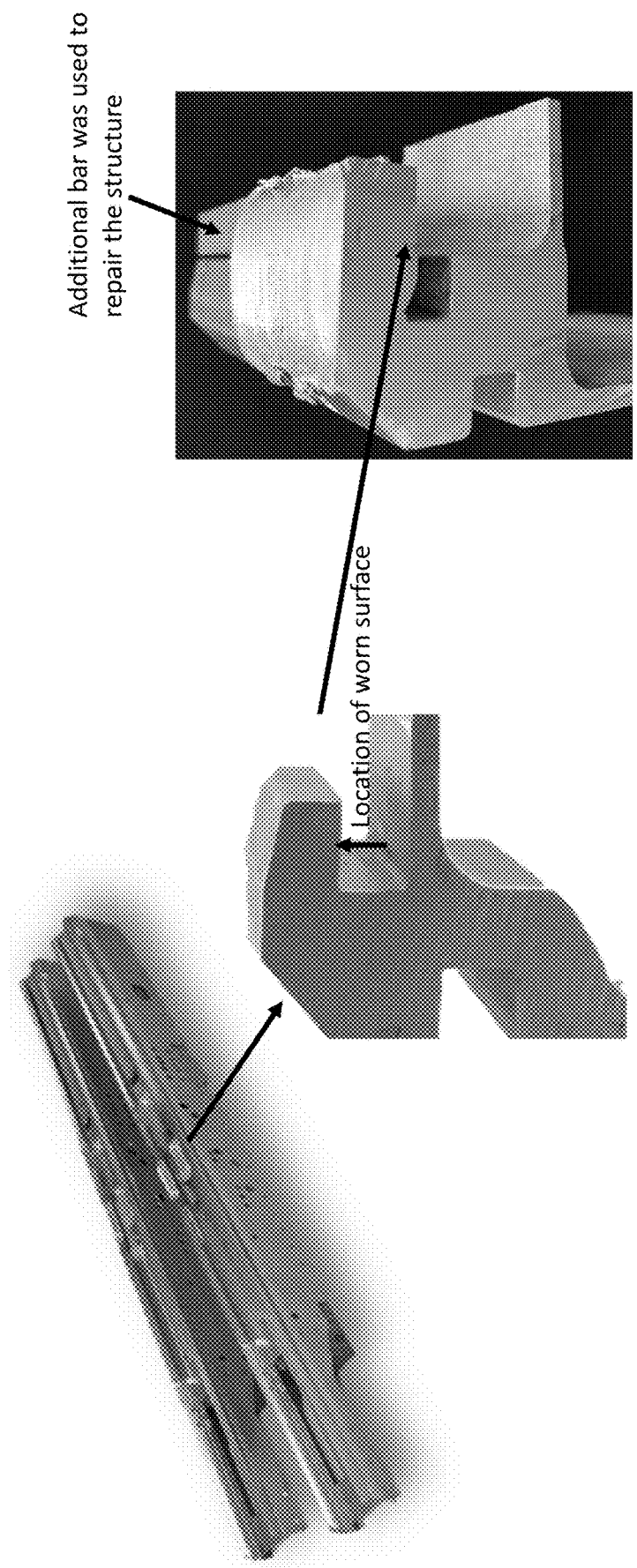
FIG. 15C is a set of photographs showing solid-state additive repair of jetfighter missile rail launcher according to an embodiment: the worn bracket underneath, previously considered non-repairable due to the location and the material Al7075, was solid-state additive manufacturing repaired with printing the same material on the top of the bracket.

Another example is a solid-state additive manufacturing repair of the rail launcher system, which was considered unrepairable due to the location of the damage and the base material (Al7075). The defective spots of the rail launcher are repaired using the same material (FIG. 15C).

Figure 15D:
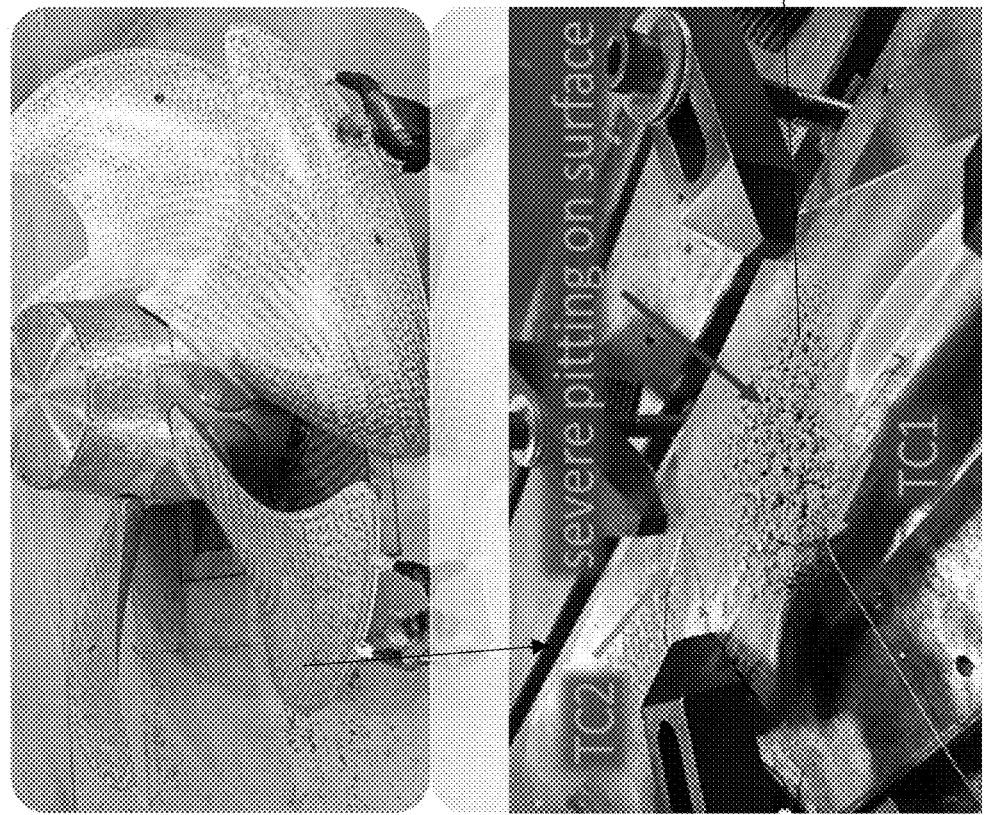
FIG. 15D is a set of photographs showing solid-state additive repair of heavily pitted and corroded propeller using the original indigenous material (Nickel Aluminum Bronze, NAB) according to an embodiment. The deposited fully dense NAB layers eliminates porosity and voids further preventing corrosion from returning to surface.
Figure 15D:
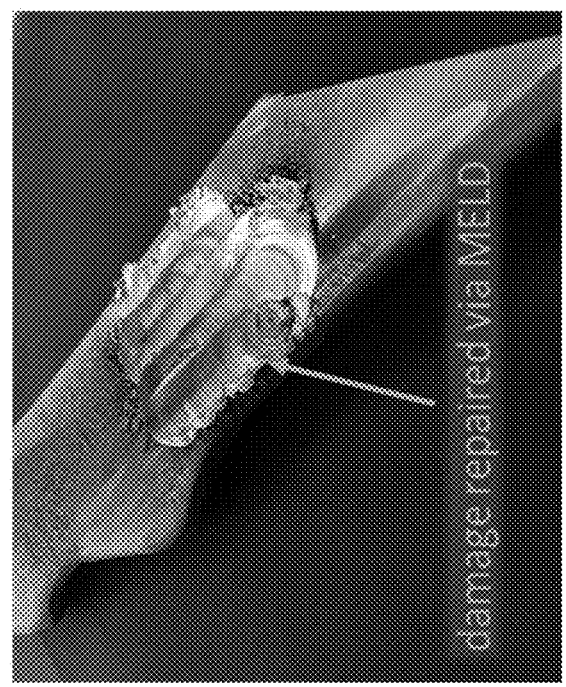

In yet another example, the heavily pitted and corroded surface of the naval propeller was repaired by the solid-state additive manufacturing system (FIG. 15D). The solid-state additive manufacturing system used the original indigenous material (Nickel Aluminum Bronze, NAB). The deposited fully dense NAB layers eliminates porosity and voids further preventing corrosion from returning to surface.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A solid-state additive manufacturing system comprising:
    a feeding unit,
    a spindle,
    a tool,
    a motor,
    a driving unit,
    a control unit,
    a monitoring unit,
    a contact- or contactless-sensor,
    a power supply, and
    process control software;
    wherein the spindle and the tool each have an internal passageway indirectly or directly in operable communication with each other for a filler material to pass from the feeding unit through the internal passageways of the spindle and tool to a workpiece;
    wherein the driving unit, the control unit, and the monitoring unit are together or separately:
        (i) capable of providing coordinated movements of the spindle, the tool, the workpiece and/or a workpiece platform,
        (ii) capable of dispensing the filler material on the workpiece, on a backplate, in a cavity of the workpiece, and/or in a gap between two or more workpieces,
        (iii) capable of providing friction, frictional heating, or one or more forces to be applied to the filler material, and/or mechanical stirring as a result of rotational and/or translational movement of the tool; and
    wherein the control unit, the monitoring unit, and the sensor together are capable of providing a final material with a tailored microstructure being configured to adjust during layer by layer depositing one or more processing parameters with temperature feedback controls and in response to temperature sensing to control temperature of a material being manufactured during the depositing and to achieve the tailored microstructure, such that the tailored microstructure comprises grains with a size refined at least 5 times compared to grains within the microstructure of the filler material and/or the workpiece.

2. The system of claim 1, wherein a tool holder imparts drive to the tool and comprises a passageway that enables the filler material to pass therethrough.

3. The system of claim 1, wherein a tool changer comprises a gear with 1, 2, 3 or more tool holders for interchanging different tools.

4. The system of claim 1, wherein the driving unit is capable of providing multiple rotations in a-, b- and/or c-directions.

5. The system of claim 1, wherein the spindle and the tool are capable of rotating and/or moving independently of the workpiece.

6. The system of claim 1, wherein the tool comprises one or more of:
    a body with multiple passageways through which two or more filler materials may pass;
    a flat shoulder, a featured shoulder, or a tapered shoulder, or any combination;
    a non-consumable shoulder with surface features providing for stirring of deposited filler material and/or a workpiece surface;
    one or more side tool cutters;
    one or more side injection points for supplying additives before deposition of the filler material on the workpiece;
    a shoulder with one or more nubs, wherein one or more of the nubs has one or more geometric structures chosen from cube, cuboid, hemisphere, cone, partial cone, partial square-based pyramid, ellipsoid, cylinder, tetrahedron, and/or teardrop-impeller shape;
    a shoulder with at least one nub having the same or different height as another nub, and the nubs are located in various positions on a shoulder of the tool; and/or
    a shoulder with at least one replaceable nub.

7. The system of claim 1, comprising a backing plate and wherein the workpiece platform comprises a base with a capability to move in x-, y- and/or z-direction movement.

8. The system of claim 7, wherein the base has one or more of:
    a capability to move and/or rotate in x-, y- and/or a-direction, or any combination of them, in addition to z-direction movement;
    a capability to move and/or rotate in x-, y-, a- and/or b-direction, or any combination of them, in addition to z-direction movement; and/or
    a capability to move and/or rotate in x-, y-, a-, b- and/or c-direction, or any combination of them, in addition to z-direction movement.

9. The system of claim 1, wherein the workpiece platform is configured to support one or multiple workpieces during i) joining together, ii) repair, iii) coating or surface modification, and/or iv) adding of customized features of the workpieces.

10. The system of claim 1, comprising one or more heating and/or cooling systems to provide temperature control of the filler material, deposited material, the workpiece, the spindle, the tool, a pin, the workpiece platform and/or the backing plate.

11. The system of claim 1, wherein the feeding unit provides continuous or discontinuous supply of one or more filler material in one or more material forms comprising rods, wires, powder-filled tubes, rod-like filler materials, powders, blocks, sheets, granules, or combinations thereof to the spindle.

12. The system according to claim 11, wherein the feeding unit comprises:
one, two or more entrances for adding various materials, additives and/or reinforcement dopants to control the deposited material composition; or
one or several injection points to supply liquid additives, such as catalysts, lubricants, and/or initiators, into the filler material; or
an internal passageway for providing continuous or discontinuous supply of a rod-type filler material; or
an internal passageway and a press driving unit (an actuator-downward force driver) to push rod-like filler material into the internal passageway of the feeding unit.

13. The system according to claim 1, wherein the feeding unit is configured to accept any shape and size of materials and deposit them as a continuous layer.

14. The system of claim 1, comprising one or more gas-supplying units to provide gasses or gas mixtures, for shielding during deposition processes and/or for influencing a final composition and/or structure of a deposited filler material layer.

15. The system of claim 1, wherein a controlled environment compartment provides a covered space around the spindle, the tool, the workpiece and/or the workpiece platform enabling a controlled gas environment in a working zone.

16. The system of claim 1, comprising one or more external energy sources capable of supplying electric field, magnetic field, ultrasound, vibration and/or light, UV light, visible light or IR light.

17. The system of claim 1, wherein the process control software comprises computer-executable instructions for controlling friction forces, other applied forces and/or deposition in terms of applied torque, load, pressure, spindle rotation, tool rotation and/or traverse motion of the tool, and/or traverse motion, temperature and/or angular rotation of the workpiece.

18. A method comprising:
producing a resultant three-dimensional (3D) structure using a solid-state additive manufacturing system comprising:
a feeding unit,
a spindle,
a tool,
a motor,
a driving unit,
a control unit,
a monitoring unit,
a contact- or contactless-sensor,
a power supply, and
process control software;
wherein the spindle and the tool each have an internal passageway indirectly or directly in operable communication with each other for a filler material to pass from the feeding unit through the internal passageways of the spindle and tool to a workpiece;
wherein the driving unit, the control unit, and the monitoring unit together or separately:
(i) provide coordinated movements of the spindle, the tool, the workpiece and/or a workpiece platform capable of producing the three-dimensional structure,
(ii) dispense the filler material on the workpiece, on a backplate, in a cavity of the workpiece, and/or in a gap between two or more workpieces, and
(iii) provide friction, frictional heating, one or more forces to be applied to the filler material, and/or mechanical stirring as a result of rotational and/or translational movement of the tool; and
using the control unit, the monitoring unit and the sensor to adjust during layer by layer depositing one or more processing parameters with temperature feedback controls and in response to temperature sensing to control temperature of a material being manufactured during the depositing and to achieve a tailored microstructure, such that the resultant 3D structure comprises the tailored microstructure having grains with a size refined at least 5 times compared to grains within the microstructure of the filler material and/or the workpiece.

19. The system of claim 1, wherein the final material comprises aluminum.

20. The system of claim 19, wherein the desired microstructure of the final material comprises grains with a size refined at least one order of magnitude compared to the grains within the microstructure of the filler material and/or workpiece.

21. The method of claim 18, wherein the resultant 3D structure comprises aluminum.

22. The method of claim 21, wherein the microstructure of the resultant 3D structure comprises grains with a size refined at least one order of magnitude compared to the grains within the microstructure of the filler material and/or workpiece.

23. The method of claim 18, wherein the solid-state additive manufacturing system comprises one or more heating and/or cooling systems to provide temperature control of the filler material, deposited material, the workpiece, the spindle, the tool, a pin, the workpiece platform and/or the backing plate.

* * * * *